(12) United States Patent
Arai et al.

(10) Patent No.: US 8,836,291 B2
(45) Date of Patent: Sep. 16, 2014

(54) BATTERY CHARGER AND BATTERY CHARGING METHOD

(71) Applicant: Shindengen Electric Manufacturing Co., Ltd., Tokyo (JP)

(72) Inventors: Tatsuya Arai, Hidaka (JP); Tokihiko Iwakura, Tokorozawa (JP)

(73) Assignee: Shindengen Electric Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 13/731,588

(22) Filed: Dec. 31, 2012

(65) Prior Publication Data

US 2013/0119946 A1    May 16, 2013

Related U.S. Application Data

(63) Continuation of application No. 12/408,903, filed on Mar. 23, 2009, now Pat. No. 8,421,420.

(30) Foreign Application Priority Data

Mar. 28, 2008 (JP) ............................... P2008-088723

(51) Int. Cl.
 *H02J 7/04* (2006.01)
 *H02J 7/14* (2006.01)
 *H02M 7/00* (2006.01)

(52) U.S. Cl.
 CPC ................ *H02J 7/04* (2013.01); *H02J 7/1492* (2013.01); *Y02T 10/92* (2013.01)
 USPC ............ 320/157; 363/125; 363/126; 363/127

(58) Field of Classification Search
 USPC ....................................................... 320/157
 See application file for complete search history.

(56) References Cited

U.S. PATENT DOCUMENTS 3,514,687 A    5/1970    Bixby et al.
3,654,541 A    4/1972    Kelley et al.
(Continued)

FOREIGN PATENT DOCUMENTS

JP    A-62-058835    3/1987
JP    2001-128388    5/2001
(Continued)

OTHER PUBLICATIONS

Japanese Notice of Reasons for Rejection and English Translation for JP 2008-088723, mailed Aug. 28, 2012, 4 pages.

(Continued)

*Primary Examiner* — Drew A Dunn
*Assistant Examiner* — Nathaniel Pelton
(74) *Attorney, Agent, or Firm* — Nixon & Vanderhye P.C.

(57) ABSTRACT

A rectification processor includes rectifier elements that control charge to batteries independently for each of the batteries. A charge-state detector detects charge states of the batteries from their voltages, and determines whether to select the batteries for charging in a half-cycle determined beforehand in accordance with the detected result. A synchronous signal detector detects a signal synchronized with the phase of the 3-phase alternate current (AC) generator from the 3-phase AC generator, and outputs a synchronous signal. A charge controller controls the charge in the rectification processor in synchronization with the 3-phase AC generator according to the synchronous signal from the synchronous signal detector, and, in accordance with the charge states of the batteries output from the charge-state detector, controls charge amounts to the battery/batteries that was determined for selection.

13 Claims, 26 Drawing Sheets

(56) References Cited

U.S. PATENT DOCUMENTS

| | | | |
|---|---|---|---|
| 4,045,718 | A | 8/1977 | Gray |
| 5,880,947 | A | 3/1999 | Imanaka et al. |
| 5,886,893 | A * | 3/1999 | Asai et al. ............ 363/161 |
| 6,219,268 | B1 | 4/2001 | Asai et al. |
| 6,373,230 | B2 * | 4/2002 | Jabaji ............ 322/28 |
| 6,522,105 | B2 * | 2/2003 | Kodama et al. ............ 320/155 |
| 6,525,508 | B1 | 2/2003 | Kanno |
| 2002/0047686 | A1 | 4/2002 | Kodama et al. |
| 2003/0222513 | A1 | 12/2003 | Kuribayashi |
| 2005/0093520 | A1 * | 5/2005 | Muramatsu et al. ............ 322/29 |
| 2007/0274109 | A1 | 11/2007 | Oyobe et al. |
| 2008/0053715 | A1 * | 3/2008 | Suzuki et al. ............ 180/2.1 |
| 2008/0130335 | A1 | 6/2008 | Yuzurihara et al. |
| 2009/0102430 | A1 * | 4/2009 | Marguery et al. ............ 320/162 |
| 2009/0160408 | A1 | 6/2009 | Suzuki et al. |
| 2009/0243550 | A1 | 10/2009 | Arai et al. |
| 2009/0310390 | A1 | 12/2009 | Ohshima et al. |
| 2010/0019734 | A1 | 1/2010 | Oyobe et al. |
| 2010/0164278 | A1 | 7/2010 | Oyobe et al. |
| 2010/0237825 | A1 | 9/2010 | Suzuki et al. |

FOREIGN PATENT DOCUMENTS

| | | |
|---|---|---|
| JP | A-2002-135991 | 5/2002 |
| JP | A-2002-135992 | 5/2002 |
| JP | A-2002-135993 | 5/2002 |
| JP | A-2002-152989 | 5/2002 |
| JP | A-2002-176797 | 6/2002 |
| JP | A-06-209532 | 1/2014 |

OTHER PUBLICATIONS

Office Action issued in parent U.S. Appl. No. 12/408,903 dated Sep. 6, 2011.

Office Action issued in parent U.S. Appl. No. 12/408,903 dated Mar. 15, 2012.

Office Action issued in parent U.S. Appl. No. 12/408,903 dated Sep. 21, 2012.

Notice of Reasons for Rejection issued in Japanese Application No. 2012-272687, dated Jan. 21, 2014 (with translation).

* cited by examiner

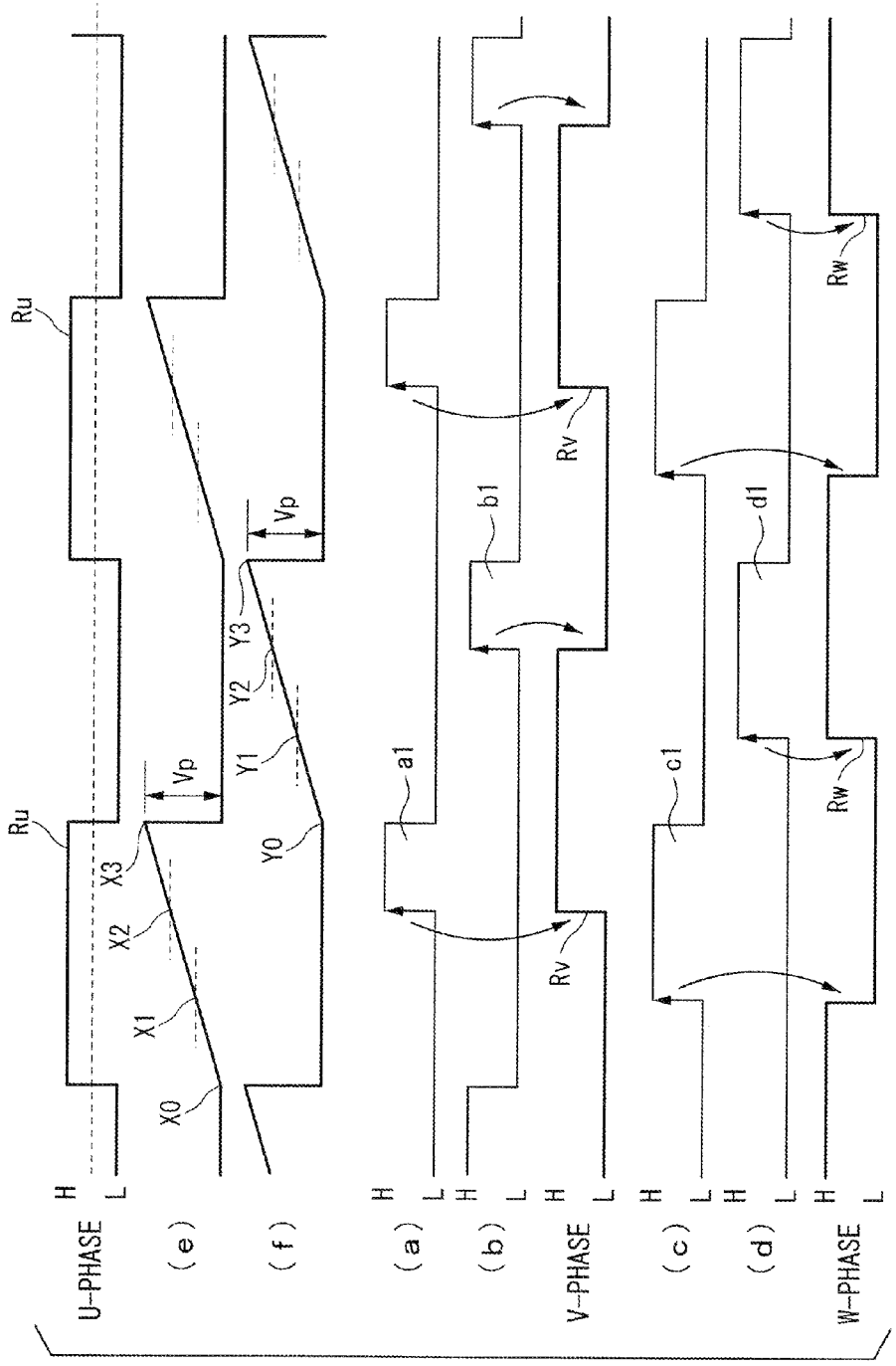

FIG. 7A

|  | VOLTAGES OF BATTERIES 3 AND 4 | | | |
|---|---|---|---|---|
| BATTERY 3 | BELOW REFERENCE VOLTAGE | EQUAL TO OR GREATER THAN REFERENCE VOLTAGE | BELOW REFERENCE VOLTAGE | EQUAL TO OR GREATER THAN REFERENCE VOLTAGE |
| BATTERY 4 | BELOW REFERENCE VOLTAGE | BELOW REFERENCE VOLTAGE | EQUAL TO OR GREATER THAN REFERENCE VOLTAGE | EQUAL TO OR GREATER THAN REFERENCE VOLTAGE |
| MODE | 1 | 2 | 3 | 4 |

FIG. 7B

|  | DETERMINATION OF STATE ACCORDING TO VOLTAGES OF BATTERIES 3 AND 4 | | | |
|---|---|---|---|---|
| MODE | 1 | 2 | 3 | 4 |
| BATTERY 3 | BELOW CHARGE VOLTAGE | COMPLETELY CHARGED | BELOW CHARGE VOLTAGE | COMPLETELY CHARGED |
| BATTERY 4 | BELOW CHARGE VOLTAGE | BELOW CHARGE VOLTAGE | COMPLETELY CHARGED | COMPLETELY CHARGED |
| PROCESS | CHARGE BOTH | CHARGE BATTERY 4 | CHARGE BATTERY 3 | DO NOT CHARGE |

FIG. 14

| MODE | SELECTION SIGNAL 1 | SELECTION SIGNAL 2 | NUMBER OF COMPARATOR | \multicolumn{9}{c|}{NUMBER OF THYRISTOR TO BE FIRED} |
| | | | | 1 | 2 | 3 | 4 | 5 | 6 | 7 | 8 | 9 |
|---|---|---|---|---|---|---|---|---|---|---|---|---|
| MODE 2 OR MODE 1 | 0 | 1 | 311 | | | | | | | | O | |
| | | | 312 | | | | O | | | | | O |
| | | | 313 | | | | | | | | O | |
| | | | 314 | | | | | | | O | | O |
| | | | 315 | | | | | O | | | | O |
| | | | 316 | | | | | O | | O | | |
| MODE 3 OR MODE 1 | 1 | 0 | 311 | O | | | | | | | | |
| | | | 312 | O | | | | | | O | | |
| | | | 313 | | | O | | | | O | | |
| | | | 314 | | | O | | | | | O | |
| | | | 315 | | O | | | | | O | | |
| | | | 316 | | O | | | | | | O | |
| MODE 4 | 0 | 0 | 311 | | | | | | O | | | |
| | | | 312 | | | | | | O | O | | |
| | | | 313 | | | | | | | O | | |
| | | | 314 | | | | | | | | O | O |
| | | | 315 | | | | | O | | | | O |
| | | | 316 | | | | | O | O | | | |
| NOT SPECIFIED | 1 | 1 | 311 | | | | | | | | | |
| | | | 312 | | | | | | | | | |
| | | | 313 | | | | | | | | | |
| | | | 314 | | | | | | | | | |
| | | | 315 | | | | | | | | | |
| | | | 316 | | | | | | | | | |

SYMBOL 'O' INDICATES A THYRISTOR TO BE FIRED.
SELECTION SIGNALS 1 AND 2 INDICATE A SYSTEM TO BE FIRED.

BATTERY CHARGER AND BATTERY CHARGING METHOD

CROSS REFERENCE TO RELATED APPLICATION

This application is a continuation of U.S. application Ser. No. 12/408,903, filed Mar. 23, 2009, now U.S. Pat. No. 8,421,420, which claims benefit to Japanese Application No. 2008-88723, filed Mar. 28, 2008, the entire contents of each of which are hereby incorporated by reference.

BACKGROUND OF THE INVENTION

1. Field of the Invention

The present invention relates to a battery charger and a battery charging method that control charging of a plurality of batteries.

2. Description of Related Art

To independently use loads connected to batteries for each application, battery charging equipment is sometimes configured with a plurality of batteries.

A technology is proposed with regard to a charger that controls charging of a plurality of batteries intended for applications in the above manner (for example, refer to Japanese Unexamined Patent Application, First Publication, No. 2001-128388).

According to this technology, two electrical generators are included, and the voltage of a battery connected via a charger for each of the generators is detected, whereby the batteries can be charged without excess or deficiency.

FIG. 27 is a basic configuration of a conventional battery charger including one electrical generator.

A battery charger 302 includes a circuit that charges two batteries (batteries 3 and 4) by employing a method known as short-circuit method.

The battery charger 302 detects a voltage Vreg of the battery 3 in a charge-state detector 320. When the detected voltage Vreg of the battery 3 exceeds a predetermined set value, a charge controller 330 simultaneously sets three thyristors S11, S12, and S13 of a rectifying processor 340 to an ON state, and short-circuits the output of a 3-phase alternate current (AC) generator 301. The battery charger 302 stops charging the batteries 3 and 4 so that they are not excessively charged by the 3-phase AC generator 301 whose output is short-circuited.

The battery charger 302 repeats a scheme, when the voltage Vreg decreases, the charge-state detector 320 detects reduction in the voltage Vreg, and the charge controller 330 changes the thyristors of the rectifying processor 340 to an OFF state.

A charger that charges using charge voltage control method according to this scheme is termed a short-circuit regulator.

However, in the circuit employing the conventional method according to the technology disclosed in JP 2001-128388 A, while each battery can be charged without excess or deficiency, a plurality of generators must be provided to charge a plurality of batteries. Thereby, the number of constituent components and the scale of the equipment increase. Another problem is that, since the load on an engine for driving the generators also increases, it is not suitable for general use.

As one method of reducing the scale of equipment that is increased by the provision of a plurality of generators, FIG. 27 is a circuit diagram of an arrangement including a single 3-phase AC generator 301. In the battery charger 302 of FIG. 27, a charge-state detector 320 detects voltage Vreg of a battery 3.

According to this method, the charge state is detected based on the voltage Vreg of one battery. Conduction of a thyristor is controlled according to the detected charge state, and both batteries are simultaneously charged or not charged. Therefore, depending on the usage state of an accessory-system load (e.g. a refrigerator, a television, etc.), a battery that is used for the accessory-system load and for which voltage Vreg is not detected is greatly consumed, whereas a battery that is used for the drive-system load and for which voltage Vreg is detected becomes fully charged.

While this method can reduce the scale of the equipment by using only one generator, since it detects the charge state of both batteries by detecting the state of only one battery, it has a problem of being unable to properly manage the amount of charge to both batteries when there is an imbalance in their charge amounts or loads.

Also, the short-circuit regulator described above has a problem that, depending on the state of the connected load, difference may arise in the current flow in each phase of the 3-phase AC generator, causing an imbalance.

Another problem is that, when such a situation arises during high rotation, it is not possible to release an uncharged state.

Another problem is that a short-circuit regulator has electrical loss which considerably affects the drive-system by short-circuit of the output of the generator at low rotation.

Thus, in conventional battery chargers, the discharge amount differs according to the state of the load connected to each battery, whereby, when controlling the charge amount by detecting the voltage of only one of the batteries, a bias is liable to arise in the charge of the batteries according to their load state.

SUMMARY OF THE INVENTION

The present invention has been realized to solve these problems, and aims to provide a battery charger that limits the equipment scale to one generator, while charging a plurality of batteries without excess or deficiency from the generator.

A first exemplary aspect of the present invention is a battery charger that is connected between a 3-phase alternate current (AC) generator for generating a 3-phase AC power including U-, V-, and W-phases, and a plurality of batteries. The battery charger converts the AC power output from the 3-phase AC generator to a direct current (DC) power so as to supply the DC power to the plurality of batteries. The battery charger includes: a rectification processor including a rectifier element that independently controls charge to each of the plurality of batteries; a charge state detector that detects a charge state of the battery from a voltage thereof to select the battery for charging in a predetermined period in accordance with the detected charge state; a synchronous signal detector that detects a signal synchronized with each phase of the 3-phase AC power from the 3-phase AC generator to output a synchronous signal; and a charge controller that allows the rectification processor to control the charge in synchronization with the 3-phase AC generator in accordance with the synchronous signal so as to control a charge amount of the battery selected by the charge-state detector.

In the first exemplary aspect of the present invention, the charge controller may control the charge amount of each of the plurality of batteries by a time-division control method in which the battery for charging is switched after the predetermined period elapses.

In the first exemplary aspect of the present invention, the charge controller may control the charge amount of each of the plurality of batteries by a phase-control method with respect to the battery for charging selected by the charge-state detector.

In the first exemplary aspect of the present invention, the charge state detector may determine a charge sequence of the battery, and the charge controller may start charging from the battery having a high priority of the charge sequence.

In the first exemplary aspect of the present invention, the charge state detector may determine the charge state of the battery by comparing the voltage thereof with a predetermined threshold potential, selects the battery for charging in accordance with a predetermined determination reference, based on a combination result of the charge states of the plurality of batteries, and inputs an error signal obtained by comparing the voltage of the selected battery with the predetermined threshold potential reference potential, and a selection signal indicating the selected battery, to the charge controller. The synchronous signal detector may further output a rectangular waves each of which is synchronized with each phase of the 3-phase AC power, and triangular waves each of which is synchronized with each of the rectangular waves and monotonously increases within a half-cycle thereof, as the synchronous signal. The charge controller may further compare the error signal input from the charge state detector with the triangular wave input from the synchronous signal detector, thereby deems a moment when potentials of the error signal and each of the triangular waves match as a trigger for starting conduction of the rectifier element, and inputs a firing signal to the rectification processor in accordance with the selection signal input from the charge state detector.

In the first exemplary aspect of the present invention, the rectification processor may includes: at least three thyristors connected as the rectifier elements to each battery in correspondence with the U-, V-, and W-phases; and at least three thyristors or three diodes are connected in common between the plurality of batteries.

In the first exemplary aspect of the present invention, the 3-phase AC generator may include a sub-coil in one of the phases. The synchronous signal detector may further detect a signal output from the sub-coil as a signal synchronized with each phase.

In the first exemplary aspect of the present invention, the synchronous signal detector may detect each phase in the 3-phase AC power from a voltage of one of the 3-phase AC power.

A second exemplary aspect of the present invention is a battery charging method in a battery charger that is connected between a 3-phase alternate current (AC) generator for generating a 3-phase AC power including U-, V-, and W-phases, and a plurality of batteries. The battery charger converts each AC power output from the 3-phase AC generator to a direct current (DC) power to supply the DC power to the plurality of batteries. The method includes: providing rectifier element that independently controls charge to each of the plurality of batteries; detecting a charge state of the battery from a voltage thereof to select the battery for charging in a predetermined period in accordance with the detected charge state; detecting a signal synchronized with each phase of the 3-phase AC power from the 3-phase AC generator to output a synchronous signal; and allowing the rectification processor to control the charge in synchronization with the 3-phase AC generator in accordance with the synchronous signal so as to control a charge amount of the battery selected by the charge-state detector.

BRIEF DESCRIPTION OF THE DRAWINGS

FIG. 2 is a timing chart that shows a mechanism for generating rectangular waves in a U-, V-, W-phase detection circuit.

FIG. 7A is a table that shows a relationship between a battery voltage and mode-determination in the charge-state detector.

FIG. 7B is a table that shows the relationship between the battery voltage and the mode-determination in the charge-state detector.

FIG. 14 is a table that shows a relationship between the mode-determination and thyristor-firing control.

DETAILED DESCRIPTION OF THE INVENTION

First Embodiment

A first embodiment of the present invention will be described with reference to the drawings.

Figure 1:
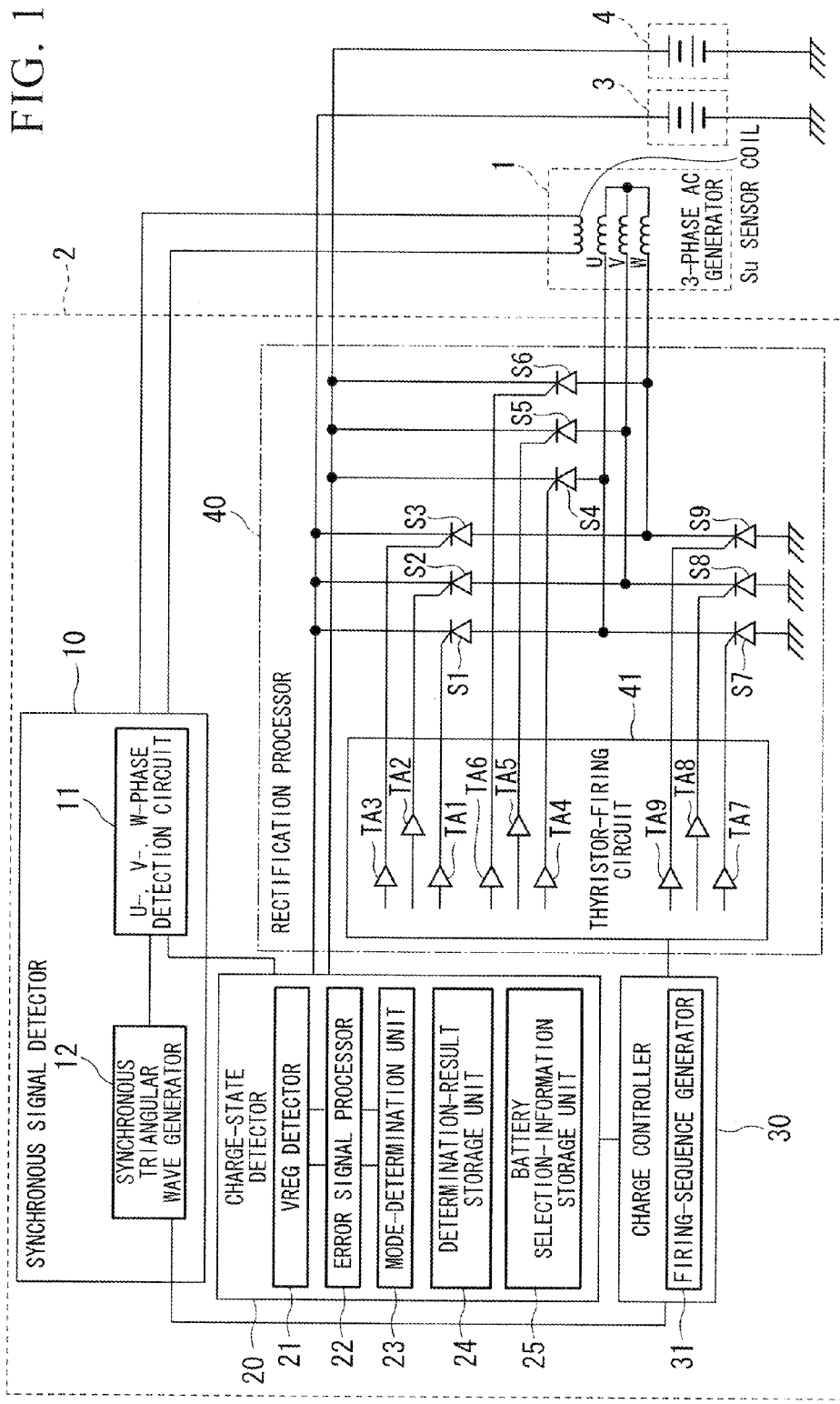
FIG. 1 is a circuit diagram that shows a basic configuration example of a battery charger according to a first embodiment of the present invention.

FIG. 1 is a circuit diagram of a battery charger according to a first embodiment of the present invention. In the example of FIG. 1, a battery charger 2 rectifies the all AC output voltage of a 3-phase AC generator 1, and charges batteries 3 and 4 with the rectified output.

The battery charger 2 uses a rectifier circuit of a rectification processor 40 that rectifies the AC output voltage from the 3-phase AC generator 1 as a 3-phase bridge circuit.

In adjusting the charge amount to each battery, with regard to the timing of a switching operation of each rectifier element in the rectification processor 40, the AC output voltage of the 3-phase AC generator 1 is controlled in accordance with the voltages of batteries 3 and 4 by controlling the conduction-start angle, thereby controlling the charge amount of the batteries.

The 3-phase AC generator 1 includes a sensor coil (sub-coil) Su in one of the phases of the 3-phase AC generator 1 (the U-phase in this example). The sensor coil Su generates and outputs signals in synchronism with the AC output voltages (in each of the U-phase, V-phase, and W-phase).

An overview of the overall configuration of the battery charger 2 shown in FIG. 1 will be described hereinbelow.

The battery charger 2 includes a synchronous signal detector 10, a charge-state detector 20, a charge controller 30, and a rectification processor 40.

An input terminal of the synchronous signal detector 10 connects to the sensor coil Su of the 3-phase AC generator 1, and its output terminal connects to an input terminal of the charge-state detector 20 and an input terminal of the charge controller 30.

An input terminal of the charge-state detector 20 connects to terminals of the batteries 3 and 4, and its output terminal connects to the charge controller 30.

An output terminal of the charge controller 30 connects to an input terminal of the rectification processor 40.

An input terminal of the rectification processor 40 connects to an output terminal of the 3-phase AC generator 1, and its output terminal connects to terminals of the batteries 3 and 4.

In the 3-phase AC generator 1, the sensor coil Su generates a timing signal synchronized with an AC current voltage output to the battery charger 2, and inputs it to the battery charger 2.

The synchronous signal detector 10 of the battery charger 2 detects the timing signal input from the 3-phase AC generator 1, generates a synchronous signal synchronized with the AC current voltage output by the 3-phase AC generator 1, and outputs the synchronous signal.

The output synchronous signal includes rectangular waves synchronized with each phase of the 3-phase AC generator 1, and triangular waves synchronized with the rectangular waves, which monotonously increases in a period of a half-cycle.

The synchronous signal detector 10 includes a U-, V-, W-phase detection circuit 11 and a synchronous triangular wave generator 12.

The U-, V-, W-phase detection circuit 11 of the synchronous signal detector 10 detects a timing signal output by the sensor coil Su of the 3-phase AC generator 1, generates, from a U-phase voltage waveform (AC waveform) Vu, a rectangular wave synchronized with the U-phase, and inputs it to the synchronous triangular wave generator 12.

The U-, V-, W-phase detection circuit 11 of the synchronous signal detector 10 generates, according to the triangular wave in synchronization with the U-phase rectangular wave input from the synchronous triangular wave generator 12, rectangular waves in synchronization with the V- and W-phases, and inputs them to the synchronous triangular wave generator 12.

Using the 3-phase rectangular-wave signals input from the U-, V-, W-phase detection circuit 11, the synchronous triangular wave generator 12 of the synchronous signal detector 10 generates triangular waves synchronized with those signals. The heights of these triangular waves (maximum values of the triangular waves) become equal irrespective of the size of the pulse widths of the rectangular waves. The synchronous triangular waves are generated in a two-stage process. Firstly, a U-phase triangular wave synchronized with the U-phase voltage is generated, and input to the U-, V-, W-phase detection circuit 11. Then, V-phase and W-phase rectangular waves are input from the U-, V-, W-phase detection circuit 11, triangular waves synchronized with the V- and W-phases are generated, and output together with the U-phase synchronized triangular wave.

When the 3-phase AC generator 1 is star-connected, the triangular waves output from the synchronous triangular wave generator 12 match the phases of the line-to-line voltages. The triangular waves synchronized with the line-to-line voltages are output at a 30° advance with respect to the phase of the phase voltage.

The embodiment of the synchronous signal detector 10 will be explained in detail later.

The charge-state detector 20 determines the charge states of the batteries 3 and 4 by comparing their detected voltage values with predetermined threshold potentials, selects, based on a result that combines the charge states of the batteries 3 and 4, a battery for charging according to a predetermined determination reference, and inputs an error signal obtained by comparing the voltage of the selected battery with a reference potential, and a selection signal indicating the selected battery, to the charge controller.

The charge-state detector 20 compares a feedback signal Vfb from the actual battery voltage Vbat of each battery, and a set value (target value) Vref of the battery charge voltage, amplifies their difference signal, and detects an error amplification output Vc.

Also, based on each error amplification output Vc, it selects a battery for charging, and outputs the error amplification output that corresponds to the selected battery.

Incidentally, when the battery voltage Vbat is low and 'Vfb<Vref', the error amplification output Vc is output at low voltage, whereas when the battery voltage Vbat is high and 'Vfb>Vref', the error amplification output Vc is output at high voltage.

The charge-state detector 20 includes a VREG detector 21, an error signal processor 22, a mode-determination unit 23, a determination-result storage unit 24, and a battery selection-information storage unit 25.

The voltages of batteries 3 and 4 are input to the VREG detector 21 of the charge-state detector 20.

The input battery voltages are compared with predetermined reference voltages 3 and 4. The difference between the input battery voltages and the reference voltages becomes an error signal that indicates the amount of charge required for that battery.

The error signal processor 22 of the charge-state detector 20 operates as a signal-selector which, in compliance with an input selected signal, selects and outputs, from the error signal indicating the charge amounts required for each battery detected by the VREG detector 21, the error signal for charging that battery.

The mode-determination unit 23 of the charge-state detector 20 detects the error signal indicating the charge amounts required for each battery detected by the VREG detector 21, determines a charge state for each battery according to an error signal detected in a predetermined cycle, and stores the determination result in the determination-result storage unit 24.

The mode-determination unit 23 refers to the determination result stored in the determination-result storage unit 24, selects a battery for charging, and outputs a select signal indicating the selected battery.

When alternately charging battery 3 and battery 4, the mode-determination unit 23 stores information indicating which battery to charge next in the battery selection-information storage unit 25. Also, when selecting batteries for alternate charging, it refers to information stored in the battery selection-information storage unit 25, and selects a battery for charging.

The determination-result storage unit 24 of the charge-state detector 20 stores a determination result relating to the charge states of the two batteries 3 and 4 determined by the mode-determination unit 23. Information is recorded in regions divided into storage elements such as semiconductor memories, and the determination-result storage unit 24 stores the information.

The battery selection-information storage unit 25 of the charge-state detector 20 stores information (selection flag) for charging on a priority basis one of the two batteries 3 and 4 determined by the mode-determination unit 23. Information is recorded in regions divided into storage elements such as semiconductor memories, and the battery selection-information storage unit 25 stores the information.

The embodiment of the charge-state detector 20 will be explained in detail later.

The charge controller 30 compares the error signal input from the charge-state detector 20 with the triangular wave input from the synchronous signal detector 10, deems a moment when the potential of the error signal and the triangular waves matches as a trigger for starting conduction of the rectifier element, and, in compliance with the selection signal input from the charge-state detector 20, inputs a firing signal to the rectification processor 40.

The charge controller 30 mainly includes a firing-sequence generator 31.

The embodiment of the firing-sequence generator 31 will be explained in detail later.

The rectification processor 40 is a circuit that, in compliance with the firing signal input from the charge controller 30, rectifies the AC output voltage output by the 3-phase AC generator 1, and charges the batteries connected to it.

The rectification processor 40 includes thyristors (rectifier elements) S1, S2, S3, S4, S5, S6, S7, S8, and S9, and a thyristor-firing circuit 41.

Thyristors are provided for each of two systems of connected batteries. Thyristors S1 to S3 form a first system and thyristors S4 to S6 form a second system, both these systems being connected to a positive pole of the respective battery, while thyristors S7 to S9 are connected to the load (grounded pole) of each battery in common with a common circuit for the two systems.

The thyristor-firing circuit 41 of the rectification processor 40 includes driver circuits TA1 to TA9 for firing the thyristors S1 to S9 connected thereto.

The driver circuits TA1 to TA9 are arranged independently for each of the connected thyristors S1 to S9, and are connected to gates of the respective thyristors.

Thyristors S1 to S3 and thyristors S7 to S9 function as a bridge that all-wave-rectifies the output of the 3-phase AC generator 1 connected to the system of battery 3.

Thyristors S4 to S6 and thyristors S7 to S9 function as a bridge that all-wave-rectifies the output of the 3-phase AC generator 1 connected to the system of battery 4.

The detailed connections of the thyristors S1 to S9 are as follows.

The anode of thyristor S1 is connected to the U-phase of the 3-phase AC generator 1, its cathode is connected to the positive pole of battery 3, and its gate is connected to the output of driver circuit TA1 of the thyristor-firing circuit 41.

The anode of thyristor S2 is connected to the V-phase of the 3-phase AC generator 1, its cathode is connected to the positive pole of battery 3, and its gate is connected to the output of driver circuit TA2 of the thyristor-firing circuit 41.

The anode of thyristor S3 is connected to the W-phase of the 3-phase AC generator 1, its cathode is connected to the positive pole of battery 3, and its gate is connected to the output of driver circuit TA3 of the thyristor-firing circuit 41.

The anode of thyristor S4 is connected to the U-phase of the 3-phase AC generator 1, its cathode is connected to the positive pole of battery 4, and its gate is connected to the output of driver circuit TA4 of the thyristor-firing circuit 41.

The anode of thyristor S5 is connected to the U-phase of the 3-phase AC generator 1, its cathode is connected to the positive pole of battery 4, and its gate is connected to the output of driver circuit TA5 of the thyristor-firing circuit 41.

The anode of thyristor S6 is connected to the U-phase of the 3-phase AC generator 1, its cathode is connected to the positive pole of battery 4, and its gate is connected to the output of driver circuit TA6 of the thyristor-firing circuit 41.

The anode of thyristor S7 is connected to a ground potential, its cathode is connected to the U-phase of the 3-phase AC generator 1, and its gate is connected to the output of driver circuit TA7 of the thyristor-firing circuit 41.

The anode of thyristor S8 is connected to a ground potential, its cathode is connected to the V-phase of the 3-phase AC generator 1, and its gate is connected to the output of driver circuit TA8 of the thyristor-firing circuit 41.

The anode of thyristor S9 is connected to a ground potential, its cathode is connected to the W-phase of the 3-phase AC generator 1, and its gate is connected to the output of driver circuit TA9 of the thyristor-firing circuit 41.

The thyristor-firing circuit 41 of the rectification processor 40 includes nine thyristor-firing circuits arranged independently.

An input terminal of each thyristor-firing circuit connects to a respective output terminal of the charge controller 30 that outputs a control signal for controlling firing a thyristor, and its output terminal connects to a gate of the respective thyristor.

When a control signal for controlling the firing of a thyristor is input from the output terminal of the charge controller 30, the thyristor-firing circuit 41 transmits a firing signal to that thyristor.

Thus, since the charge amount is controlled according to the conduction-start angle of the thyristor, the charge amount to the battery is controlled in accordance with the control signal from the charge controller 30.

[UVW Phase Detection Circuit]

Subsequently, the configuration and operation of the U-, V-, W-phase detection circuit 11 in the synchronous signal detector 10 will be explained. The U-, V-, W-phase detection circuit 11 detects, based on a rectangular-wave signal in synchronization with one of the three phases (e.g. U-phase), positions (phases) of the remaining two phases, and generates rectangular-wave signals of these phases. To accomplish this, it generates a triangular wave (first triangular wave) in synchronization with the phase from 0° to 180° of the U-phase rectangular wave, and a triangular wave (second triangular wave) in synchronization with the phase from 180° to 360° of the U-phase rectangular wave.

The U-, V-, W-phase detection circuit 11 generates a rectangular wave having a level inverted at the voltage point of ⅔ of the respective peak voltages of the first and second triangular waves. This rectangular wave is lagged 120 degrees behind the rectangular wave synchronized with the U-phase, and becomes synchronized with the V-phase.

The U-, V-, W-phase detection circuit 11 generates a rectangular wave having a level inverted at the voltage point of ⅓ of the respective peak voltages of the first and second triangular waves. This rectangular wave is lagged 240 degrees behind the rectangular wave synchronized with the U-phase, and becomes synchronized with the W-phase.

Therefore, since signals of rectangular waves in synchronization with the U-phase, V-phase, and W-phase can be generated with a single sensor coil, these can be used in controlling conduction timing, enabling the structure of the 3-phase AC generator to be simplified and its size to be reduced, and also reducing its cost.

Subsequently, a specific example will be explained based on the drawings.

FIG. 2 is a timing chart that shows an operation of a U-, V-, W-phase detection circuit 11, and illustrates a method of generating a V-phase rectangular wave Rv and a W-phase rectangular wave Rw from a rectangular wave Ru in synchronization with the U-phase. This procedure will be explained based on FIG. 2.

(Procedure 1) Firstly, a rectangular wave Ru in synchronization with the U-phase is generated from the detected value of the sensor coil Su. Then, a triangular wave (e) in synchronization with the 'H (high)' side of this rectangular wave Ru is generated.

This triangular wave (e) is synchronized with the rectangular wave Ru, and its phase width is 180° (0° to 180°). The height (peak voltage Vp of the triangular wave) of this triangular wave (e) also becomes equal, irrespective of the size of the pulse width of the rectangular wave Ru. A method of generating a triangular wave whose height (peak voltage of the triangular wave) becomes equal irrespective of the size of the pulse width of the rectangular wave will be explained later.

(Procedure 2) Similarly, a triangular wave (f) in synchronization with the 'L (low)' side of this rectangular wave Ru is generated. The triangular wave (f) is synchronized with the rectangular wave Ru, and its phase width is 180° (180° to 360°). The height (peak voltage Vp of the triangular wave) of the triangular wave (f) also becomes equal, irrespective of the size of the pulse width of the rectangular wave Ru.

(Procedure 3) Subsequently, X1 point at ⅓ of the height of the peak voltage Vp of the triangular wave (e), and X2 point at ⅔ of the height, are determined. This gives a phase width of 60° between X0 point (the rise point of triangular wave (e)) and X1 point, between X1 point and X2 point, and between X2 point and X3 point (the fall point of triangular wave (e)). Similarly, a point Y1 at ⅓ of the height of the peak voltage Vp of the triangular wave (f), and a point Y2 at ⅔ of the height, are determined.

(Procedure 4) Subsequently, a pulse a1 that is 'H' from X2 point to X3 point is generated, and a pulse b1 that is 'H' from point Y2 to point Y3 (the fall point of triangular wave (f)) is generated.

(Procedure 5) A rectangular wave Ru that is 'H' at the rise edge of pulse a1 and returns to 'L' at the rise edge of pulse b1 is then generated, this rectangular wave being synchronized with the V-phase.

(Procedure 6) Subsequently, a pulse c1 that is 'H' from X1 point to X3 point is generated, and a pulse d1 that is 'H' from point Y1 to point Y3 is generated.

(Procedure 5) A rectangular wave Rw that is 'H' at the rise edge of pulse d1 and returns to 0 at the rise edge of pulse c1 is then generated, this rectangular wave being synchronized with the W-phase.

With these procedures, it is possible to generate a V-phase rectangular wave Rv whose phase lags 120° behind the U-phase, and a W-phase rectangular wave Rw whose phase lags 240° behind the U-phase.

Figure 3A:
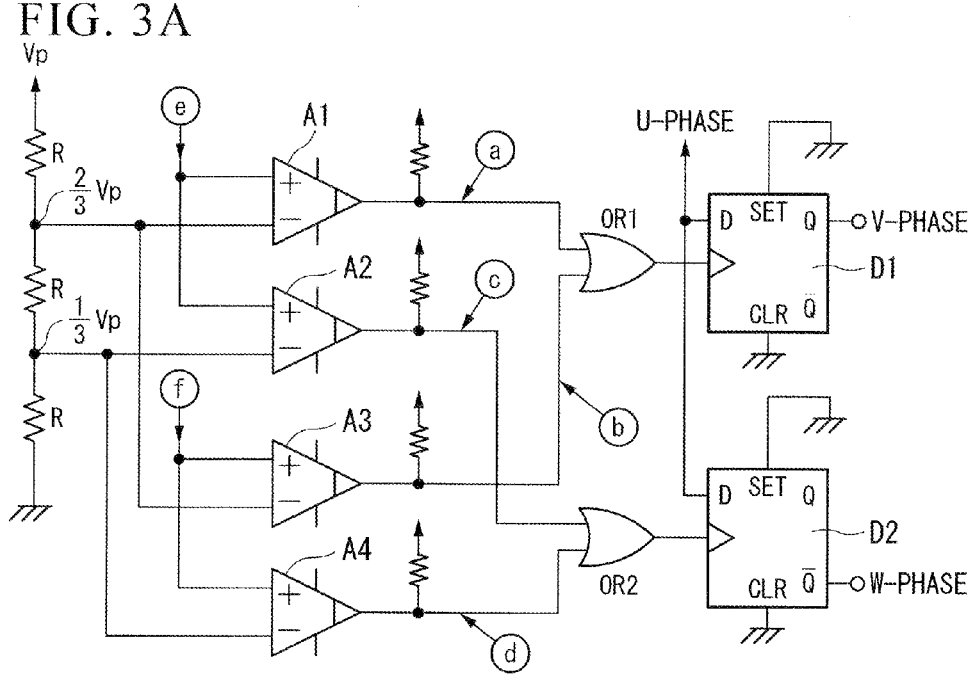
FIG. 3A is a circuit diagram that shows a configuration of the U-, V-, W-phase detection circuit.
Figure 3B:
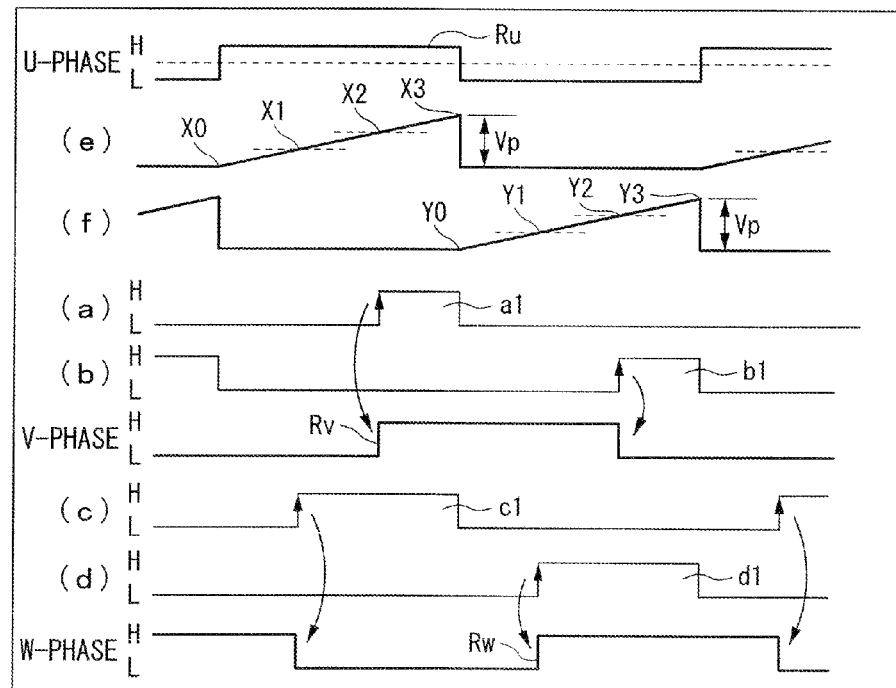
FIG. 3B is a timing chart that shows an operation of the U-, V-, W-phase phase detection circuit.

FIG. 3A is an example of a configuration of a circuit that generates V-phase and W-phase rectangular waves from the triangular waves (e) and (f) synchronized with the U-phase shown in FIG. 3B. An operation of this circuit will be explained with reference to FIGS. 3A and 3B.

After the peak voltage Vp of the triangular wave is split by three resistors R connected in series, a voltage of (⅓)×Vp is input as a reference voltage to inversed input terminals of comparators A2 and A4, and a voltage of (⅔)×Vp is input as a reference voltage to inversed input terminals of comparators A1 and A3. Triangular wave (e) is input to non-inversed input terminals of the comparators A1 and A2, and triangular wave (f) is input to non-inversed input terminals of comparators A3 and A4.

Therefore, the output of the comparator A1 is 'H' from point X2 to point X3, and becomes the pulse a1. The output of the comparator A2 is 'H' from point X1 to point X3, and becomes the pulse c1. The output of the comparator A3 is 'H' from point Y2 to point Y3, and becomes the pulse b1. The output of the comparator A4 is 'H' from point Y1 to point Y3, and becomes the pulse d1.

The outputs of comparators A1 and A3 pass via an OR circuit OR1 and are input to a clock terminal of a D-flip-flop D1. The outputs of comparators A2 and A4 pass via an OR circuit OR2, and are input to a clock terminal of a D-flip-flop D2.

Therefore, the rise edge of the output of comparator A1 (pulse a1) becomes the input of the clock terminal of the D-flip-flop D1, and, since the level of the U-phase that becomes the D-input is 'H' at that time, the output Q of the D-flip-flop D1 is 'H'.

The rise edge of the output of comparator A3 (pulse b1) also becomes the input to the clock terminal of the D-flip-flop D1, and, since the level of the U-phase that becomes the D-input is 'L' at that time, the output Q is 'L'. Therefore, the output Q of the D-flip-flop D1 is 'H' from the rise edge of the pulse a1 until the rise edge of the pulse b1, obtaining a V-phase rectangular wave Rv.

The rise edge of the output of comparator A2 (pulse c1) becomes the input of the clock terminal of the D-flip-flop D2, and, since the level of the U-phase that becomes the D-input is 'H' at that time, the output Q of the D-flip-flop D2 is 'H', and the inverted output of output Q (Q-bar) is 'L'.

The rise edge of the output of comparator A4 (pulse d1) also becomes the input of the clock terminal of the D-flip-flop D2, and, since the level of the U-phase that becomes the D-input is 'L' at that time, the output Q is 'L', and the inverted output of output Q (Q-bar) is 'H'. Therefore, the inverted output (Q-bar) of the D-flip-flop D2 is 'H' from the rise edge of the pulse (d1) until the rise edge of the pulse (e1), obtaining a W-phase rectangular wave Rw.

The circuit described above can detect the phase of the AC output voltage of the 3-phase AC generator 1 from a signal from the U-phase sensor coil Su of the 3-phase AC generator 1, and, using as a reference a rectangular wave synchronized with this U-phase AC output voltage, can generate rectangular waves synchronized with the other two phases.

It is acceptable to provide a sensor coil in the V-phase of the 3-phase AC generator 1, and generate rectangular waves synchronized with the other two phases using as a reference a rectangular wave synchronized with this V-phase AC output voltage. Similarly, it is acceptable to provide a sensor coil in the W-phase of the 3-phase AC generator 1, and generate rectangular waves synchronized with the other two phases using as a reference a rectangular wave synchronized with this W-phase AC output voltage.

[Method of Generating Triangular Wave Voltage in U-, V-, W-phase Detection Circuit]

In the U-, V-, W-phase detection circuit 11, when generating V-phase and W-phase rectangular waves from a rectangular wave synchronized with the U-phase in the manner described above, it is necessary to generate a triangular wave having a height (peak voltage of the triangular wave) that is constant irrespective of the size of the pulse width of the U-phase rectangular wave. One example of a mechanism for generating a triangular wave having a constant peak voltage in synchronization with the rectangular wave Ru will be explained with reference to FIG. 4 and FIG. 5. The triangular wave-generating mechanism described here is also jointly used when generating triangular waves in the synchronous triangular wave generator 12 shown in FIG. 1.

Since the frequency of the AC voltage output from the 3-phase AC generator 1 generally does not change abruptly, the waveform of the present cycle can be regarded as almost the same as the waveform of the immediately previous cycle. For example, in FIG. 4, if the waveform is the present cycle, a half-cycle T2 of waveform 2 and a half-cycle T1 of the immediately previous waveform 1 are almost the same.

Using these characteristics, a triangular wave voltage VB is generated by the following procedures.

Figure 4:
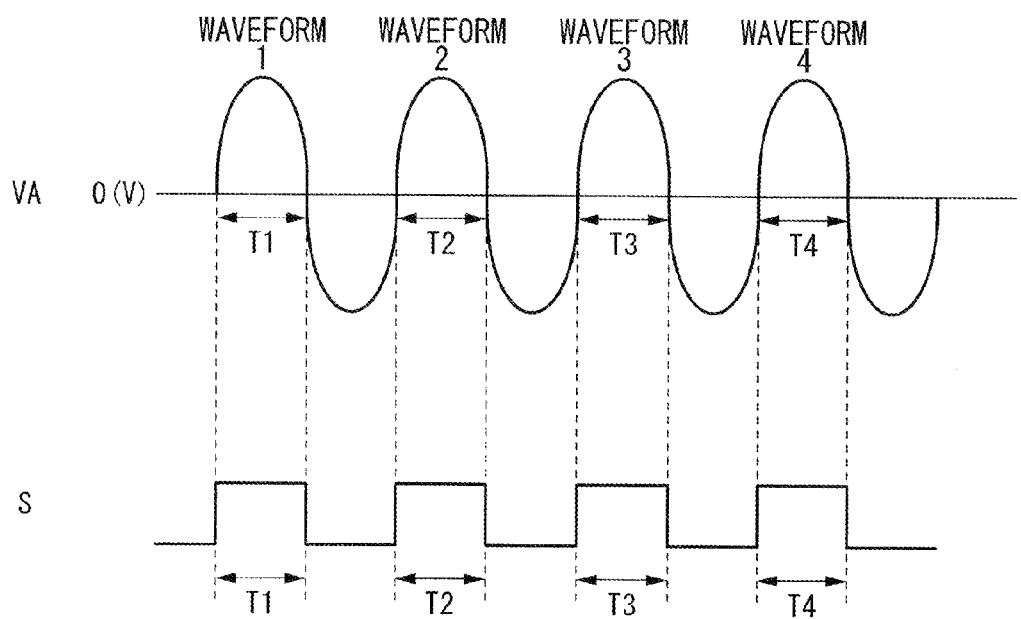
FIG. 4 is a timing chart that shows a rectangular wave synchronized with a U-phase alternate current (AC) voltage waveform.

(Procedure 1) As shown in FIG. 4, in the cycle of waveform 1, a rectangular wave S is generated from the AC voltage VA output by the 3-phase AC generator 1. A half-cycle of the rectangular wave S corresponding to the waveform 1 matches a half-cycle T1 of the AC voltage VA in the cycle of waveform 1.

(Procedure 2) The time of the half-cycle T1 of the rectangular wave S is counted.

(Procedure 3) The counted time of the half-cycle T1 is divided by a predetermined resolution n, obtaining time t1 (=T1/n). Here, resolution n is an amount that defines the smoothness of the slope of the triangular wave voltage VB; the higher the resolution n, the smoother the slope of the triangular wave voltage VB.

(Procedure 4) The peak voltage Vp of the triangular wave voltage VB is then divided by the predetermined resolution n, obtaining a voltage v1 (=Vp/n).

Figure 5:
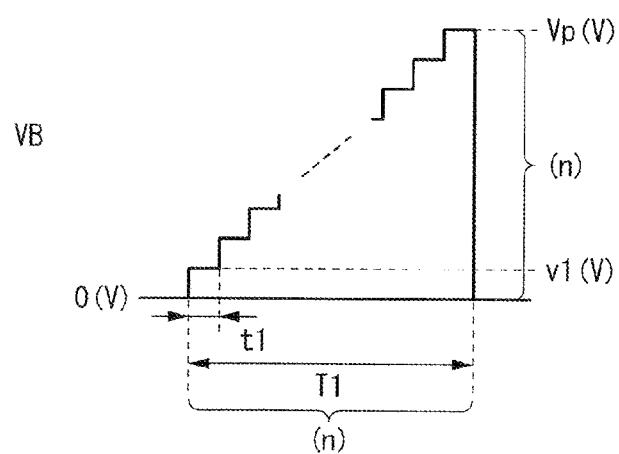
FIG. 5 is a timing chart that shows a mechanism for generating a triangular wave.

(Procedure 5) As shown in FIG. 5, at the rise timing of the waveform 2 of the next cycle (the timing for starting to count T2), the triangular wave voltage VB is increased by exactly voltage v1, and this triangular wave voltage VB is maintained for exactly the time t1.

(Procedure 6) In the same cycle of waveform 2, at the timing when the time t1 elapses, the triangular wave voltage VB is further increased by exactly the voltage v1, and this process is repeated a total of n times to obtain the step-like waveform shown in FIG. 5, thus obtaining a step-like waveform that corresponds to the sloping section of the triangular wave corresponding to the cycle of waveform 2. By increasing the value of the resolution n, the step-like waveform can be made smoother, and a superior triangular wave can be obtained.

By these procedures it is possible, using the waveform of the AC current voltage of the immediately previous cycle, to generate a triangular wave that corresponds to each cycle of the AC voltage VA and has a constant peak voltage Vp.

[Selection of Battery for Charging]

The battery charger 2 shown in this embodiment selects a battery for charging according to a predetermined priority.

A procedure will be explained whereby a battery for charging in compliance with its charge state is selected from batteries for which predetermined priorities are set.

Figure 6:
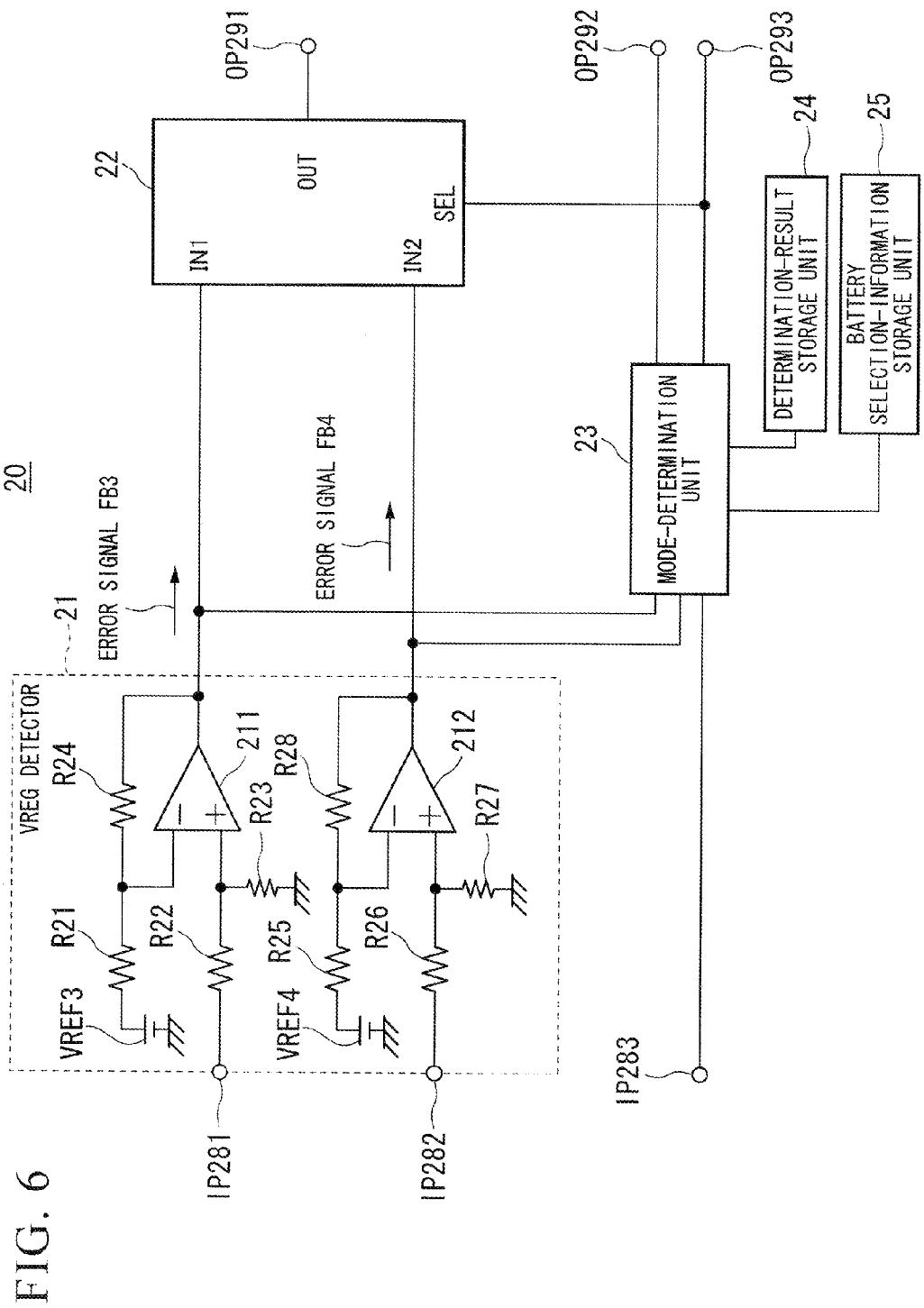
FIG. 6 is a circuit diagram that shows a charge-state detector.

FIG. 6 is a block diagram of the main configuration of the charge-state detector 20.

As shown in FIG. 6, the charge-state detector 20 includes the VREG detector 21, the error signal processor 22, the mode-determination unit 23, the determination-result storage unit 24, and the battery selection-information storage unit 25 according to the embodiment.

The VREG detector 21 of the charge-state detector 20 includes operational amplifiers 211 and 212, eight resistors R21 to R28, reference voltages VREF3 and VREF4, input terminals, and output terminals.

The connections in the VREG detector 21 are as follows.

One terminal of the resistor R21 connects to the reference voltage VREF3, and another terminal connects to an inversed input terminal of the operational amplifier 211.

One terminal of the resistor R22 connects to an input terminal IP281, and another terminal connects to a non-inversed input terminal of the operational amplifier 211.

One terminal of the resistor R23 connects to the non-inversed input terminal of the operational amplifier 211, and another terminal connects to a ground potential.

One terminal of the resistor R24 connects to an output terminal of the operational amplifier 211, and another terminal connects to the inversed input terminal of the operational amplifier 211.

One terminal of the resistor R25 connects to the reference voltage VREF4 and an inversed input terminal of the operational amplifier 212.

One terminal of the resistor R26 connects to the input terminal IP282 and a non-inversed input terminal of the operational amplifier 212.

One terminal of the resistor R27 connects to the non-inversed input terminal of the operational amplifier 212, and another terminal connects to a ground potential.

One terminal of the resistor R28 connects to the output terminal of the operational amplifier 212, and another terminal connects to the inversed input terminal of the operational amplifier 212.

A potential VREG3, obtained by dividing the voltage of battery 3 at a predetermined ratio, is input to the input terminal IP281.

The operational amplifier 211 amplifies the potential difference between the input battery potential VREG3 and the reference potential VREF3 by a gain set with the resistors R21 to R24, and outputs an error signal FB3.

A potential VREG4, obtained by dividing the voltage of battery 3 at a predetermined ratio, is input to the input terminal IP282.

The operational amplifier 212 amplifies the potential difference between the input battery potential VREG4 and the reference potential VREF4 by a gain set with the resistors R25 to R28, and outputs an error signal FB4.

When the error signals have negative values, this indicates that the battery has low voltage and is insufficiently charged.

When the error signals FB3 and FB4 have positive values, this indicates that the battery has a high voltage and is in a charged state.

The error signal processor 22 of the charge-state detector 20 is a signal-switching device.

In accordance with a switch signal input from the mode-determination unit 23 to a selection terminal SEL, the error signal processor 22 selects the error signal FB3 and the error signal FB4 of the two systems input to it from the VREG detector 21, and outputs an error signal to the output terminal OP291.

When the error signals have positive values, this indicates that the battery has a high voltage and is in a charged state.

The mode-determination unit 23 of the charge-state detector 20 determines the charge states of the batteries 3 and 4 in compliance with a result obtained by comparing the values of their voltages detected by the VREG detector 21 with predetermined reference potentials. The mode-determination unit 23 stores a determination result in the determination-result storage unit 24.

The mode-determination unit 23 selects a battery for charging based a result combining the charge states of the two batteries 3 and 4, and information for charging by priority (selection flag).

The mode-determination unit 23 stores the selection flag information in the battery selection-information storage unit 25, and refers to that stored information as a selection condition when selecting a battery for charging.

The mode-determination unit 23 outputs selection signals 1 and 2 as signals for identifying a battery selected for charging to the output terminals OP292 and OP293.

FIGS. 7A and 7B are explanatory diagrams of voltages of the batteries 3 and 4 detected by the VREG detector 21, and a method for selecting a battery for charging based on them.

FIG. 7A is a diagram of the voltage states of batteries 3 and 4.

Each voltage state is compared with a respective predetermined reference voltage.

This comparison produces four states achieved by combining the voltage states.

These four states will be explained based on FIGS. 7A and 7B.

In the first state, the voltages of both the batteries 3 and 4 are below the reference voltage. That is, both batteries are insufficiently charged (hereinafter 'mode 1').

In the second state, the voltage of battery 3 is equal to or above the reference voltage, but the voltage of battery 4 is below the reference voltage. That is, battery 3 is completely charged as stipulated, whereas battery 4 is insufficiently charged (hereinafter 'mode 2').

In the third state, the voltage of battery 4 is equal to or above the reference voltage, but the voltage of battery 3 is below the reference voltage. That is, battery 4 is completely charged as stipulated, whereas battery 3 is insufficiently charged (hereinafter 'mode 3').

In the fourth state, the voltages of both the batteries 3 and 4 are equal to or above the reference voltage. That is, both batteries are completely charged as stipulated (hereinafter 'mode 4').

The decision of whether to charge battery 3 or battery 4 is made using these four states as references. Conditions can be stipulated by the four modes, the charge process for each mode being shown in FIG. 7B.

In mode 1, since both batteries are insufficiently charged, they must be charged by distributing power to them.

In mode 2, since battery 3 is completely charged, only battery 4 is charged.

In mode 3, since battery 4 is completely charged, only battery 3 is charged.

In mode 4, since both batteries are completely charged, neither is charged.

Methods of distributing power to the batteries 3 and 4 in mode 1 will be explained.

The following distribution methods can be considered.

A first means enables both batteries 3 and 4 to be charged simultaneously by simultaneously bringing rectifier elements of their respective systems to an electrically-conductive state.

A second means alternately charges the batteries 3 and 4 by alternately bringing their rectifier elements to a conductive state.

In the first means, while both systems can be brought to an electrically-conductive state, sometimes the power supply is actually biased toward the system having a lower actual battery voltage, or having a heavier load connected to its battery, and the other battery is not charged. This makes it impossible to fully charge each battery.

This embodiment employs the second means, which will be explained.

The condition for alternate charging is mode 1, in which both batteries need charging. Modes 2 and 3 are not conditions for alternate charging, since the battery that needs charging is stipulated in the determination result. In mode 4, both batteries do not need charging, and alternate charging is obviously not necessary.

Accordingly, when modes 2, 3, and 4 are selected, the selection flag is cleared.

On the other hand, when it is necessary to give priority to a specific battery for charging, even in the alternate charging of mode 1, the battery that will be charged first must be specified. A battery that will be charged first in mode 1 can be specified using the selection flag described above.

As already explained, the selection flag is cleared when modes 2, 3, and 4 are selected, When the condition for newly selecting mode 1 is reached, if the battery for charging is selected by referring to the flag, alternate charging can start with the specific battery first. In alternate charging, the selection flag is set when the battery for priority charging has been charged, and cleared when the non-priority battery has been charged, enabling the batteries to be alternately charging by referring to the selection flag.

Figure 8:
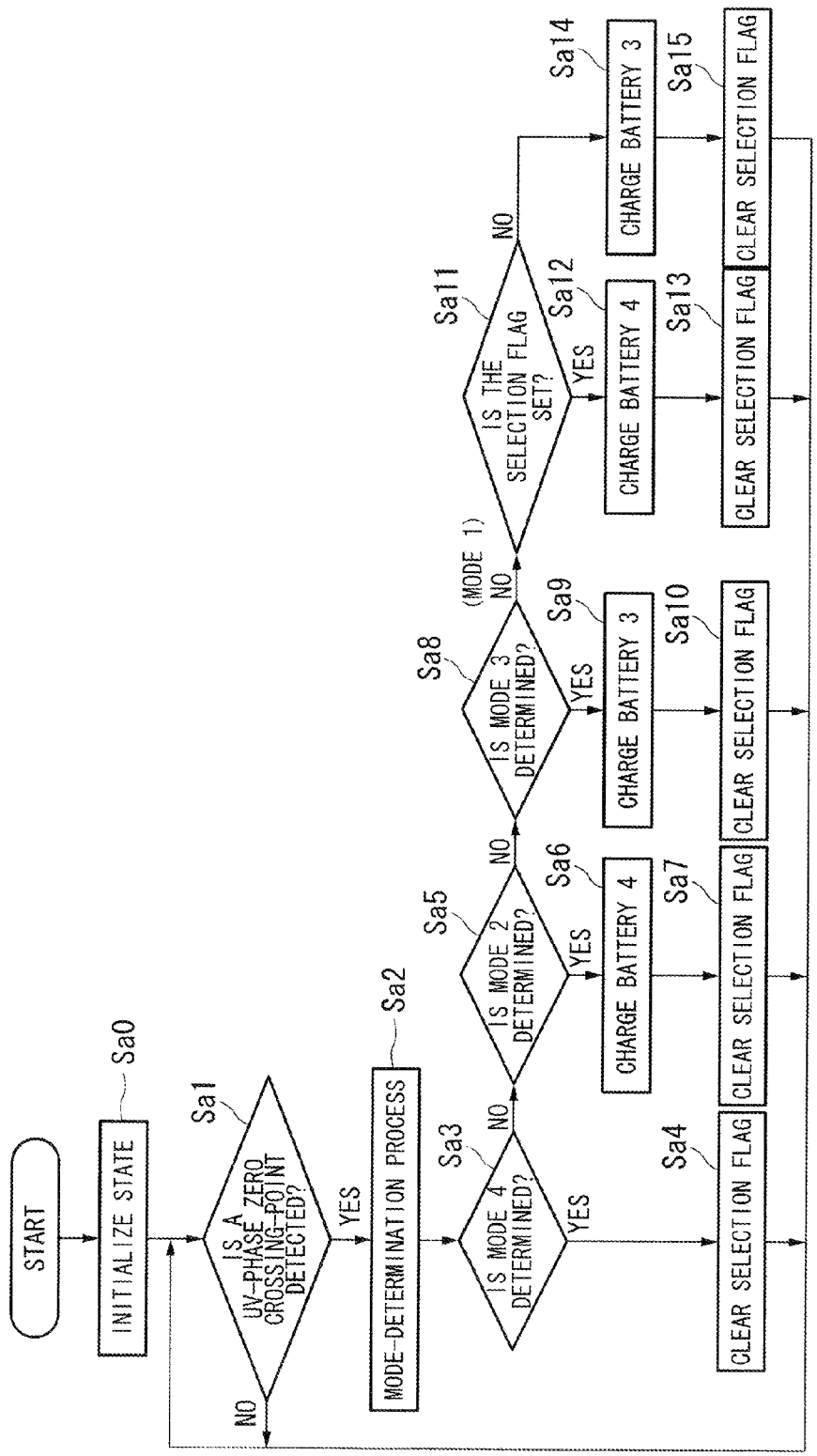
FIG. 8 is a flow chart that shows a switching procedure relating to a mode selected in the charge-state detector.

FIG. 8 is a flowchart of processes relating to mode-determination by the mode-determination unit 23 of the four states shown in FIGS. 7A and 7B.

The following processes relating to mode-determination and selection of battery for charging based on that determination is performed by the mode-determination unit 23 of the charge-state detector 20.

In an initial state process, the mode-determination unit 23 stores information indicating initial values (clear) in the determination-result storage unit 24 and the battery selection-information storage unit 25, which are storage regions for storing states (step Sa0).

Based on a synchronous signal output from the U-, V-, W-phase detection circuit 11 of the synchronous signal detector 10, the mode-determination unit 23 of the charge-state detector 20 repeatedly determines whether the phase is 0° when the U-phase and V-phase line-to-line voltages (hereinafter 'UV-phase') are taken as references (step Sa1).

The mode-determination unit 23 performs the mode-determination process when, according to the signal input from the synchronous signal detector 10, the phase of the UV-phase is 0°.

The mode-determination process is performed by the following procedure.

Firstly, the VREG detector 21 detects the voltages of the batteries 3 and 4 when the phase of the UV-phase is 0°. The VREG detector 21 inputs the result of a comparison between the detected voltages of the batteries 3 and 4 and reference voltages to the mode-determination unit 23. From the four battery charge states obtained by combining the input comparison results, the mode-determination unit 23 determines four modes categorized for each process needed at that time (step Sa2).

The mode-determination unit 23 determines whether the determination result is mode 4 (step Sa3).

When the determination result is mode 4, the mode-determination unit 23 determines that neither of the batteries will be charged, and outputs selection signals indicating that it does not select either of the batteries. Selection signals 1 and 2 output by the mode-determination unit 23 are both output as '0'.

The mode-determination unit 23 also clears the selection flag and stores this information in the battery selection-information storage unit 25. It then detects when the next UV-phase is 0° (step Sa4).

When the determination result is not mode 4, the mode-determination unit 23 determines whether it is mode 2 (step Sa5).

When the determination result is mode 2, the mode-determination unit 23 selects that battery 4 will be charged, and outputs selection signals that select battery 4. In the selection signals output by the mode-determination unit 23, selection signal 1 is output as '0' and selection signal 2 is output as '1' (step Sa6).

The mode-determination unit 23 clears the selection flag and stores this in the battery selection-information storage unit 25. It then detects when the next UV-phase is 0° (step Sa7).

When the determination result is not mode 2, the mode-determination unit 23 determines whether it is mode 3 (step Sa8).

When the determination result is mode 3, the mode-determination unit 23 selects that battery 3 will be charged, and outputs selection signals that select battery 3. In the selection signals output by the mode-determination unit 23, selection signal 1 is output as '1' and selection signal 2 is output as '0' (step Sa9).

The mode-determination unit 23 also clears the selection flag and stores this in the battery selection-information storage unit 25. It then detects when the next UV-phase is 0° (step Sa10).

The mode-determination unit 23 refers to the selection flag information stored in the battery selection-information storage unit 25, and determines whether the selection flag is set (step Sa11).

When the mode-determination unit 23 determines that the selection flag is set, it selects that the battery 4 will be charged, and outputs selection signals for selecting battery 4. In the selection signals output by the mode-determination unit 23, selection signal 1 is output as '0' and selection signal 2 is output as '1' (step Sa12).

The mode-determination unit 23 clears the selection flag and stores this information in the battery selection-information storage unit 25. It then detects when the next UV-phase is 0° (step Sa13).

The mode-determination unit 23 refers to the selection flag information stored in the battery selection-information storage unit 25, and determines whether the selection flag is set; when it determines that the selection flag is not set, the mode-determination unit 23 selects that the battery 3 will be charged, and outputs selection signals for selecting battery 3. In the selection signals output by the mode-determination unit 23, selection signal 1 is output as '1' and selection signal 2 is output as '0' (step Sa14).

The mode-determination unit 23 clears the selection flag and stores this information in the battery selection-information storage unit 25. It then detects when the next UV-phase is 0° (step Sa15).

By performing the detection process in compliance with the flowchart described above, the mode-determination unit 23 specifies a battery for charging.

Referring to FIG. 9A to FIG. 10C, a process of controlling the conduction of a thyristor using phase-control to control the charge amount, performed by the rectification processor 40, will be explained.

Figure 9A:
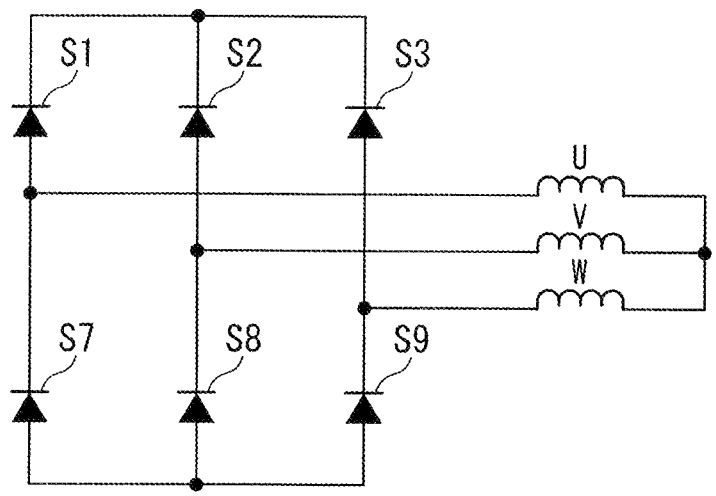
FIG. 9A is a circuit diagram that shows a thyristor-firing method by phase-angle control and conduction times.

FIG. 9A is a diagram of connections between six thyristors S1 to S3 and S7 to S9 connected to the battery 3, and the 3-phase AC generator 1.

As already mentioned, thyristors S1 and S7 are connected to the U-phase of the 3-phase AC generator 1, thyristors S2 and S8 are connected to the V-phase, and thyristors S3 and S9 are connected to the W-phase. For details of these connections, refer to FIG. 1.

Unlike a diode, the timing of starting conduction of a thyristor can be controlled by inputting a signal for firing the thyristor to its gate.

The thyristors that become targets for control when charging from the respective wire-to-wire voltages are as follows.

The thyristors fired in waveform UV are thyristors S1 and S8.

The thyristors fired in waveform UW are thyristors S1 and S9.

The thyristors fired in waveform VV are thyristors S2 and S9.

The thyristors fired in waveform VU are thyristors S2 and S7.

The thyristors fired in waveform WU are thyristors S3 and S7.

The thyristors fired in waveform WV are thyristors S3 and S8.

Figure 9B:
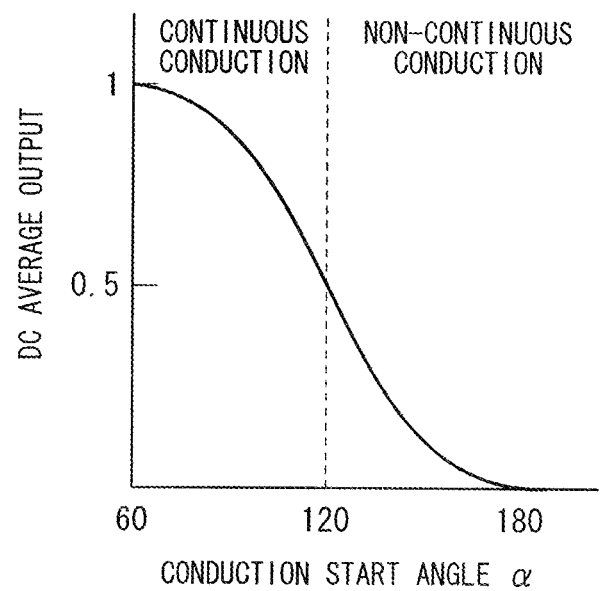
FIG. 9B is a circuit diagram that shows the thyristor-firing method by the phase-angle control and the conduction times.

FIG. 9B is a graph of the average direct current (DC) output when conduction has started in each phase.

The x-axis represents the phase angle when conduction starts. The x-axis has values from 60° to 180°. The y-axis is the average DC output output to the battery from the start of conduction to the end of conduction at 180°. The y-axis value expresses the rate when the average DC output is 1 at a conduction angle of 60°. As shown in graph, the faster the phase at the start of conduction, the greater the output power.

Figure 10A:
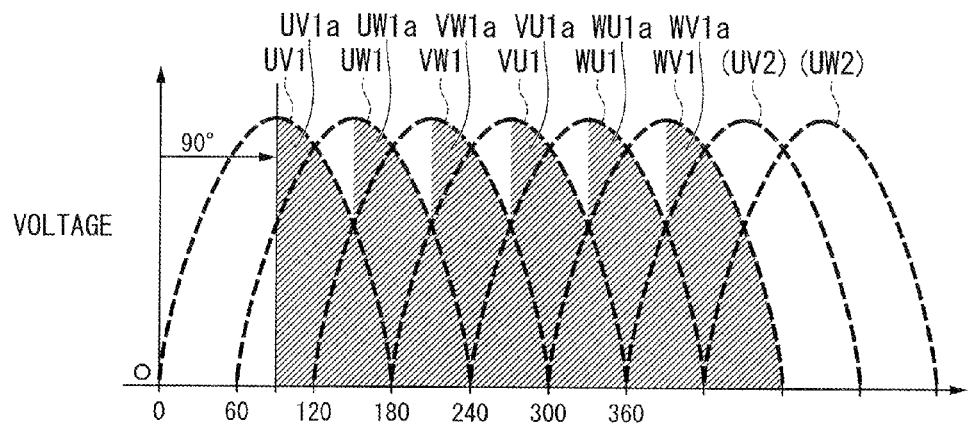
FIG. 10A is a timing chart that shows the thyristor-firing method by the phase-angle control and the conduction times.
Figure 10B:
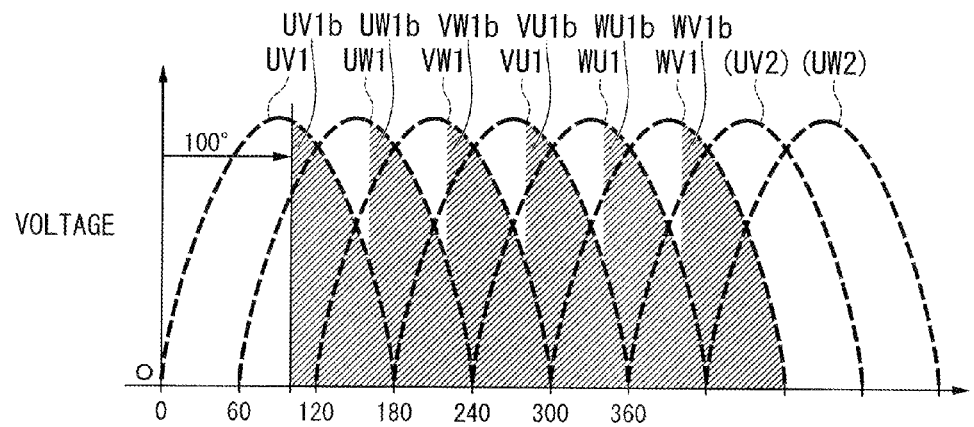
FIG. 10B is a timing char that shows the thyristor-firing method by the phase-angle control and the conduction times.
Figure 10C:
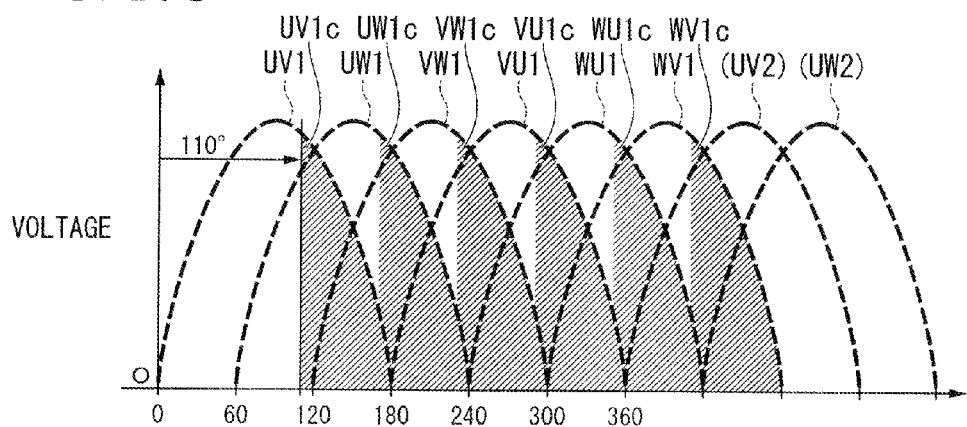
FIG. 10C is a timing chart that shows the thyristor-firing method by the phase-angle control and the conduction times.

FIGS. 10A to 10C are diagrams of changes in the duration of conduction of thyristors when the timings of the start of conduction are controlled by controlling their gates.

Here, the x-axis is the phase angle when 0 is designated as the origin, and the y-axis is the voltage of the all-wave-rectified waveform.

The waveforms indicated by dotted lines in FIGS. 10A to 10C are voltage waveforms when the line-to-line voltage waveform of the 3-phase AC current is all-wave-rectified. These waveforms are obtained by arranging waveforms of AC half-cycles at a phase difference of 60° each time.

Since the AC current is all-wave-rectified, these six waveforms express one cycle. Taking the UV-phase as a reference, the waveforms are designated with codes of UV1, UW1, VW1, VU1, WU1, and WV1. Waveform UV1 is the waveform of the line-to-line voltage with the U-phase taking the V-phase as a reference, and expresses the waveform of the duration when the phase voltage of the U-phase increases. Conversely, waveform VU1 is the waveform of the line-to-line voltage with the U-phase taking the V-phase as a reference, and expresses the waveform of the duration when the phase voltage of the U-phase decreases, the value being positive due to the all-wave-rectification.

In the following explanation, the starting-point of waveform UV1 is designated as the origin of one cycle of the line-to-line output voltage of the 3-phase AC generator 1. That is, the origin is when the phase angle is 0°.

In FIGS. 10A to 10C, the shaded areas represent differences in the conduction times of the thyristors when their conduction angles are delayed by 90°, 100°, and 110° with respect to a reference phase of 0°.

Here, each thyristor is fired at a timing delayed by the same conduction start angle with respect to the waveform of the respective line-to-line voltage. That is, conduction waveforms UV1a, UW1a, VW1a, VU1a, WU1a, WV1a and so on are shown with respect to reference phases of waveforms UV1, UW1, VW1, VU1, WU1, and WV1.

The conduction start angles of the waveforms are aligned.

The conduction start angles of thyristors 51 to S9 can be set within a range of 60° to 180° in their respective phases.

A fired thyristor maintains its conductive state until a reverse bias voltage is applied.

By controlling the duration of the conductive state of the thyristors in this way, power from the 3-phase AC generator 1 to the battery 3 is restricted, and the charge amount is controlled.

Figure 11:
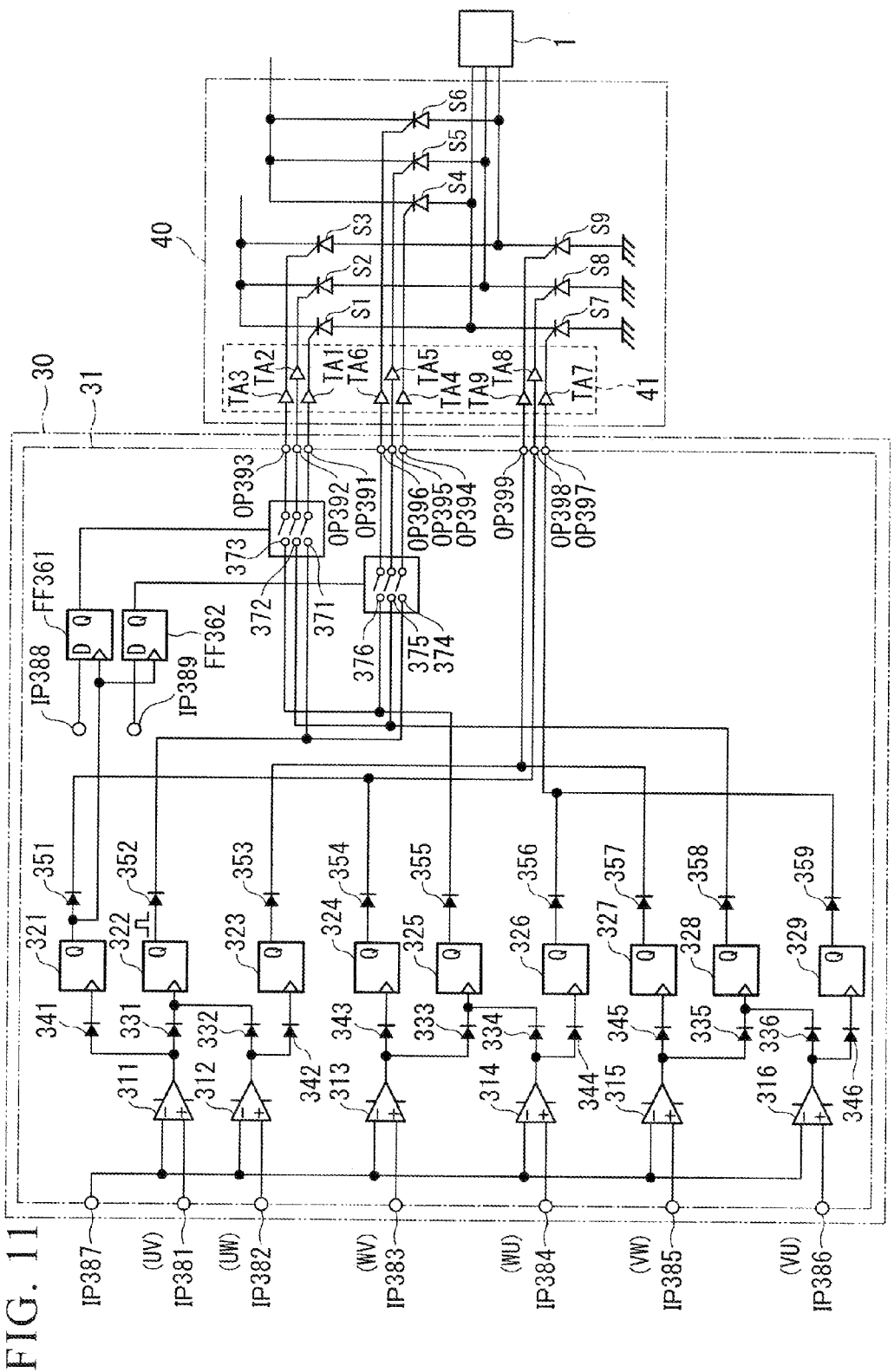
FIG. 11 is a circuit diagram that shows an example of a charge controller (firing-sequence generator).

FIG. 11 is a schematic circuit diagram that shows the charge controller 30 and the firing-sequence generator 31 which connect with the 3-phase AC generator 1, the charge-state detector 20, and the rectification processor 40.

The charge controller 30 mainly includes a firing-sequence generator 31.

The firing-sequence generator 31 includes six comparators 311 to 316, nine pulse generators 321 to 329, twenty-three diodes D331 to D336, D341 to D346, D351 to D359, two D-flip-flops FF361 to FF362, six switches 371 to 376, input terminals IP381 to IP389, and output terminals OP391 to OP399.

Each of the comparators 311 to 316 has two input terminals and an output terminal; it compares the voltages of analog signals input to the input terminals and logically outputs a determination result. When the voltage of a first input terminal is higher than the voltage of the second input terminal, 'H' (high) is output from the output terminal.

The pulse generators 321 to 329 are one-shot circuits that detect the rise edge of a signal input to a trigger input, and, when they detect it, they output a pulse that is 'H' for a predetermined duration. In an initial state, their output terminals output 1 (not shown).

When the D-flip-flops FF361 to FF362 detect the rise edge of a signal input to a clock input terminal, they maintain the logical state of the signal input to a D input terminal, and output to the output terminal. The state of the output terminal Q is maintained until the next detection of the rise edge of a signal input to the clock input terminal. In an initial state, their output terminals of the D-flip-flops FF361 to FF362 output 'L' (not shown).

The switches 371 to 376 are single-pole/single-throw switches with control functions, and become conductive when 'H' is input to their control terminals.

Subsequently, connections of the main parts will be explained.

The first input terminal of comparator 311 connects to input terminal IP381, the second input terminal connects to input terminal IP387, and the output terminal connects to anodes of diodes D331 and D341.

The clock input terminal of pulse generator 321 connects to the cathode of diode D341, and the output terminal connects to the anode of diode D351.

The cathode of diode D351 connects to the output terminal OP398.

The first input terminal of comparator 312 connects to input terminal IP382, the second input terminal connects to input terminal IP387, and the output terminal connects to anodes of diodes D332 and D342.

The clock input terminal of pulse generator 323 connects to the cathode of diode D342, and the output terminal connects to the anode of diode D353.

The cathode of diode D353 connects to the output terminal OP399.

The clock input terminal of pulse generator 322 connects to the cathodes of diodes D331 and D332, and the output terminal connects to the anode of diode D352. Diodes D331 and D332 logically add the signals input to their anodes, and input to pulse generator 322.

The first input terminal of comparator 313 connects to input terminal IP383, the second input terminal connects to input terminal IP387, and the output terminal connects to anodes of diodes D333 and D343.

The clock input terminal of pulse generator 324 connects to the cathode of diode D343, and the output terminal connects to the anode of diode D354.

The cathode of diode D354 connects to the output terminal OP398.

The first input terminal of comparator 312 connects to input terminal IP382, the second input terminal connects to input terminal IP387, and the output terminal connects to anodes of diodes D334 and D344.

The clock input terminal of pulse generator 326 connects to the cathode of diode D344, and the output terminal connects to the anode of diode D356.

The cathode of diode D356 connects to the output terminal OP397.

The clock input terminal of pulse generator 325 connects to the cathodes of diodes D333 and D334, and the output terminal connects to the anode of diode D355. Diodes D333 and D334 logically add the signals input to their anodes, and input to pulse generator 325.

The first input terminal of comparator 311 connects to input terminal IP385, the second input terminal connects to input terminal IP387, and the output terminal connects to anodes of diodes D335 and D345.

The clock input terminal of pulse generator 321 connects to the cathode of diode D345, and the output terminal connects to the anode of diode D356.

The cathode of diode D356 connects to the output terminal OP397.

The first input terminal of comparator 312 connects to input terminal IP386, the second input terminal connects to input terminal IP387, and the output terminal connects to anodes of diodes D336 and D346.

The clock input terminal of pulse generator 323 connects to the cathode of diode D346, and the output terminal connects to the anode of diode D357.

The cathode of diode D357 connects to the output terminal OP399.

The clock input terminal of pulse generator 326 connects to the cathodes of diodes D335 and D336, and the output terminal connects to the anode of diode D358. Diodes D335 and D336 logically add the signals input to their anodes, and input to pulse generator 328.

The D-input of D-flip-flop FF361 connects to input terminal 388, the clock input terminal connects to the output terminal of pulse generator 321, and the output terminal connects to control terminals of switches 371, 372, and 373.

The D-input of D-flip-flop FF362 connects to input terminal 389, the clock input terminal connects to the output terminal of pulse generator 321, and the output terminal connects to control terminals of switches 374, 375, and 376.

One end of the signal terminal of switch 371 connects to the cathode of diode 352, and another end of the signal terminal connects to output terminal OP391.

One end of the signal terminal of switch 372 connects to the cathode of diode 358, and another end of the signal terminal connects to output terminal OP392.

One end of the signal terminal of switch 373 connects to the cathode of diode 355, and another end of the signal terminal connects to output terminal OP393.

One end of the signal terminal of switch 374 connects to the cathode of diode 352, and another end of the signal terminal connects to output terminal OP394.

One end of the signal terminal of switch 375 connects to the cathode of diode 358, and another end of the signal terminal connects to output terminal OP395.

One end of the signal terminal of switch 376 connects to the cathode of diode 355, and another end of the signal terminal connects to output terminal OP396.

The input terminal IP381 connects to the synchronous signal detector 10, and a triangular wave taking a waveform DLTUV as a reference is input to it from the synchronous signal detector 10.

The input terminal IP382 connects to the synchronous signal detector 10, and a triangular wave taking a waveform DLTUW as a reference is input to it from the synchronous signal detector 10.

The input terminal IP383 connects to the synchronous signal detector 10, and a triangular wave taking a waveform DLTWV as a reference is input to it from the synchronous signal detector 10.

The input terminal IP384 connects to the synchronous signal detector 10, and a triangular wave taking a waveform DLTWU as a reference is input to it from the synchronous signal detector 10.

The input terminal IP385 connects to the synchronous signal detector 10, and a triangular wave taking a waveform DLTVW as a reference is input to it from the synchronous signal detector 10.

The input terminal IP386 connects to the synchronous signal detector 10, and a triangular wave taking a waveform DLTVU as a reference is input to it from the synchronous signal detector 10.

The input terminal IP387 connects to output terminal OP291 of the charge-state detector 20, and an error signal is input to it from the charge-state detector 20.

The input terminal IP388 connects to output terminal OP292 of the charge-state detector 20, and an error signal is input to it from the charge-state detector 20.

The input terminal IP389 connects to output terminal OP293 of the charge-state detector 20, and an error signal is input to it from the charge-state detector 20.

The output terminal OP391 connects to the thyristor-firing circuit 41 of the rectification processor 40, and connects via the driver circuit TA1 to the gate of thyristor S1. The output terminal OP391 outputs a timing signal for firing the thyristor S1 in the U-phase.

The output terminal OP392 connects to the thyristor-firing circuit 41 of the rectification processor 40, and connects via the driver circuit TA2 to the gate of thyristor S2. The output terminal OP392 outputs a timing signal for firing the thyristor S2 in the V-phase.

The output terminal OP393 connects to the thyristor-firing circuit 41 of the rectification processor 40, and connects via the driver circuit TA3 to the gate of thyristor S3. The output terminal OP393 outputs a timing signal for firing the thyristor S3 in the W-phase.

The output terminal OP394 connects to the thyristor-firing circuit 41 of the rectification processor 40, and connects via the driver circuit TA4 to the gate of thyristor S4. The output terminal OP394 outputs a timing signal for firing the thyristor S4 in the U-phase.

The output terminal OP395 connects to the thyristor-firing circuit 41 of the rectification processor 40, and connects via the driver circuit TA5 to the gate of thyristor S5. The output terminal OP395 outputs a timing signal for firing the thyristor S5 in the V-phase.

The output terminal OP396 connects to the thyristor-firing circuit 41 of the rectification processor 40, and connects via the driver circuit TA6 to the gate of thyristor S6. The output terminal OP396 outputs a timing signal for firing the thyristor S6 in the W-phase.

The output terminal OP397 connects to the thyristor-firing circuit 41 of the rectification processor 40, and connects via the driver circuit TA7 to the gate of thyristor S7. The output terminal OP397 outputs a timing signal for firing the thyristor S7 in the U-phase.

The output terminal OP398 connects to the thyristor-firing circuit 41 of the rectification processor 40, and connects via the driver circuit TA8 to the gate of thyristor S8. The output terminal OP398 outputs a timing signal for firing the thyristor S8 in the V-phase.

The output terminal OP399 connects to the thyristor-firing circuit 41 of the rectification processor 40, and connects via the driver circuit TA9 to the gate of thyristor S9. The output terminal OP399 outputs a timing signal for firing the thyristor S9 in the W-phase.

An operation of the firing-sequence generator 31 will be explained with reference to FIG. 12.

Figure 12:
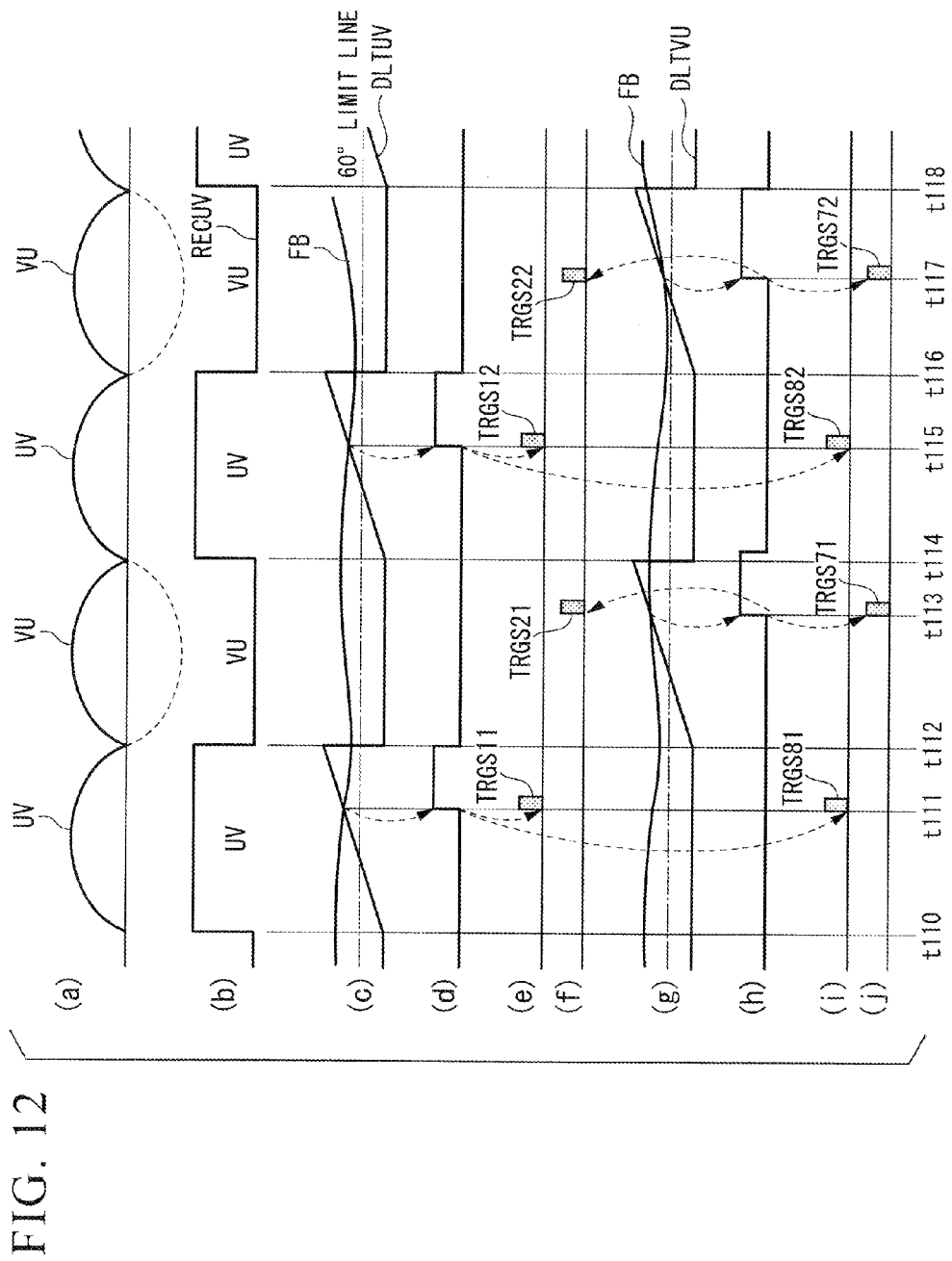
FIG. 12 is a timing chart that shows firing timings.

FIG. 12 is a diagram of the principles for generating a firing signal for a corresponding thyristor when rectifying a UV line-to-line voltage.

In FIG. 12, the x-axis represents time elapsed. The period from time t110 until time t118 corresponds to two cycles of the output frequency of the 3-phase AC generator 1.

Graph (a) is a waveform of the absolute value of the UV line-to-line voltage output of the 3-phase AC generator 1. That is, it is an all-wave-rectified waveform.

Using the time when the voltage waveform is 0V, values are determined sequentially at times t110, t112, t114, t116, and t118.

Graph (b) expresses change in the rectangular wave RECUV synchronized with the UV line-to-line voltage output of the 3-phase AC generator 1 shown in graph (a).

If the period when the rectangular wave RECUV shown in graph (b) is at the 'H' level is a period when the UV line-to-line voltage output has a positive value, the period when it is at the 'L' level is a period when the UV line-to-line voltage output has a negative value.

The waveform DLTUV constituting a first waveform shown in graph (c) is synchronized with the UV line-to-line voltage output, and is a reference waveform that alternately switches between, from time t110 until time t112, a triangular wave that monotonously increases from an initial value, and, from time t112 until time t114, a waveform that continuously has the initial value of the previous triangular wave.

The signal of this waveform corresponds to the signal input from the synchronous signal detector 10 to the input terminal IP381 of the firing-sequence generator 31.

The waveform FB constituting a second waveform is the waveform of an error signal that the charge-state detector 20 generates based on the difference between the potential of the battery 3 input to the charge-state detector 20 and the reference potential VREF3, and inputs to the charge controller 30.

The waveform shown in graph (d) is an output signal of the comparator 311, which the two signals shown in graph (b) were input to.

When the voltage of the input waveform DLTUV constituting the first waveform is higher than the voltage of the waveform FB constituting the second waveform, 'H' is output (from time t111 until t112, etc.).

The pulse shown in graph (e) is output from the pulse generator 332 which the signal of graph (d) was input to. A signal for firing the thyristor S1 is based on this signal.

The pulse shown in graph (f) is output from the pulse generator 328 which the signal of graph (h) was input to. A signal for firing the thyristor S2 is based on this signal.

The waveform DLTVU constituting a first waveform shown in graph (g) is synchronized with the UV line-to-line voltage output, and is a reference waveform that alternately switches between, from time t112 until time t114, a triangular wave that monotonously increases from an initial value, and, from time t114 until time t116, a waveform that continuously has the initial value of the previous triangular wave.

The signal of this waveform corresponds to the signal input from the synchronous signal detector 10 to the input terminal IP386 of the firing-sequence generator 31.

The waveform FB constituting a second waveform is the waveform of an error signal that the charge-state detector 20 generates based on the difference between the potential of the battery 3 input to the charge-state detector 20 and the reference potential VREF3, and inputs to the charge controller 30.

The waveform shown in graph (h) is an output signal of the comparator 316, which the two signals shown in graph (g) were input to.

When the voltage of the input waveform DLTVU constituting the first waveform is higher than the voltage of the waveform FB constituting the second waveform, 'H' is output (from time t113 until t114, etc.).

The pulse shown in graph (i) is output from the pulse generator 332 which the signal of graph (d) was input to. A signal for firing the thyristor S8 is based on this signal.

The pulse shown in graph (j) is output from the pulse generator 328 which the signal of graph (h) was input to. A signal for firing the thyristor S7 is based on this signal.

Firstly, (b) the synchronous signal detector 10 raises the rectangular wave RECUV input to the charge-state detector 20 at time t110 in synchronization with the AC output from the 3-phase AC generator 1, and (c) the synchronous signal detector 10 also gradually increases the voltage of the waveform DLTUV input to the charge-state detector 20.

(c) At time t111, when the voltage of the waveform DLTUV input to the charge-state detector 20 from the synchronous signal detector 10 is higher than the voltage of the waveform FB of the error signal input to the charge controller 30 by the charge-state detector 20, (d) the output of comparator 311 of the charge controller 30 that detected the change in the voltage is inverted to 'H'.

When pulse generators 322 and 321 of the charge controller 30 detect the rise edge of the output of comparator 311, the charge controller 30 outputs thyristor-firing control signals TRGS11(e) and TRGS81(i).

When these firing control signals are input to thyristors S1 and S8, these thyristors are fired and start conducting.

At time t112, thyristors S1 and S8 are blocked by a reverse bias.

Subsequently, (b) the synchronous signal detector 10 lowers the rectangular wave RECUV input to the charge-state detector 20 at time t112 in synchronization with the AC output from the 3-phase AC generator 1, (c) the synchronous signal detector 10 lowers the waveform DLTUV input to the charge-state detector 20, and (g) the synchronous signal detector 10 also gradually increases the voltage of the waveform DLTVU input to the charge-state detector 20.

(g) At time t113, when the voltage of the waveform DLTVU input to the charge-state detector 20 from the synchronous signal detector 10 is higher than the voltage of the waveform FB of the error signal input to the charge controller 30 by the charge-state detector 20, (h) the output of comparator 316 of the charge controller 30 that detected the change in the voltage is inverted to 'H'.

When pulse generators 328 and 329 of the charge controller 30 detect the rise edge of the output of comparator 316, the charge controller 30 outputs thyristor-firing control signals TRGS21(f) and TRGS71(j).

When these firing control signals are input to thyristors S2 and S7, these thyristors are fired and start conducting.

At time t114, thyristors S2 and S7 are blocked by a reverse bias.

This operation is repeated with reference to the signal of each phase, whereby the charge amount from the 3-phase AC is controlled.

By way of explanation, the example shown in FIG. 12 is one where battery 3 is charged.

To explain the charging of battery 4, thyristors S1 to S3 can be replaced in the description with thyristors S4 to S6, and battery 3 can be replaced with battery 4.

A scheme for determining the conduction start angles of each of the three phases will be explained while referring to FIG. 13.

Figure 13:
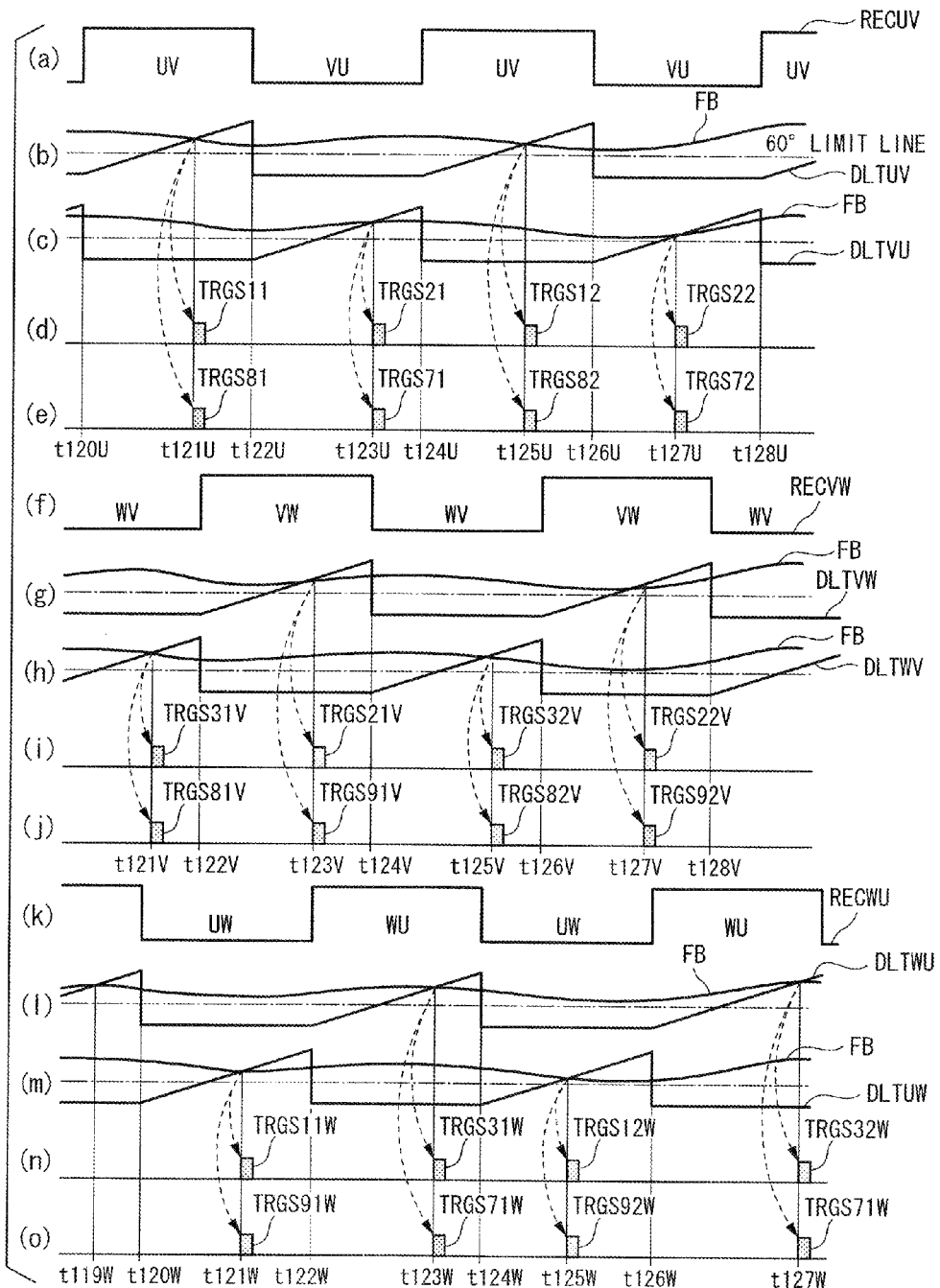
FIG. 13 is a timing chart that shows firing timings.

FIG. 13 is a timing chart of operation in the UV-phase shown in FIG. 12 for all three phases.

Graph (a) expresses change in the waveform RECUV generated by the synchronous signal detector 10 as a signal synchronized with the UV line-to-line voltage of the 3-phase AC generator 1.

Using the time when the voltage waveform is 0V, values are determined sequentially at times t120U, t122U, t124U, t126U, and t128U.

If the period when the rectangular wave RECU of this graph is at the 'H' level is a period when the UV line-to-line voltage output has a positive value, the period when it is at the 'L' level is a period when the UV line-to-line voltage output has a negative value.

The waveform DLTUV constituting a first waveform shown in graph (b) is synchronized with the UV line-to-line voltage output, and is a reference waveform that alternately switches between, from time t120U until time t122U, a triangular wave that monotonously increases from an initial value, and, from time t122U until time t124U, a waveform that continuously has the initial value of the previous triangular wave.

The signal of this waveform corresponds to the signal input from the synchronous signal detector 10 to the input terminal IP381 of the firing-sequence generator 31.

The waveform FB constituting a second waveform is the waveform of an error signal that the charge-state detector 20 generates based on the difference between the potential of the battery 3 input to the charge-state detector 20 and the reference potential VREF3, and inputs to the charge controller 30.

The waveform DLTVU constituting a first waveform shown in graph (c) is synchronized with the UV line-to-line voltage output, and is a reference waveform that alternately switches between, from time t122U until time t124U, a triangular wave that monotonously increases from an initial value, and, from time t124U until time t126U, a waveform that continuously has the initial value of the previous triangular wave.

The signal of this waveform corresponds to the signal input from the synchronous signal detector 10 to the input terminal IP386 of the firing-sequence generator 31.

The waveform FB constituting a second waveform is the waveform of an error signal that the charge-state detector 20 generates based on the difference between the potential of the battery 3 input to the charge-state detector 20 and the reference potential VREF3, and inputs to the charge controller 30.

The waveform shown in graph (d) is a control signal for firing the thyristors S1 and S2 that the charge controller 30 outputs to the rectification processor 40 when the charge controller 30 determines that the voltage of the first waveform DLTUV shown in graph (b) and the voltage of the first waveform DLTVU shown in graph (c) are higher than the voltage of the second waveform FB.

The generation position of this pulse is that of a timing pulse for firing a thyristor connected to the positive pole of the battery.

The waveform shown in graph (e) is a control signal for firing thyristors S7 and S8 that the charge controller 30 outputs to the rectification processor 40 when the charge controller 30 determines that the voltage of the first waveform DLTUV shown in graph (b) and the voltage of the first waveform DLTVU shown in graph (c) are higher than the voltage of the second waveform FB.

The generation position of this pulse is that of a timing pulse for firing a thyristor connected to the negative pole of the battery.

Graph (f) represents the change in a rectangular wave RECVW generated by the synchronous signal detector 10 as a signal in synchronization with the VW line-to-line voltage output of the 3-phase AC generator 1.

Using the time when the VW-phase voltage waveform is 0V as a reference, values are determined sequentially at times t122V, t124V, t126V, and t128V.

If the period when the rectangular wave RECV of this graph is at the 'H' level is a period when the VW line-to-line voltage output has a positive value, the period when it is at the 'L' level is a period when the VW line-to-line voltage output has a negative value.

The waveform DLTVW constituting a first waveform shown in graph (g) is synchronized with the VW line-to-line voltage output, and is a reference waveform that alternately switches between, from time t122V until time t124V, a triangular wave that monotonously increases from an initial value, and, from time t124V until time t126V, a waveform that continuously has the initial value of the previous triangular wave.

The signal of this waveform corresponds to the signal input from the synchronous signal detector 10 to the input terminal IP385 of the firing-sequence generator 31.

The waveform FB constituting a second waveform is the waveform of an error signal that the charge-state detector 20 generates based on the difference between the potential of the battery 3 input to the charge-state detector 20 and the reference potential VREF3, and inputs to the charge controller 30.

The waveform DLTWV constituting a first waveform shown in graph (h) is synchronized with the VW line-to-line voltage output, and is a reference waveform that alternately switches between, from time t124V until time t126V, a triangular wave that monotonously increases from an initial value, and, from time t126V until time t128V, a waveform that continuously has the initial value of the previous triangular wave.

The signal of this waveform corresponds to the signal input from the synchronous signal detector 10 to the input terminal IP383 of the firing-sequence generator 31.

The waveform FB constituting a second waveform is the waveform of an error signal that the charge-state detector 20 generates based on the difference between the potential of the battery 3 input to the charge-state detector 20 and the reference potential VREF3, and inputs to the charge controller 30.

The waveform shown in graph (i) is a control signal for firing thyristors S2 and S3 that the charge controller 30 outputs to the rectification processor 40 when the charge controller 30 determines that the voltage of the first waveform DLTVW shown in graph (g) and the voltage of the first waveform DLTWV shown in graph (h) are higher than the voltage of the second waveform FB.

The generation position of this pulse is that of a timing pulse for firing a thyristor connected to the positive pole of the battery.

The waveform shown in graph (j) is a control signal for firing thyristors S8 and S9 that the charge controller 30 outputs to the rectification processor 40 when the charge controller 30 determines that the voltage of the first waveform DLTVW shown in graph (g) and the voltage of the first waveform DLTWV shown in graph (h) are higher than the voltage of the second waveform FB.

The generation position of this pulse is that of a timing pulse for firing a thyristor connected to the negative pole of the battery.

Graph (k) expresses the change in a rectangular wave RECWU generated by the synchronous signal detector 10 as a signal in synchronization with the WU line-to-line voltage output of the 3-phase AC generator 1.

Using the time when the WU-phase voltage waveform is 0V as a reference, values are determined sequentially at times t122W, t124W, and t126W.

If the period when the rectangular wave RECWU of this graph is at the 'H' level is a period when the WU line-to-line voltage output has a positive value, the period when it is at the 'L' level is a period when the WU line-to-line voltage output has a negative value.

The waveform DLTWU constituting a first waveform shown in graph (l) is synchronized with the WU line-to-line voltage output, and is a reference waveform that alternately switches between, from time t122W until time t124W, a triangular wave that monotonously increases from an initial value, and, from time t124W until time t126W, a waveform that continuously has the initial value of the previous triangular wave.

The signal of this waveform corresponds to the signal input from the synchronous signal detector 10 to the input terminal IP384 of the firing-sequence generator 31.

The waveform FB constituting a second waveform is the waveform of an error signal that the charge-state detector 20 generates based on the difference between the potential of the battery 3 input to the charge-state detector 20 and the reference potential VREF3, and inputs to the charge controller 30.

The waveform DLTUW constituting a first waveform shown in graph (m) is synchronized with the WU line-to-line voltage output, and is a reference waveform that alternately switches between, from time t124W until time t126W, a triangular wave that monotonously increases from an initial value, and, from time t126W until time t128W, a waveform that continuously has the initial value of the previous triangular wave.

The signal of this waveform corresponds to the signal input from the synchronous signal detector 10 to the input terminal IP382 of the firing-sequence generator 31.

The waveform FB constituting a second waveform is the waveform of an error signal that the charge-state detector 20 generates based on the difference between the potential of the battery 3 input to the charge-state detector 20 and the reference potential VREF3, and inputs to the charge controller 30.

The waveform shown in graph (n) is a control signal for firing thyristors S1 and S3 that the charge controller 30 outputs to the rectification processor 40 when the charge controller 30 determines that the voltage of the first waveform DLTWU shown in graph (l) and the voltage of the first waveform DLTUW shown in graph (m) are higher than the voltage of the second waveform FB.

The generation position of this pulse is that of a timing pulse for firing a thyristor connected to the positive pole of the battery.

The waveform shown in graph (o) is a control signal for firing thyristors S7 and S9 that the charge controller 30 outputs to the rectification processor 40 when the charge controller 30 determines that the voltage of the first waveform DLTWU shown in graph (l) and the voltage of the first waveform DLTUW shown in graph (m) are higher than the voltage of the second waveform FB.

The generation position of this pulse is that of a timing pulse for firing a thyristor connected to the negative pole of the battery.

The waveforms FB indicated at (b), (c), (h), (i), (l), and (m) express error signals, and are the same waveform.

During one cycle of the AC output voltage of the 3-phase AC generator 1, firing timings for two thyristors are generated in each of the UV-phase, VW-phase, and WU-phase, and the time of generating a signal for firing the thyristor output by the charge controller 30 to the rectification processor 40 shifts forwards or backwards in accordance with the size of the voltage of the error signal generated by the charge-state detector 20 and input to the charge controller 30.

The above explanation describes the sequence of generating firing timing signals for thyristors S1 to S3 and S7 to S9 connected to battery 3.

While thyristors are connected to each battery, since thyristors S7 to S9 are in a circuit common to both batteries, they are connected in common to batteries 3 and 4.

Thyristors S1 to S3, which are connected to a positive battery pole, are configured in an independent circuit for each battery. In generating the firing timing signal as described above, an input error signal is switched within the charge-state detector 20 in accordance with the charge time of each battery; in addition, in compliance with the selection signals 1 and 2 input from the charge-state detector 20, the generated firing timing signal is only transmitted to the thyristor of the battery for charging.

Before the signal is output to the firing circuit of a thyristor connected to a positive battery pole, the output of the signal is switched by the switches 371 to 376 shown in FIG. 11, and the switch signal terminal is controlled such that only a switch that outputs the timing signal becomes conductive.

After the selection signal is input from the charge-state detector 20, the pulse generator 321 detects the firing timing of thyristor S1, and, in the stage that the output pulse signal was transmitted, the states of the D-input terminals of the D-flip-flops FF361 and FF362 are maintained at FF361 and FF362.

The output signals in the state maintained at D-flip-flops FF361 and FF362 are used as control signals for controlling the switching of the switches 371 to 376, and are input to control signal terminals thereof.

Switches such as those provided on the thyristors S1 to S6 side are not needed for transmitting firing control signals to thyristors S7 to S9.

Even if firing control signals are output only to thyristors S7 to S9, since firing control signals are not transmitted to thyristors S1 to S6 connected to the positive-pole side, the output of the 3-phase AC generator 1 does not become connected to the battery.

Furthermore, under the conditions of mode 4, since the error signal has a high voltage that exceeds the target range of the comparison for determining firing control timing, the outputs of comparators 311 to 316 do not change to 'H' during the determination cycle period.

By way of explanation, the example shown in FIG. 13 is one where battery 3 is charged.

To explain the charging of battery 4, thyristors S1 to S3 can be replaced in the description with thyristors S4 to S6, battery 3 can be replaced with battery 4, and reference voltage VREF3 can be replaced with reference voltage VREF4.

The outputting of a firing signal to thyristors S1 to S9 connected to positive poles of batteries 3 and 4 will be explained with reference to FIG. 14.

In the state shown in FIG. 14, the output of a firing signal is switched in compliance with a 'Mode' determined in accordance with the charge state of each battery, as described earlier.

A battery for charging is specified by a mode number based on a result determined by the mode-determination unit 23 and selection signals 1 and 2 that are determined based on the state of a determination flag and input to the charge controller 30 by the mode-determination unit 23, and the charge controller 30 transmits a thyristor-firing control signal for the thyristors of that battery to the rectification processor 40.

When selection signal 1 is '1', the battery charger 2 charges battery 3, and when selection signal 2 is '1', it charges battery 4.

When charging battery 3, thyristors S1 to S3 and thyristors S7 to S9 are fired.

When charging battery 4, thyristors S4 to S9 are fired.

As described above, when selection signals 1 and 2 are both at '0', the charge controller 30 does not output any firing control signals, since the switches 371 to 376 cut off transmission of firing signals to the thyristors S1 to S6 connected to the positive poles of batteries 3 and 4.

In the entry for Mode 4 in FIG. 14, the symbol 'O' is written for thyristors S7 to S9, in accordance with the block diagram of FIG. 11. However, as mentioned earlier, input signal that is a condition for outputting the firing control signals does not exist in the actual operation.

FIGS. 15 to 18 are time-charts of a mode-switching operation when performing consecutive charging operations.

Here, time elapses in the x-axis direction. The time-charts run in sequence from FIG. 15 to FIG. 18.

In this example, the charge-state detector 20 detects the charge states of batteries 3 and 4 at times t141, t142, t143, t144, t145, t146, t147, t148, and t149.

The detection interval of the charge-state detector 20 corresponds to one cycle of the 3-phase AC generator 1, and the timings of its detections are when the UV-phase voltage waveform has a phase of 0°.

That is, the charge operation spans eight cycles starting at times t141, t142, t143, t144, t145, t146, t147, and t148.

The broken lines represent voltage waveforms when the line-to-line voltage of the 3-phase AC generator 1 is all-wave-rectified. For example, in the first cycle, six half-cycle voltage waveforms UV11, UW11, VW11, VU11, WU11, and WV11 make one cycle.

In this device, part of the power of the voltage waveform indicated by the broken lines is switched to be used as power for charging the battery. The shaded areas represent the range of the phase when the battery is charged. For example, in the first cycle, waveforms UV11*a*, UW11*a*, VW11*a*, VU11*a*, WU11*a*, and WV11*a* represent phases for charging that are specified by the charge controller 30.

The columns below the voltage waveforms in FIGS. 15 to 18 will be explained.

Reversed triangular symbols (▼) in a state-detection column represent timings at which the charge-state detector 20 detects the state of a battery.

A mode column gives the mode selected by the charge-state detector 20 in compliance with the result it detected at each of the above timing.

A battery column identifies a battery that the charge controller 30 will charge in that cycle, based on the selection signal that the charge-state detector 20 inputs to the charge controller 30.

The charge-state detector 20 maintains the state it determined in the immediately previous cycle, until the UV-phase thyristor S1 is fired in the cycle of the next determination.

Columns for S1 to S9 represent timing signals for firing each of the thyristors S1 to S9 which the charge controller 30 generates and outputs to the rectification processor 40.

Figure 15:
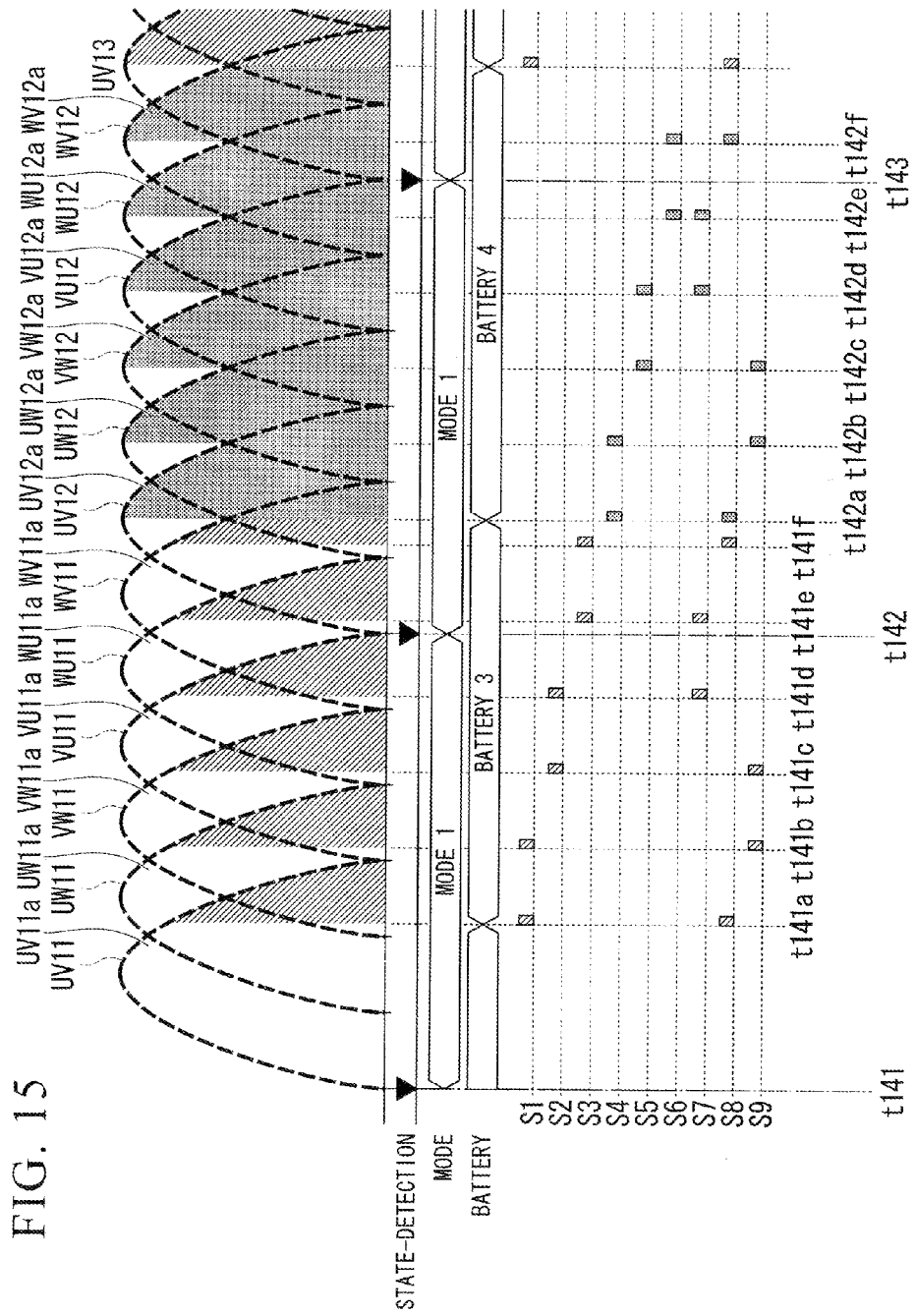
FIG. 15 is a timing chart that shows an operation of switching mode by phase-control.

At time t141 in FIG. 15, the charge-state detector 20 detects a first charge state. The result of the determination performed by the charge-state detector 20 is that both batteries 3 and 4 are insufficiently charged, and so the charge-state detector 20 selects mode 1.

While both batteries 3 and 4 must be charged, since the selection flag stored in the charge-state detector 20 is not set, the charge-state detector 20 selects battery 3.

Since battery 3 was selected, the charge controller 30 then sets the selection flag.

The charge-state detector 20 compares the detected value of the voltage of battery 3 input to it with the reference voltage, and generates an error signal, which it outputs.

The charge controller 30 compares the voltage of the error signal output by the charge-state detector 20 with the voltage of a reference signal containing a triangular wave synchronized with the line-to-line voltage output by the synchronous signal detector 10, and detects a timing when the latter voltage has become higher than the former. Based on the detected timing, the charge controller 30 generates a thyristor-firing control signal and inputs it to the rectification processor 40.

Based on the input firing control sign, the rectification processor 40 fires the thyristors in the sequence given below, and, when the thyristors are fired, rectifies the AC output voltage of the 3-phase AC generator 1 and outputs to battery 3.

In the UV-phase, thyristors S1 and S8 are fired at time t141*a* and a conduction waveform UV11*a* is output.

In the UW-phase, thyristors S1 and S9 are fired at time t141*b* and a conduction waveform UV11*b* is output.

In the VW-phase, thyristors S2 and S9 are fired at time t141*c* and a conduction waveform UV11*c* is output.

In the VU-phase, thyristors S2 and S7 are fired at time t141*d* and a conduction waveform UV11*d* is output.

In the WU-phase, thyristors S3 and S7 are fired at time t141*e* and a conduction waveform UV11*e* is output.

In the WV-phase, thyristors S3 and S8 are fired at time t141*f* and a conduction waveform UV11*f* is output.

Each fired thyristor maintains its conductive state until the voltage of that phase reaches 0 at a phase of 180°.

At time t142, the charge-state detector 20 detects the charge state for charging in the next cycle. As a result of this detection, the charge-state detector 20 detects that both batteries 3 and 4 are insufficiently charged, and selects mode 1. While both batteries 3 and 4 must be charged, since the selection flag stored in the charge-state detector 20 is set, the charge-state detector 20 selects battery 4. Since it has selected battery 4, the charge-state detector 20 clears the selection flag.

The charge-state detector 20 compares the detected value of the voltage of battery 4 input to it with the reference voltage, and generates an error signal, which it outputs.

The charge controller 30 compares the voltage of the error signal output by the charge-state detector 20 with the voltage of a reference signal containing a triangular wave synchronized with the line-to-line voltage output by the synchronous signal detector 10, and detects a timing when the latter voltage has become higher than the former. Based on the detected timing, the charge controller 30 generates a thyristor-firing control signal and inputs it to the rectification processor 40.

Based on the input firing control sign, the rectification processor 40 fires the thyristors in the sequence given below, and, when the thyristors are fired, rectifies the AC output voltage of the 3-phase AC generator 1 and outputs to battery 4.

In the UV-phase, thyristors S4 and S8 are fired at time t142*a* and a conduction waveform UV12*a* is output.

In the UW-phase, thyristors S4 and S9 are fired at time t142*b* and a conduction waveform UV12*a* is output.

In the VW-phase, thyristors S5 and S9 are fired at time t142*c* and conduction waveform UV12*a* is output.

In the VU-phase, thyristors S5 and S7 are fired at time t142*d* and conduction waveform UV12*a* is output.

In the WU-phase, thyristors S6 and S7 are fired at time t142*e* and conduction waveform UV12*a* is output.

In the WV-phase, thyristors S6 and S8 are fired at time t142*f* and conduction waveform UV12*a* is output.

Each fired thyristor maintains its conductive state until the voltage of that phase reaches 0 at a phase of 180°.

In this cycle, battery 3 is not charged, and battery 4 is charged.

Figure 16:
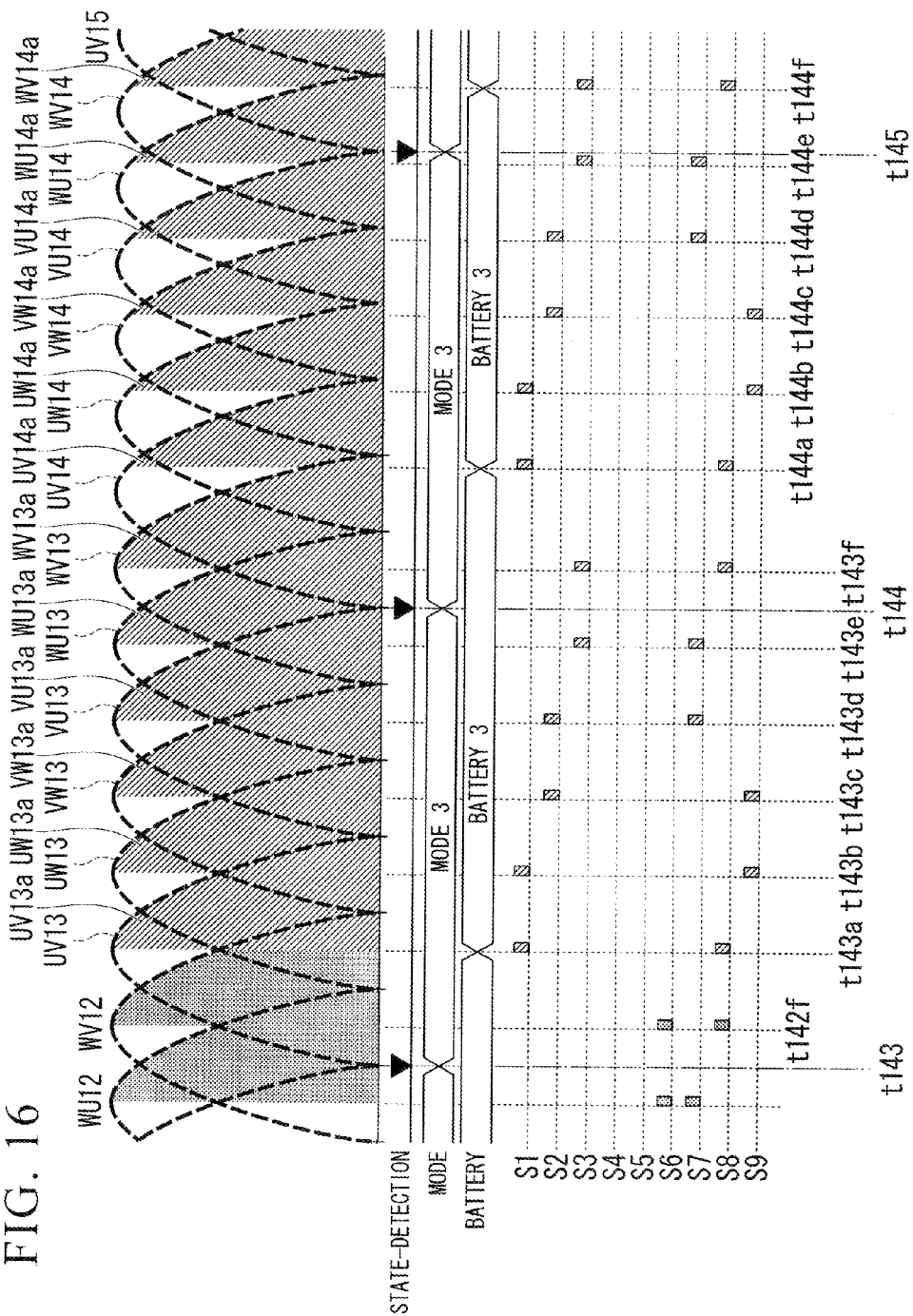
FIG. 16 is a timing chart that shows the operation of switching mode by the phase-control.

In FIG. 16, at time t143, the charge-state detector 20 detects a charge state for charging in the next cycle. As a result of this detection, the charge-state detector 20 detects that battery 3 is insufficiently charged, and selects mode 3. At this time, battery 4 is charged more than the reference level. Since it has selected battery 3, the charge-state detector 20 clears the selection flag.

The charge-state detector 20 compares the detected value of the voltage of battery 3 input to it with the reference voltage, and generates an error signal, which it outputs.

The charge controller 30 compares the voltage of the error signal output by the charge-state detector 20 with the voltage of a reference signal containing a triangular wave synchronized with the line-to-line voltage output by the synchronous signal detector 10, and detects a timing when the latter voltage has become higher than the former. Based on the detected timing, the charge controller 30 generates a thyristor-firing control signal and inputs it to the rectification processor 40.

Based on the input firing control sign, the rectification processor 40 fires the thyristors in the sequence given below, and, when the thyristors are fired, rectifies the AC output voltage of the 3-phase AC generator 1 and outputs to battery 3.

In the UV-phase, thyristors S1 and S8 are fired at time t143a and a conduction waveform UV13a is output.

In the UW-phase, thyristors S1 and S9 are fired at time t143b and a conduction waveform UV13a is output.

In the VW-phase, thyristors S2 and S9 are fired at time t143c and conduction waveform UV13a is output.

In the VU-phase, thyristors S2 and S7 are fired at time t143d and conduction waveform UV13a is output.

In the WU-phase, thyristors S3 and S7 are fired at time t143e and conduction waveform UV13a is output.

In the WV-phase, thyristors S3 and S8 are fired at time t143f and conduction waveform UV13a is output.

Each fired thyristor maintains its conductive state until the voltage of that phase reaches 0 at a phase of 180°.

In this cycle, battery 4 is not charged, and battery 3 is charged.

At time t144, the charge-state detector 20 detects a charge state for charging in the next cycle. As a result of this detection, the charge-state detector 20 detects that battery 3 is insufficiently charged, and selects mode 3. At this time, battery 4 is charged more than the reference level. Since it has selected battery 3, the charge-state detector 20 clears the selection flag.

The charge-state detector 20 compares the detected value of the voltage of battery 3 input to it with the reference voltage, and generates an error signal, which it outputs.

The charge controller 30 compares the voltage of the error signal output by the charge-state detector 20 with the voltage of a reference signal containing a triangular wave synchronized with the line-to-line voltage output by the synchronous signal detector 10, and detects a timing when the latter voltage has become higher than the former. Based on the detected timing, the charge controller 30 generates a thyristor-firing control signal and inputs it to the rectification processor 40.

Based on the input firing control sign, the rectification processor 40 fires the thyristors in the sequence given below, and, when the thyristors are fired, rectifies the AC output voltage of the 3-phase AC generator 1 and outputs to battery 3.

In the UV-phase, thyristors S1 and S8 are fired at time t144a and a conduction waveform UV14a is output.

In the UW-phase, thyristors S1 and S9 are fired at time t144b and a conduction waveform UV14a is output.

In the VW-phase, thyristors S2 and S9 are fired at time t144c and conduction waveform UV14a is output.

In the VU-phase, thyristors S2 and S7 are fired at time t144d and conduction waveform UV14a is output.

In the WU-phase, thyristors S3 and S7 are fired at time t144e and conduction waveform UV14a is output.

In the WV-phase, thyristors S3 and S8 are fired at time t144f and conduction waveform UV14a is output.

Each fired thyristor maintains its conductive state until the voltage of that phase reaches 0 at a phase of 180°.

In this cycle, battery 4 is not charged, and battery 3 is charged.

Figure 17:
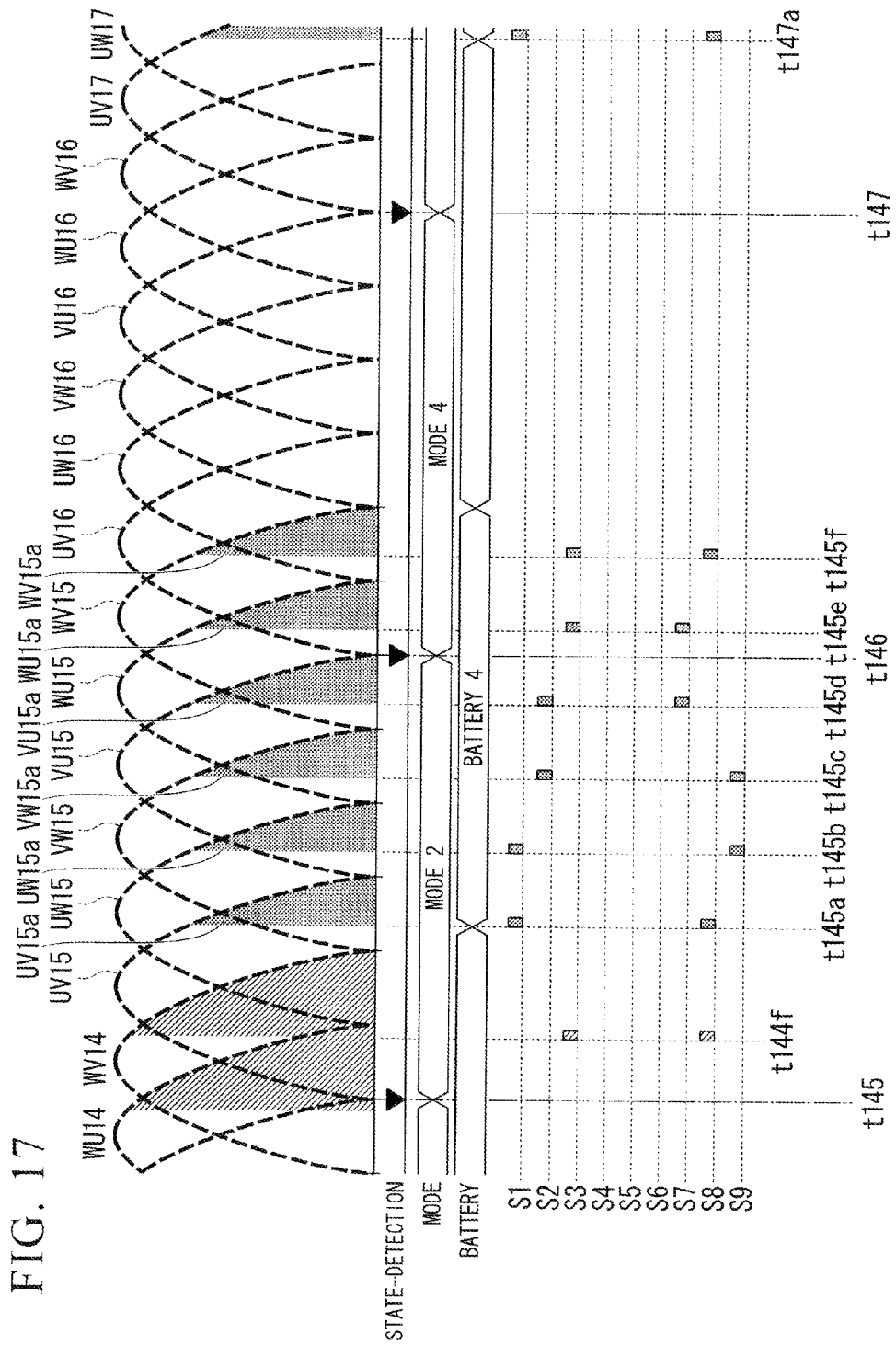
FIG. 17 is a timing chart that shows the operation of switching mode by the phase-control.

In FIG. 17, at time t145, the charge-state detector 20 detects a charge state for charging in the next cycle. As a result of this detection, the charge-state detector 20 detects that battery 4 is insufficiently charged, and selects mode 2. At this time, battery 3 is charged more than the reference level. Since it has selected battery 4, the charge-state detector 20 clears the selection flag.

The charge-state detector 20 compares the detected value of the voltage of battery 4 input to it with the reference voltage, and generates an error signal, which it outputs.

The charge controller 30 compares the voltage of the error signal output by the charge-state detector 20 with the voltage of a reference signal containing a triangular wave synchronized with the line-to-line voltage output by the synchronous signal detector 10, and detects a timing when the latter voltage has become higher than the former. Based on the detected timing, the charge controller 30 generates a thyristor-firing control signal and inputs it to the rectification processor 40.

Based on the input firing control sign, the rectification processor 40 fires the thyristors in the sequence given below, and, when the thyristors are fired, rectifies the AC output voltage of the 3-phase AC generator 1 and outputs to battery 4.

In the UV-phase, thyristors S4 and S8 are fired at time t145a and a conduction waveform UV15a is output.

In the UW-phase, thyristors S4 and S9 are fired at time t145b and a conduction waveform UV15a is output.

In the VW-phase, thyristors S5 and S9 are fired at time t145c and conduction waveform UV15a is output.

In the VU-phase, thyristors S5 and S7 are fired at time t145d and conduction waveform UV15a is output.

In the WU-phase, thyristors S6 and S7 are fired at time t145e and conduction waveform UV15a is output.

In the WV-phase, thyristors S6 and S8 are fired at time t145f and conduction waveform UV15a is output.

Each fired thyristor maintains its conductive state until the voltage of that phase reaches 0 at a phase of 180°.

In this cycle, battery 3 is not charged, and battery 4 is charged.

At time t146, the charge-state detector 20 detects a charge state for charging in the next cycle. As a result of this detection, the charge-state detector 20 detects that batteries 3 and 4 are both charged more than the reference value, and selects mode 4. At this time, battery 4 is charged more than the reference level. Since it has selected battery 3, the charge-state detector 20 clears the selection flag.

Since no batteries are charged in this cycle, no firing signals are transmitted to the thyristors.

Neither of the batteries 3 and 4 are charged in this cycle where mode 4 was detected.

Figure 18:
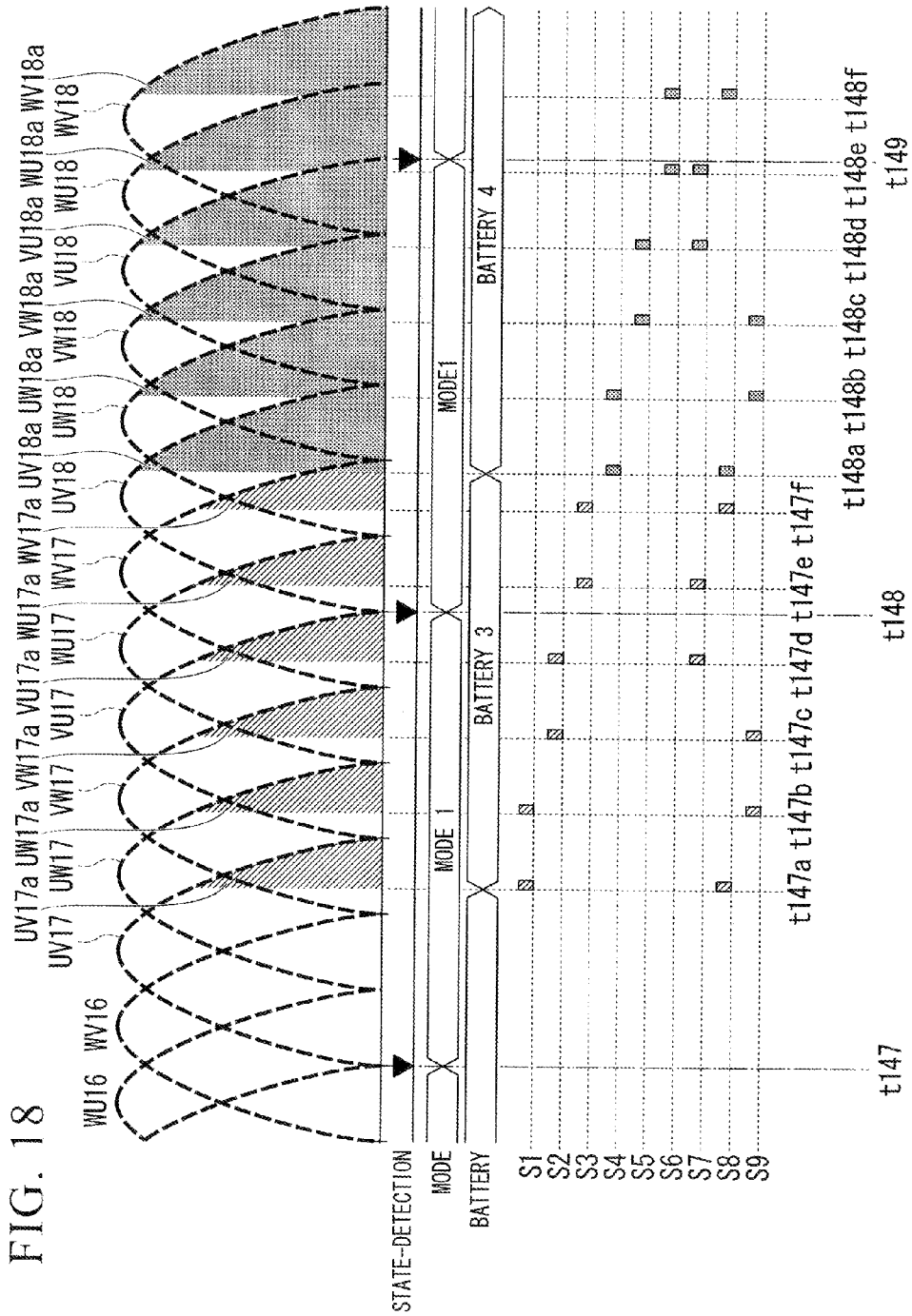
FIG. 18 is a timing chart that shows the operation of switching mode by the phase-control.

In FIG. 18, at time t147, the charge-state detector 20 detects a charge state for charging in the next cycle. As a result of this detection, the charge-state detector 20 detects that batteries 3 and 4 are both insufficiently charged, and selects mode 1.

While both the batteries 3 and 4 need charging, since the selection flag stored in the charge-state detector 20 has not been set, the charge-state detector 20 selects battery 3. Further, since it has selected battery 3, the charge-state detector 20 sets the selection flag.

The charge-state detector 20 compares the detected value of the voltage of battery 3 input to it with the reference voltage, and generates an error signal, which it outputs.

The charge controller 30 compares the voltage of the error signal output by the charge-state detector 20 with the voltage of a reference signal containing a triangular wave synchronized with the line-to-line voltage output by the synchronous signal detector 10, and detects a timing when the latter voltage has become higher than the former. Based on the detected timing, the charge controller 30 generates a thyristor-firing control signal and inputs it to the rectification processor 40.

Based on the input firing control sign, the rectification processor 40 fires the thyristors in the sequence given below, and, when the thyristors are fired, rectifies the AC output voltage of the 3-phase AC generator 1 and outputs to battery 3.

In the UV-phase, thyristors 51 and S8 are fired at time t147a and a conduction waveform UV13a is output.

In the UW-phase, thyristors S1 and S9 are fired at time t147b and a conduction waveform UV13a is output.

In the VW-phase, thyristors S2 and S9 are fired at time t147c and conduction waveform UV13a is output.

In the VU-phase, thyristors S2 and S7 are fired at time t147d and conduction waveform UV13a is output.

In the WU-phase, thyristors S3 and S7 are fired at time t147e and conduction waveform UV13a is output.

In the WV-phase, thyristors S3 and S8 are fired at time t147f and conduction waveform UV13a is output.

Each fired thyristor maintains its conductive state until the voltage of that phase reaches 0 at a phase of 180°.

At time t148, the charge-state detector 20 detects a charge state for charging in the next cycle. As a result of this detection, the charge-state detector 20 detects that both batteries 3 and 4 are insufficiently charged, and selects mode 1. While both the batteries 3 and 4 need charging, since the selection flag stored in the charge-state detector 20 is set, the charge-state detector 20 selects battery 4. Further, since it has selected battery 4, the charge-state detector 20 clears the selection flag.

The charge-state detector 20 compares the detected value of the voltage of battery 3 input to it with the reference voltage, and generates an error signal, which it outputs.

The charge controller 30 compares the voltage of the error signal output by the charge-state detector 20 with the voltage of a reference signal containing a triangular wave synchronized with the line-to-line voltage output by the synchronous signal detector 10, and detects a timing when the latter voltage has become higher than the former. Based on the detected timing, the charge controller 30 generates a thyristor-firing control signal and inputs it to the rectification processor 40.

Based on the input firing control sign, the rectification processor 40 fires the thyristors in the sequence given below, and, when the thyristors are fired, rectifies the AC output voltage of the 3-phase AC generator 1 and outputs to battery 4.

In the UV-phase, thyristors S4 and S8 are fired at time t148a and a conduction waveform UV13a is output.

In the UW-phase, thyristors S4 and S9 are fired at time t148b and a conduction waveform UV13a is output.

In the VW-phase, thyristors S5 and S9 are fired at time t148c and conduction waveform UV13a is output.

In the VU-phase, thyristors S5 and S7 are fired at time t148d and conduction waveform UV13a is output.

In the WU-phase, thyristors S6 and S7 are fired at time t148e and conduction waveform UV13a is output.

In the WV-phase, thyristors S6 and S8 are fired at time t148f and conduction waveform UV13a is output.

Each fired thyristor maintains its conductive state until the voltage of that phase reaches 0 at a phase of 180°.

In this cycle, battery 3 is not charged, and battery 4 is charged.

A charge operation shown in FIGS. 15 to 18 will be explained.

The charge controller 30 compares the charge voltage of the battery being charged with a successive reference voltage.

In this way, the charge controller 30 hastens each firing timing when the charge amount is low, and delays the firing timing when the charge amount is large. The charge controller 30 sets six thyristor-firing timings during the charge cycles for one AC cycle starting in the UV-phase. By phase-controlling each of the timings for firing, the charge amount can be finely controlled even during the charge cycle.

Thus it is possible to provide a battery charger 2 that can appropriately charge a plurality of batteries, without providing a plurality of 3-phase AC generators.

Second Embodiment

Time Division Control

In the method of controlling the charge amount described in the first embodiment, as explained in FIGS. 15 to 18, based on a state detected by the charge-state detector 20, during that charge cycle, a charge amount based on the battery voltage is successively detected while using phase-control to control the charge amount.

In a second embodiment, while the charge-state detector 20 cyclically detects the charge state of each battery in the same manner as in the first embodiment, a modification introduced here is that, based on the battery charge state at that cyclical detection point, the battery is charged at the maximum charge amount until a subsequent detection is performed by the charge-state detector 20.

For switching the charge between batteries here, a battery for charging is selected using a cycle based on the detection cycle of the charge-state detector 20. Based on information indicating this selection, the charge controller 30 uses time-division to switch the battery for charging, and controls the charge amount to that battery.

A mode-switching operation when performing continuous charging will be explained with reference to FIGS. 19 to 22.

To charge at the maximum charge amount, each thyristor is fired at a timing that is lagged 60° behind the reference phase of each line-to-line voltage waveform, and the thyristor is maintained in its conductive state until a reverse bias is applied.

When charging battery 3, the charge controller 30 fires the thyristors in the following sequence: in the UV-phase, thyristors S1 and S8, in the UW-phase, thyristors S1 and S9, in the VW-phase, thyristors S2 and S9, in the VU-phase, thyristors S2 and S7, in the WU-phase, thyristors S3 and S7, in the WV-phase, thyristors S3 and S8.

When charging battery 4, the charge controller 30 fires the thyristors in the following sequence: in the UV-phase, thyristors S4 and S8, in the UW-phase, thyristors S4 and S9, in the VW-phase, thyristors S5 and S9, in the VU-phase, thyristors S5 and S7, in the WU-phase, thyristors S6 and S7, in the WV-phase, thyristors S6 and S8.

In FIGS. 19 to 22, time elapses along the x-axis. FIGS. 19 to 22 are sequential timing charts.

Let us suppose that the charge-state detector 20 detects the charge states of batteries 3 and 4 at times t151, t152, t153, t154, t155, t156, t157, t158, t159.

Here, the detection interval of the charge-state detector 20 corresponds to one cycle of the 3-phase AC generator 1, and the timings of its detections are when the UV-phase voltage waveform has a phase of 0°.

That is, the charge operation spans eight cycles starting at times t151, t152, t153, t154, t155, t156, t157, and t158.

The broken lines represent voltage waveforms when the line-to-line voltage of the 3-phase AC generator 1 is all-wave-rectified. For example, in the first cycle, six half-cycle voltage waveforms UV21, UW21, VW21, VU21, WU21, and WV21 make one cycle.

The columns below the voltage waveforms in FIGS. 19 to 22 will be explained.

Reversed triangular symbols (▼) in a state-detection column represent timings at which the charge-state detector 20 detects the state of a battery.

A mode column gives the mode selected by the charge-state detector 20 in compliance with the result it detected at each of the above timing.

A battery column identifies a battery that the charge controller 30 will charge in that cycle, based on the selection signal that the charge-state detector 20 inputs to the charge controller 30.

The charge-state detector 20 maintains the state it determined in the immediately previous cycle, until the UV-phase thyristor S1 is fired in the cycle of the next determination.

Columns for S1 to S9 represent timing signals for firing each of the thyristors S1 to S9 which the charge controller 30 generates and outputs to the rectification processor 40.

Timings for firing the thyristors are fixed at every 60° of the reference phase.

Further, since the battery being charged becomes conductive between 60° to 180° in each phase, the battery is charged with the maximum charge capability in each charge cycle.

Figure 19:
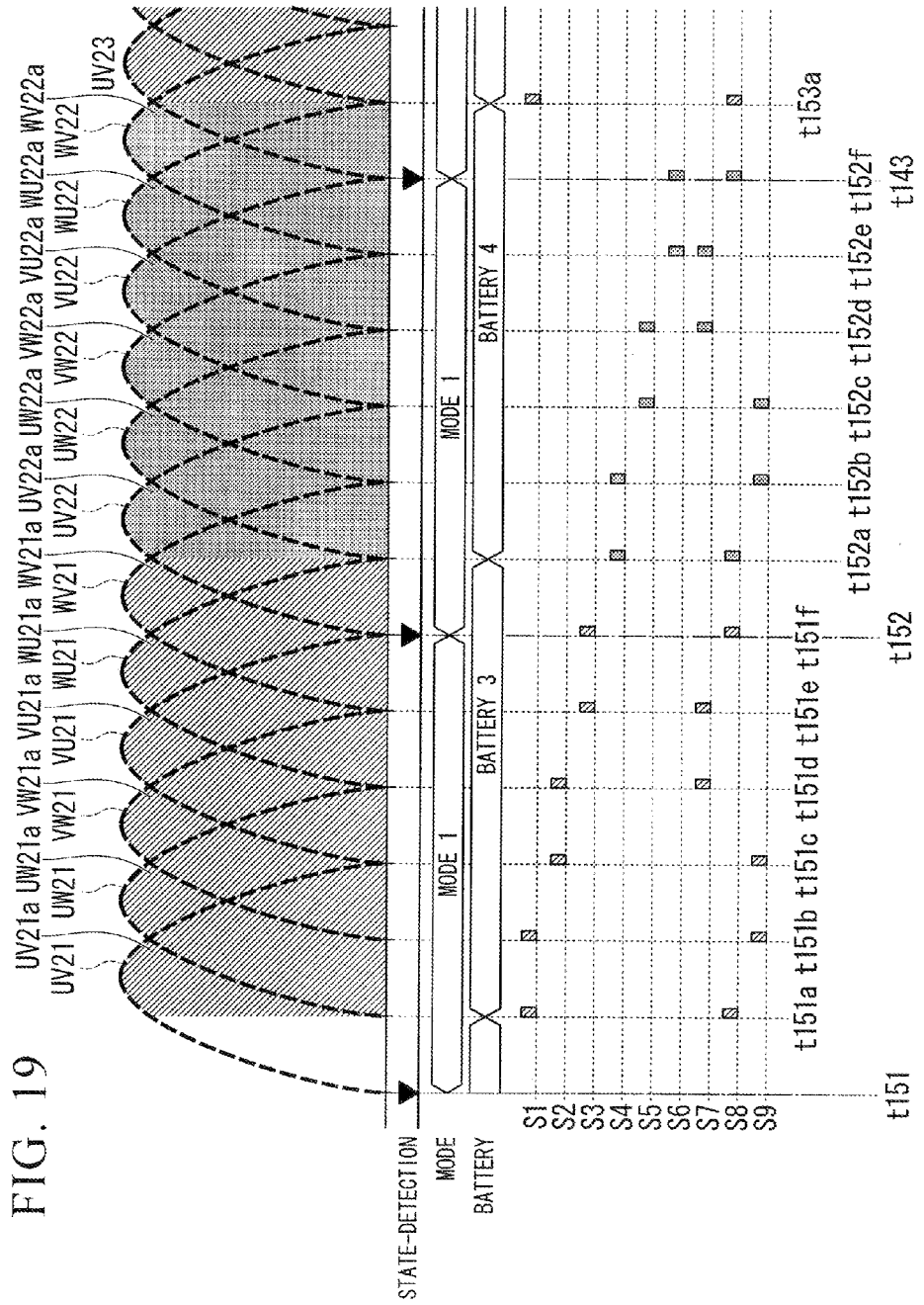
FIG. 19 is a timing chart that shows the operation of switching mode by time-division control.

At time t151 in FIG. 19, the charge-state detector 20 detects a first charge state. The result of the determination performed by the charge-state detector 20 is that both batteries 3 and 4 are insufficiently charged, and so the charge-state detector 20 selects mode 1.

While both batteries 3 and 4 must be charged, since the selection flag stored in the charge-state detector 20 is not set, the charge-state detector 20 selects battery 3. Also, since battery 3 was selected, the charge controller 30 then sets the selection flag.

The charge controller 30 generates firing signals in the sequence of thyristors S1 and S8, thyristors S1 and S9, thyristors S2 and S9, thyristors S2 and S7, thyristors S3 and S7, and thyristors S3 and S8, and charges battery 3.

Due to the conduction waveforms UV21a, UW21a, VW21a, VU21a, WU21a, and WV21 in this cycle, battery 4 is not charged, whereas battery 3 is charged.

At time t152, the charge-state detector 20 detects the charge state for charging in the next cycle. As a result of this detection, the charge-state detector 20 detects that both batteries 3 and 4 are insufficiently charged, and selects mode 1. While both batteries 3 and 4 must be charged, since the selection flag stored in the charge-state detector 20 is set, the charge-state detector 20 selects battery 4. Since it has selected battery 4, the charge-state detector 20 clears the selection flag.

The charge controller 30 generates firing signals in the sequence of thyristors S4 and S8, thyristors S4 and S9, thyristors S5 and S9, thyristors S5 and S7, thyristors S6 and S7, and thyristors S6 and S8, and charges battery 4.

Due to the conduction waveforms UV22a, UW22a, VW22a, VU22a, WU22a, and WV22 in this cycle, battery 3 is not charged, whereas battery 4 is charged.

Figure 20:
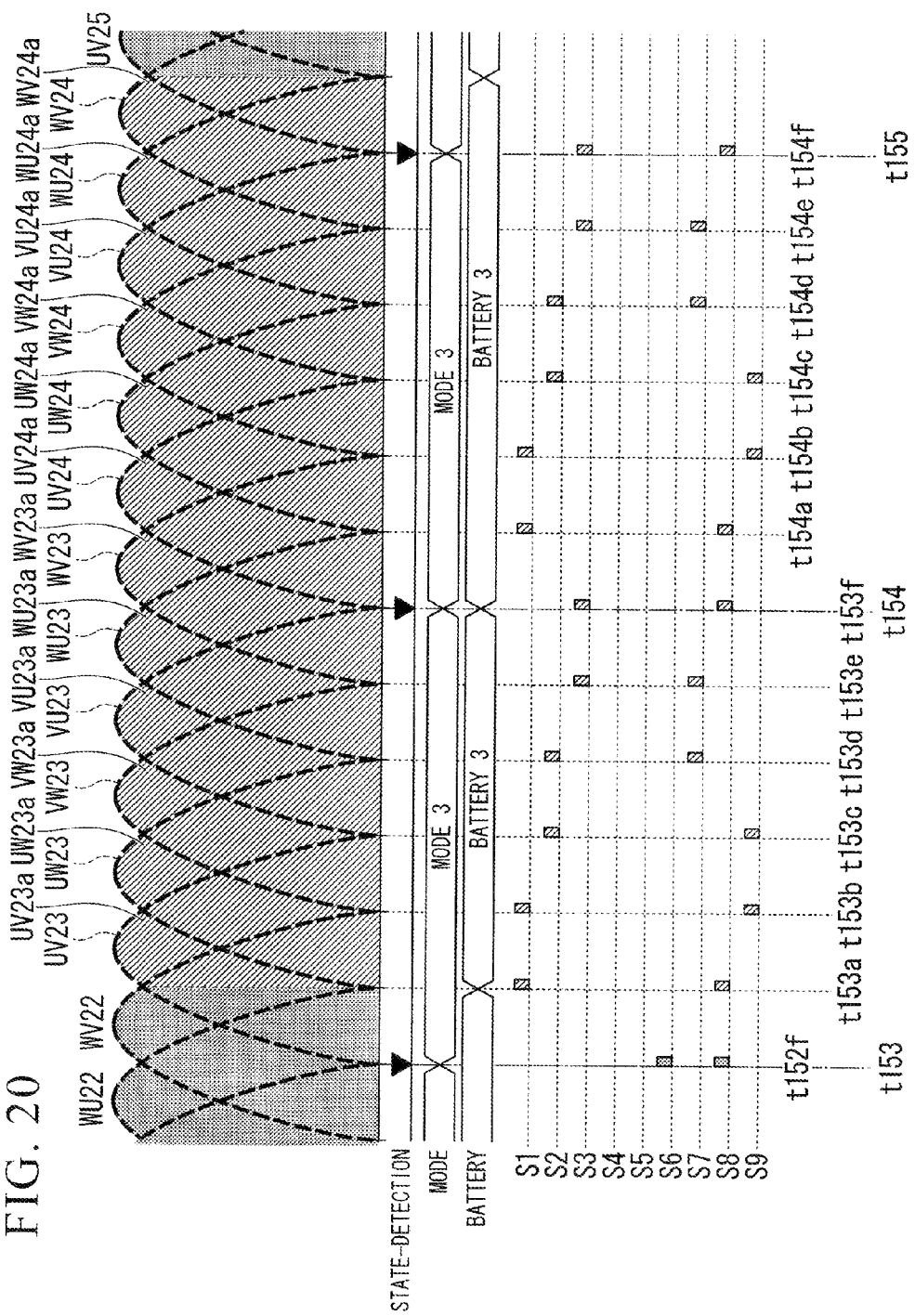
FIG. 20 is a timing chart that shows the operation of switching mode by the time-division control.

In FIG. 20, at time t153, the charge-state detector 20 detects a charge state for charging in the next cycle. As a result of this detection, the charge-state detector 20 detects that battery 3 is insufficiently charged, and selects mode 3. At this time, battery 4 is charged more than the reference level. Also, since it has selected battery 3, the charge-state detector 20 clears the selection flag.

The charge controller 30 generates firing signals in the sequence of thyristors S1 and S8, thyristors S1 and S9, thyristors S2 and S9, thyristors S2 and S7, thyristors S3 and S7, and thyristors S3 and S8, and charges battery 3.

Due to the conduction waveforms UV23a, UW23a, VW23a, VU23a, WU23a, and WV23 in this cycle, battery 4 is not charged, whereas battery 3 is charged.

At time t154, the charge-state detector 20 detects a charge state for charging in the next cycle. As a result of this detection, the charge-state detector 20 detects that battery 3 is insufficiently charged, and selects mode 3. At this time, battery 4 is charged more than the reference level. Since it has selected battery 3, the charge-state detector 20 clears the selection flag.

The charge controller 30 generates firing signals in the sequence of thyristors S1 and S8, thyristors 51 and S9, thyristors S2 and S9, thyristors S2 and S7, thyristors S3 and S7, and thyristors S3 and S8, and charges battery 3

Due to the conduction waveforms UV24a, UW24a, VW24a, VU24a, WU24a, and WV24 in this cycle, battery 4 is not charged, whereas battery 3 is charged.

Figure 21:
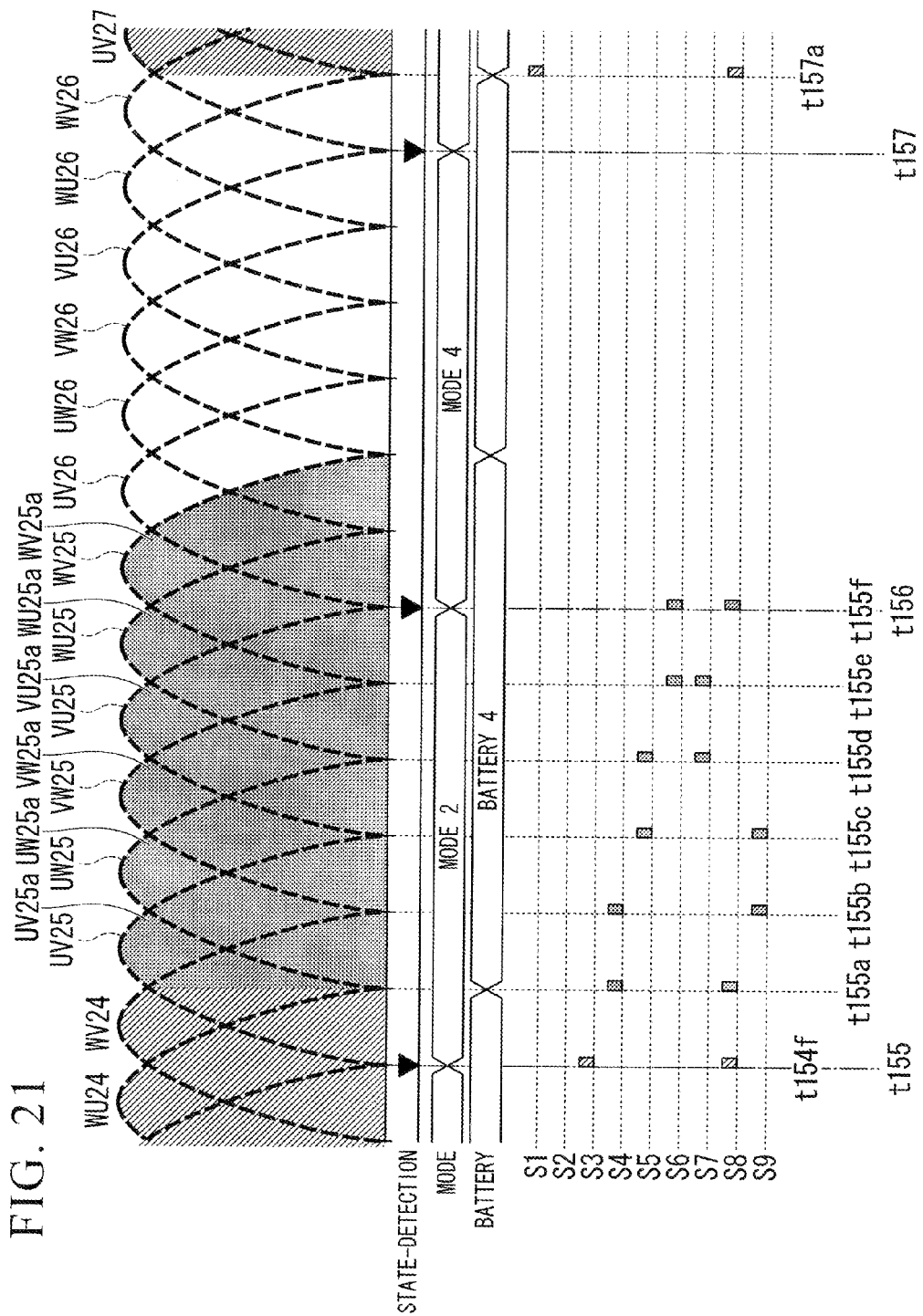
FIG. 21 is a timing chart that shows the operation of switching mode by the time-division control.

In FIG. 21, at time t155, the charge-state detector 20 detects a charge state for charging in the next cycle. As a result of this detection, the charge-state detector 20 detects that battery 4 is insufficiently charged, and selects mode 2. At this time, battery 3 is charged more than the reference level. Since it has selected battery 4, the charge-state detector 20 clears the selection flag.

The charge controller 30 generates firing signals in the sequence of thyristors S4 and S8, thyristors S4 and S9, thyristors S5 and S9, thyristors S5 and S7, thyristors S6 and S7, and thyristors S6 and S8, and charges battery 3

Due to the conduction waveforms UV25a, UW25a, VW25a, VU25a, WU25a, and WV25 in this cycle, battery 3 is not charged, whereas battery 4 is charged.

At time t156, the charge-state detector 20 detects a charge state for charging in the next cycle. As a result of this detection, the charge-state detector 20 detects that batteries 3 and 4 are both charged more than the reference value, and selects mode 4. At this time, battery 4 is charged more than the reference level. Since it has selected battery 3, the charge-state detector 20 clears the selection flag.

Since no batteries are charged in this cycle, no firing signals are transmitted to the thyristors.

Neither of the batteries 3 and 4 are charged in this cycle which was detected as mode 4.

Figure 22:
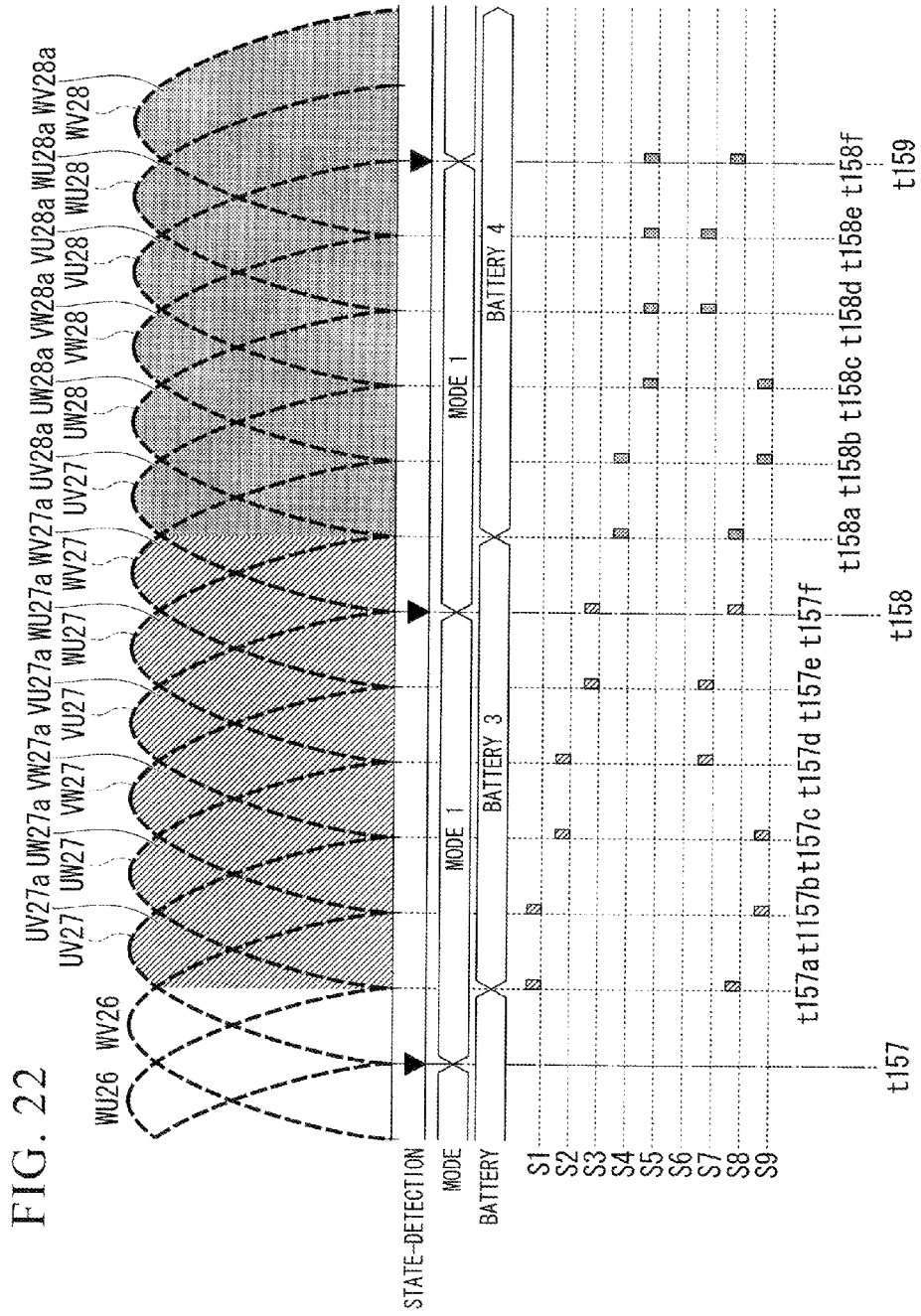
FIG. 22 is a timing chart that shows the operation of switching mode by the time-division control.

In FIG. 22, at time t157, the charge-state detector 20 detects a charge state for charging in the next cycle. As a result of this detection, the charge-state detector 20 detects that batteries 3 and 4 are both insufficiently charged, and selects mode 1.

While both the batteries 3 and 4 need charging, since the selection flag stored in the charge-state detector 20 has not been set, the charge-state detector 20 selects battery 3. Also, since it has selected battery 3, the charge-state detector 20 sets the selection flag.

The charge controller 30 generates firing signals in the sequence of thyristors S1 and S8, thyristors S1 and S9, thyristors S2 and S9, thyristors S2 and S7, thyristors S3 and S7, and thyristors S3 and S8, and charges battery 3.

Due to the conduction waveforms UV27a, UW27a, VW27a, VU27a, WU27a, and WV27 in this cycle, battery 4 is not charged, whereas battery 3 is charged.

At time t158, the charge-state detector 20 detects a charge state for charging in the next cycle. As a result of this detection, the charge-state detector 20 detects that both batteries 3 and 4 are insufficiently charged, and selects mode 1. While both the batteries 3 and 4 need charging, since the selection flag stored in the charge-state detector 20 is set, the charge-state detector 20 selects battery 4. Further, since it has selected battery 4, the charge-state detector 20 clears the selection flag.

The charge controller 30 generates firing signals in the sequence of thyristors S4 and S8, thyristors S4 and S9, thyristors S5 and S9, thyristors S5 and S7, thyristors S6 and S7, and thyristors S6 and S8, and charges battery 4.

Due to the conduction waveforms UV28a, UW28a, VW28a, VU28a, WU28a, and WV28 in this cycle, battery 3 is not charged, whereas battery 4 is charged.

Charge operations shown in FIGS. 19 to 22 have thus been explained.

The timings for firing the thyristors are fixed at every 60° of the reference phase. Also, since the battery being charged becomes conductive between 60° to 180° in each phase, it is charged with the maximum charge capability in each charge cycle.

Thus, it is possible to provide a battery charger 2 that can appropriately charge a plurality of batteries, without providing a plurality of 3-phase AC generators, using a different control method than that in the first embodiment.

Third Embodiment

Diode

The embodiments described so far use nine thyristors in charging two battery systems.

Figure 23:
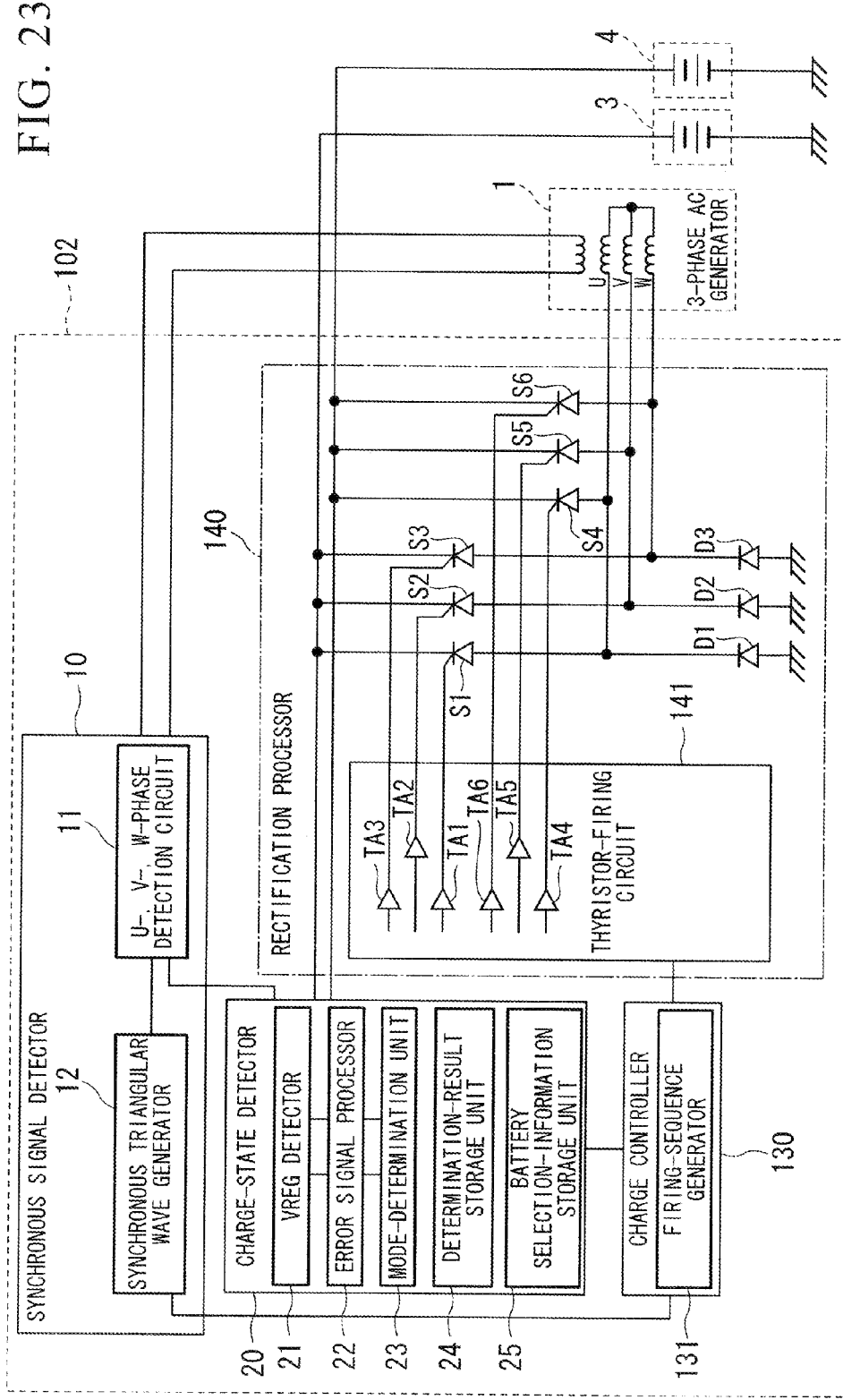
FIG. 23 is a circuit diagram that shows a battery charger in which a rectifying processor is partially configured with a diode.

Referring to FIG. 23, an embodiment that modifies the rectification processor according to a third embodiment will be explained.

FIG. 23 is a schematic block diagram relating to a battery charger 102 in a third embodiment.

The battery charger 102 includes a synchronous signal detector 10, a charge-state detector 20, a charge controller 130, and a rectification processor 140.

Points which are modified from the block diagram shown in the embodiment of FIG. 1 relate to the charge controller 130 and the rectification processor 140. These modifications will be explained.

Firstly, the rectification processor 140 will be explained.

The rectification processor 140 in the battery charger 102 is a circuit that, in compliance with a firing signal input from the charge controller 130, rectifies the AC output voltage output by the 3-phase AC generator 1 and charges batteries connected to it.

The rectification processor 140 includes thyristors (rectifier elements) S1, S2, S3, S4, S5, and S6, diodes D1, D2, and D3, and a thyristor-firing circuit 141.

The rectifier elements of the rectification processor 40 of the first embodiment described earlier differ in that they include only thyristors.

Thyristors are provided for each of two systems of connected batteries. As in the first embodiment, thyristors S1 to S3 form a first system, and thyristors S4 to S6 form a second system, both systems being connected to a positive pole of the respective battery.

The rectifier elements, which are connected to the negative pole (grounded pole) of each battery in common with a circuit common to both systems, are arranged in combinations of the diodes D1 to D3.

The thyristor-firing circuit 141 of the rectification processor 140 includes driver circuits TA1 to TA6 for firing the thyristors S1 to S6 connected thereto.

The driver circuits TA1 to TA6 of the thyristor-firing circuit 141 are thyristor-firing driver circuits for firing the thyristors S1 to S6 connected to them, and are provided independently for each of the connected thyristors S1 to S6.

Thyristors S1 to S3 and diodes D1 to D3 function as a hybrid bridge that all-wave-rectifies the output of the 3-phase AC generator 1 connected to the system of battery 3.

Thyristors S4 to S6 and diodes D1 to D3 function as a hybrid bridge that all-wave-rectifies the output of the 3-phase AC generator 1 connected to the system of battery 4.

Here, the connections of the thyristors S1 to S6 and the diodes D1 to D3 will be explained in detail.

The anode of thyristor S1 connects to the U-phase of the 3-phase AC generator 1, its cathode connects to the positive pole of battery 3, and its gate connects to the output of driver circuit TA1 of the thyristor-firing circuit 141.

The anode of thyristor S2 connects to the V-phase of the 3-phase AC generator 1, its cathode connects to the positive pole of battery 3, and its gate connects to the output of driver circuit TA2 of the thyristor-firing circuit 141.

The anode of thyristor S3 connects to the W-phase of the 3-phase AC generator 1, its cathode connects to the positive pole of battery 3, and its gate connects to the output of driver circuit TA3 of the thyristor-firing circuit 141.

The anode of thyristor S4 connects to the U-phase of the 3-phase AC generator 1, its cathode connects to the positive pole of battery 4, and its gate connects to the output of driver circuit TA4 of the thyristor-firing circuit 141.

The anode of thyristor S5 connects to the V-phase of the 3-phase AC generator 1, its cathode connects to the positive pole of battery 4, and its gate connects to the output of driver circuit TA5 of the thyristor-firing circuit 141.

The anode of thyristor S6 connects to the W-phase of the 3-phase AC generator 1, its cathode connects to the positive pole of battery 4, and its gate connects to the output of driver circuit TA6 of the thyristor-firing circuit 141.

The anode of diode D1 connects to a grounded potential, and its cathode connects to the U-phase of the 3-phase AC generator 1.

The anode of diode D2 connects to a grounded potential, and its cathode connects to the V-phase of the 3-phase AC generator 1.

The anode of diode D3 connects to a grounded potential, and its cathode connects to the W-phase of the 3-phase AC generator 1.

An input terminal of each driver circuit of the thyristor-firing circuit 141 connects to the respective output terminal of the charge controller 130 that outputs a control signal for controlling the firing of a thyristor, and an output terminal of the driver circuit connects to the gate of the respective thyristor.

When a control signal for controlling the firing of a thyristor is input from the output terminal of the charge controller 130, the thyristor-firing circuit 141 transmits a firing signal to that thyristor.

Thus, since the charge amount is controlled with the conduction start angle of the thyristor, the charge amount to the battery is controlled according to the control signal from the charge controller 130.

The charge controller 130 will be explained with reference to FIG. 24.

Figure 24:
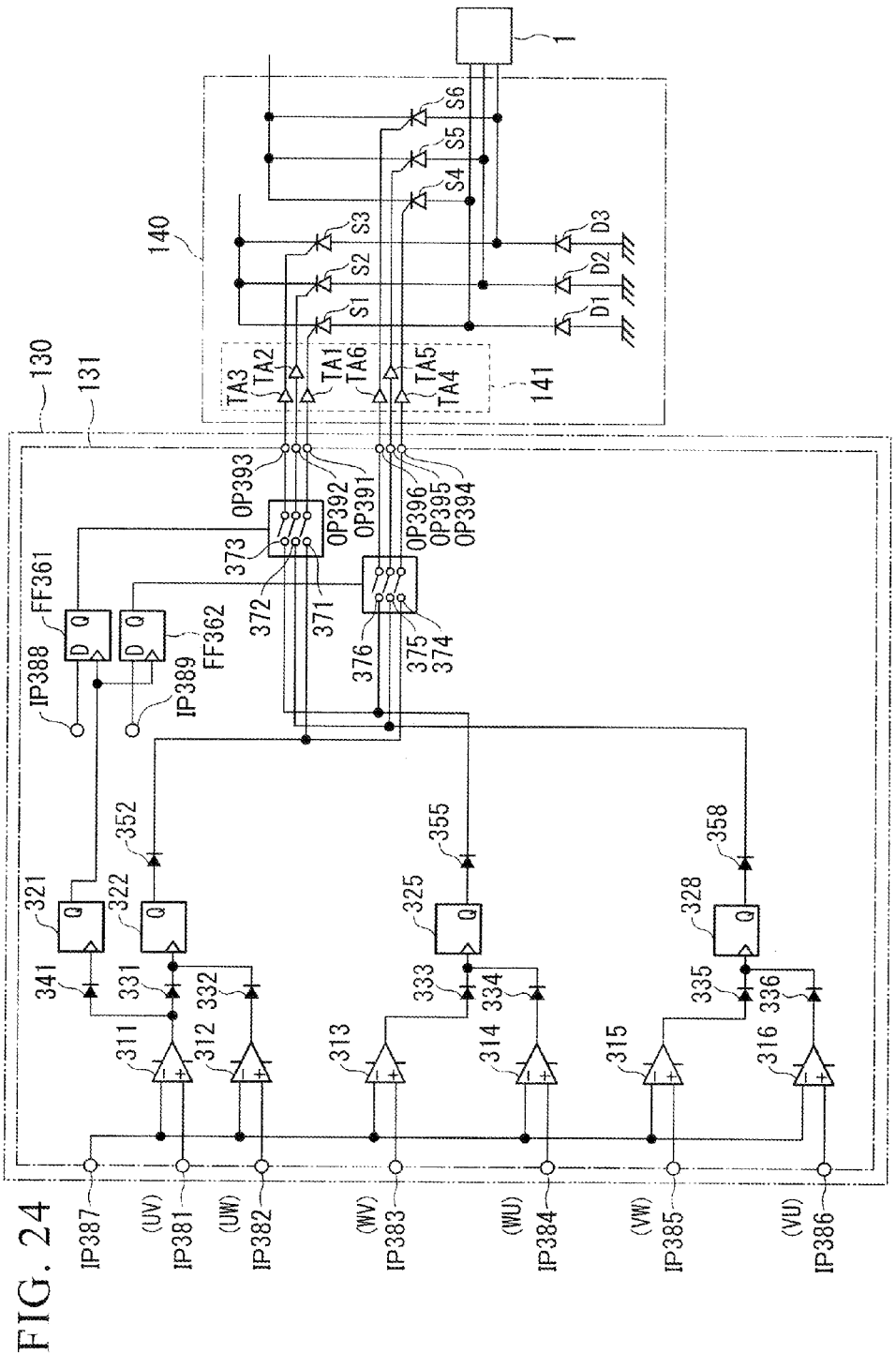
FIG. 24 is a circuit diagram that shows another example of the charge controller (firing sequence generator).

FIG. 24 is a block diagram of the charge controller 130 of the battery charger 102.

The charge controller 130 in the battery charger 102 controls six thyristors arranged in the rectification processor 140. No circuit is needed for thyristors S7 to S9 of the first embodiment, and signal generators are independently provided for thyristors S1 to S6 connected to the positive poles of batteries 3 and 4.

Constituent parts having the same function as those in the first embodiment are designated with the same reference codes, and the foregoing description can be referred to for their explanation.

Referring to FIGS. 25A to 25D, a thyristor conduction control method using phase-control for controlling the charge amount, performed by the rectification processor 140, will be explained.

Figure 25A:
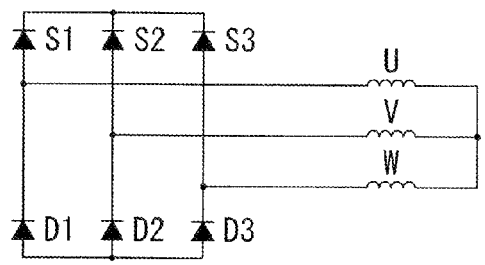
FIG. 25A is a circuit diagram that shows the thyristor-firing method by the time-division control and the conduction times.

FIG. 25A is a diagram of connections between three thyristors S1 to S3 and three diodes connected to battery 3, and the 3-phase AC generator 1.

As described above, thyristor S1 and diode D1 are connected to the U-phase of the 3-phase AC generator 1, thyristor S2 and diode D2 are connected to the V-phase, and thyristor S3 and diode D3 are connected to the W-phase.

When three thyristors and three diodes are connected as shown in FIG. 25A, the 3-phase AC is all-wave-rectified.

Unlike the diodes, the conduction start timings of the thyristors connected to the positive pole of battery 3 are controlled by inputting a thyristor-firing signal to their gates.

When charging from the respective line-to-line voltages, the thyristors that become targets for control by the charge controller 130 are as follows.

In waveform UV and waveform UW, thyristor S1 is fired.
In waveform VU and waveform UW, thyristor S2 is fired.
In waveform WV and waveform UW, thyristor S3 is fired.

Waveform UV and waveform UW, waveform VW and waveform VU, waveform WU and waveform WV, which overlap at phase-differences of 60° each fire one thyristor at timings of waveform UV, waveform VW, and waveform WU, whereby the conductive state continues to the 180° phases of waveform UV, waveform VW, and waveform WU.

Figure 25B:
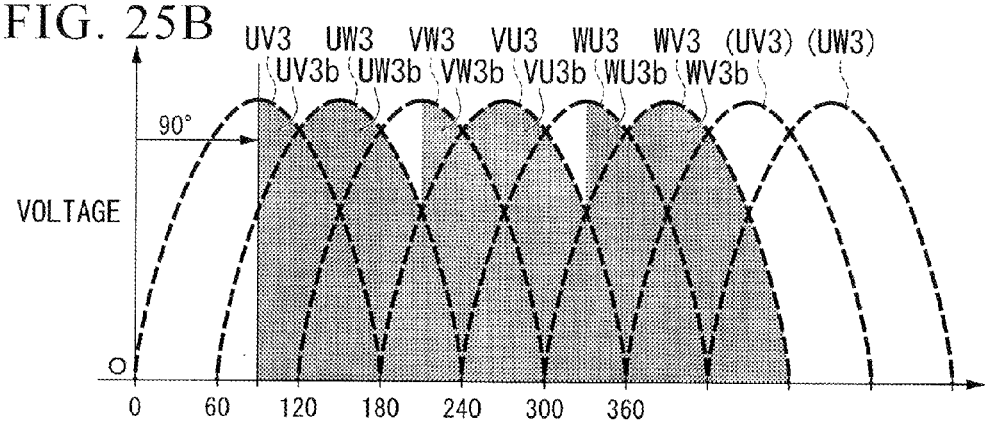
FIG. 25B is a timing chart that shows the thyristor-firing method by the time-division control and the conduction times.
Figure 25C:
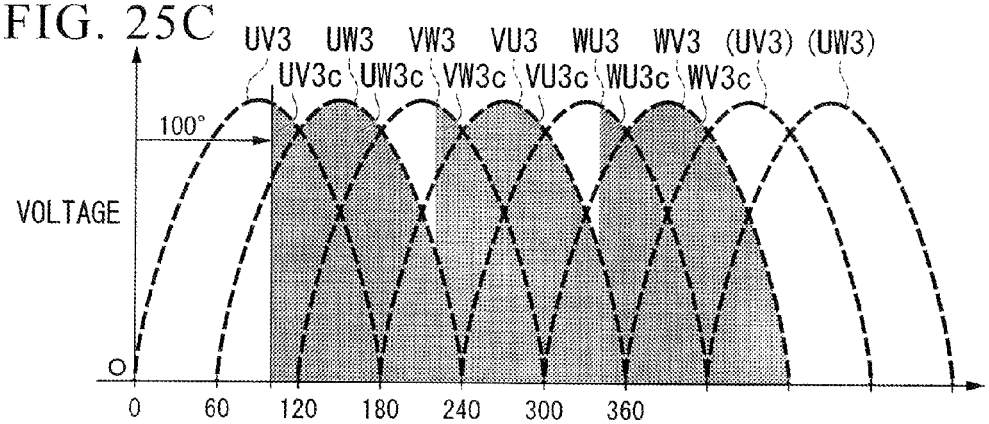
FIG. 25C is a timing chart that shows the thyristor-firing method by the time-division control and the conduction times.
Figure 25D:
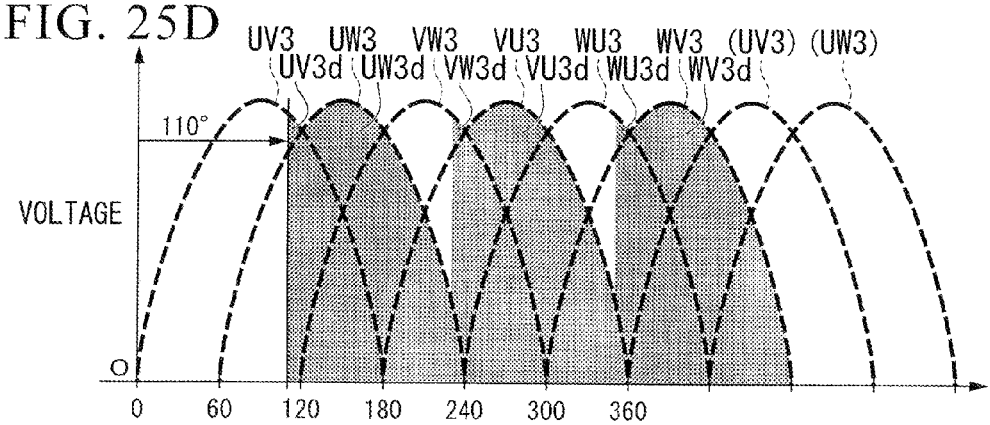
FIG. 25D is a timing chart that shows the thyristor-firing method by the time-division control and the conduction times.

FIGS. 25B to 25D are diagrams of changes in the conduction durations, achieved by using gate control to control the conduction start timings of the thyristors.

The x-axis represents the phase angle taking 0 as the origin, and the y-axis represents the voltage of the all-wave-rectified waveform.

The waveforms indicated by dotted lines in FIGS. 25A to 25C are the voltage waveforms when the line-to-line voltage waveform of the 3-phase AC current is all-wave-rectified. These waveforms are obtained by arranging waveforms of AC half-cycles at a phase difference of 120° each time.

Since the 3-phase AC is all-wave-rectified, six waveforms express one cycle. Here, the phase for reference is the UV-phase, and codes are appended to each waveform as follows: UV3, UW3, VW3, VU3, WU3, and WV3. Waveform UV3 is the waveform of the line-to-line voltage with the U-phase taking the V-phase as a reference, and expresses the waveform of the duration when the phase voltage of the U-phase increases. Conversely, waveform VU3 is the waveform of the line-to-line voltage with the U-phase taking the V-phase as a reference, expresses the waveform of the duration when the phase voltage of the U-phase decreases, the value being positive due to the all-wave-rectification.

In the following explanation, the starting-point of waveform UV3 is designated as the origin of one cycle of the line-to-line output voltage of the 3-phase AC generator 1. That is, the origin is when the phase angle is 0°.

In FIGS. 25B to 25D, shaded areas represent differences in the conduction times of the thyristors when their conduction angles are delayed by 90°, 100°, and 110° with respect to a reference phase of 0°.

Here, each thyristor is fired at a timing delayed by the same amount behind the waveform of the respective line-to-line voltage. That is, conduction start angles of the waveforms are aligned with respect to reference phases of waveforms UV3, UW3, VW3, VU3, WU3, and WV3.

The conduction start angles of thyristors S1 to S3 can be set within a range of 60° to 180° in the phases of waveforms UV3, VW3, and WU3.

Each fired thyristor maintains its conductive state until a reverse bias voltage is applied.

Incidentally, for explanation of the system for charging battery 4 instead of battery 3, thyristors S1, S2, and S3 are replaced in the description with S4, S5, and S6.

Thus it is possible to provide the battery charger 102 that can appropriately charge a plurality of batteries, without providing a plurality of 3-phase AC generators.

Fourth Embodiment

Voltage Detection

In the embodiments described above, the 3-phase AC generator 1 includes a sub-coil that outputs a signal in synchronization with a coil of one of the phases.

Figure 26:
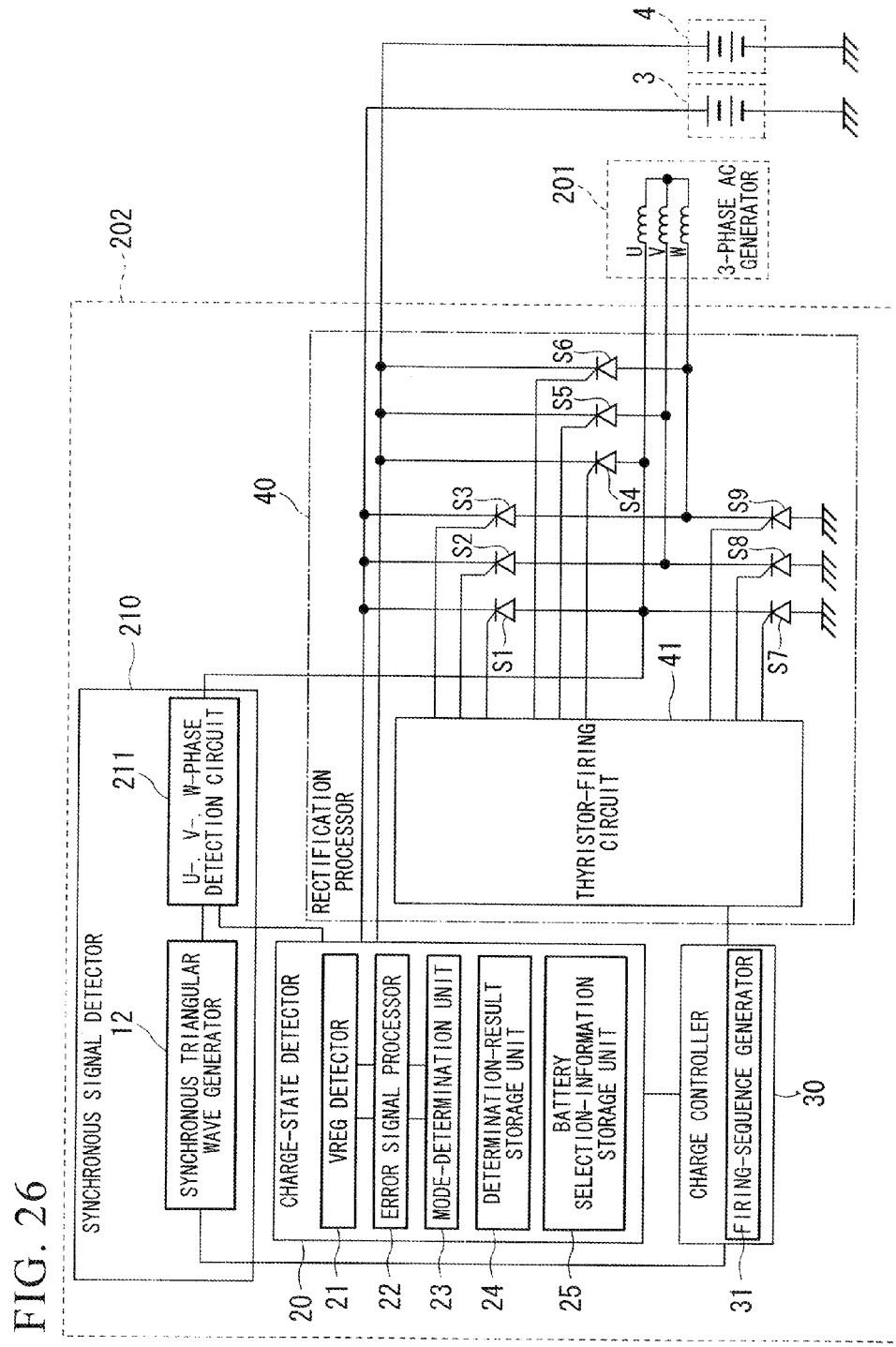
FIG. 26 is a circuit diagram that shows a battery charger including a 3-phase AC generator without a sub-coil.
Figure 27:
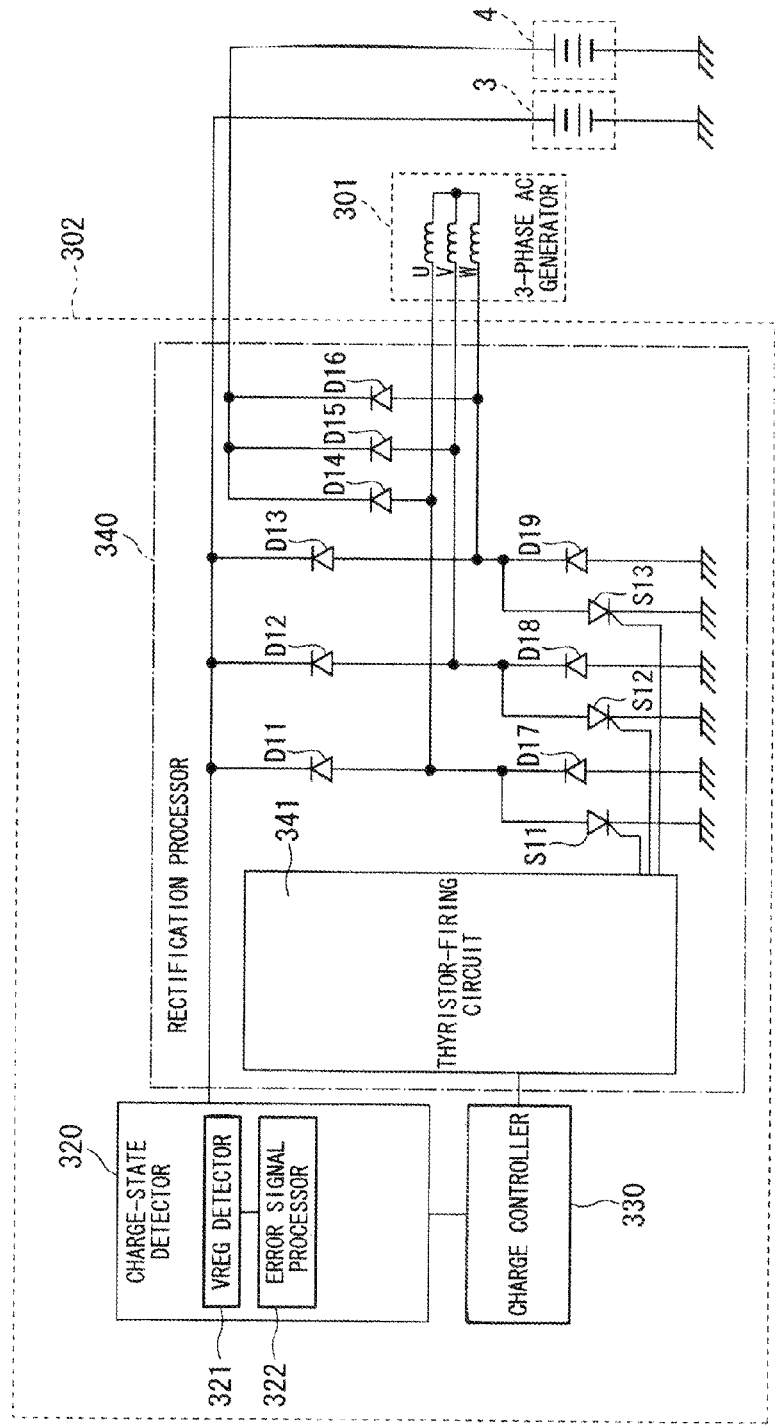
FIG. 27 is a circuit diagram that shows an example of a conventional battery charger.

Referring to FIG. 26, a modification of a synchronous signal detector according to a fourth embodiment will be explained.

FIG. 26 is a schematic block diagram of a battery charger 202 in a fourth embodiment.

The battery charger 202 includes a synchronous signal detector 210, a charge-state detector 20, a charge controller 30, and a rectification processor 40.

Points which are modified from the block diagram shown in the embodiment of FIG. 1 relate to the synchronous signal detector 210 and a 3-phase AC generator 201. These modifications will be explained.

Firstly, the 3-phase AC generator 201 will be explained.

The 3-phase AC generator 201 does not include a sub-coil or the like, and outputs electric power using 3-phase AC.

The synchronous signal detector 210 of the battery charger 202 detects an AC output voltage input from the 3-phase AC generator 201, generates a timing signal in synchronization with the AC output voltage, generates a synchronous signal in synchronization with the AC output voltage output by the 3-phase AC generator 201, and outputs this synchronous signal.

The output synchronous signal is a triangular wave synchronized with rectangular waves synchronized with each phase of the 3-phase AC generator 1, and monotonously increases over a half-cycle.

The synchronous signal detector 210 includes a U-, V-, W-phase detection circuit 211 and a synchronous triangular wave generator 12.

The U-, V-, W-phase detection circuit 211 of the synchronous signal detector 210 detects an AC output voltage input from the 3-phase AC generator 201, generates a timing signal in synchronization with the AC output voltage, generates a rectangular wave in synchronization with the U-phase from a U-phase voltage waveform (AC waveform) Vu, and inputs to the synchronous triangular wave generator 12.

Based on a triangular wave in synchronization with the rectangular wave of the U-phase input form the synchronous triangular wave generator 12, the U-, V-, W-phase detection circuit 211 of the synchronous signal detector 210 generates signals of rectangular waves in synchronization with the V- and W-phases, and inputs to the synchronous triangular wave generator 12.

From the 3-phase rectangular-wave signals input from the U-, V-, W-phase detection circuit 211, the synchronous triangular wave generator 12 of the synchronous signal detector 210 generates triangular waves in synchronization with these signals. The heights of these triangular waves (maximum values of the triangular waves) become equal irrespective of the size of the pulse widths of the rectangular waves. The synchronous triangular waves are generated in a two-stage process. Firstly, a U-phase triangular wave synchronized with the U-phase voltage is generated, and input to the U-, V-, W-phase detection circuit 211. Then, V-phase and W-phase rectangular waves are input from the U-, V-, W-phase detection circuit 211, triangular waves synchronized with the V- and W-phases are generated, and output together with the U-phase synchronized triangular wave.

When the 3-phase AC generator 201 is star-connected, the triangular waves output from the synchronous triangular wave generator 12 match the phases of the line-to-line voltages. The triangular waves synchronized with the line-to-line voltages are output at a 30° advance with respect to the phase of the phase voltage.

Constituent parts having the same function as those in the first embodiment are designated with the same reference codes, and the foregoing description can be referred to for their explanation.

In contrast to the U-, V-, W-phase detection circuit 11 in the synchronous signal detector 10 of the first embodiment described above, the U-, V-, W-phase detection circuit 211 in the synchronous signal detector 210 here differs in that, in processing an input signal, the signal is not extracted from a sub-coil of the 3-phase AC generator, but from the output voltage of the 3-phase AC generator.

By thus controlling the durations of the conductive states of the thyristors, electric power from the 3-phase AC generator 201 to the charge controller 30 can be restricted, and the charge amount can be controlled.

Thus it is possible to provide the battery charger 202 that can appropriately charge a plurality of batteries, without providing a plurality of 3-phase AC generators.

In the description above, a sensor coil (sub-coil) appended to one of the phases (the U-phase in this description) outputs a signal synchronized with the output power output from the 3-phase AC generator 1. Instead of a signal output by a sensor coil, any signal that can be synchronized with the output power of the 3-phase AC generator 1 is acceptable, and a pickup coil can be used instead of a sensor coil.

The explanation of the above embodiments describes a configuration where two battery systems are connected to the battery charger 2.

By reconsidering the number of rectification processors 40 that is suitable for the number of battery systems connected to the battery charger, and the functions of the charge-state detector 20 and the charge controller 30, it is possible to provide a battery charger capable of handling the required numbers of batteries and systems.

The invention is not limited to the foregoing embodiments, and can be modified in various ways without departing from the scope of its main points.

Various types of 3-phase AC generators and batteries can be used as the 3-phase AC generator and the batteries in the battery charger of the invention, and there are no particular restrictions on the number of configurations and manner of connections of a power-source device.

The battery charger of the invention can be made to operate in parallel with the connected batteries. The output terminals of a plurality of battery chargers are connected to common batteries, and are made to operate while the outputs of the battery chargers complement each other.

In regard to a configuration where a microcomputer (or microcontroller) is incorporated in the battery charger 2, and processes and functions of the synchronous signal detector 10, the charge-state detector 20, the charge controller 30, and other circuits in the battery charger 2 are realized by executing a software program, this can be realized by software processing. Of course, a hardware configuration is also acceptable.

The same goes for the battery chargers 102 and 202.

The processes of the battery charger 2 can be configured using hardware, and they can also be executed by an internal computer system. Processing steps of the synchronous signal detector (synchronous signal generation), the charge-state detector (mode-determination), and the charge control (firing sequence generation) of the battery charger can be stored in program-format in a computer-readable recording medium, and realized by making a computer read the program. Here, a computer-readable recording medium includes a magnetic disk, a magnetic-optical disk, a CD-ROM, a DVD-ROM, a semiconductor member, and so on. Furthermore, this computer program can be distributed to a computer via a communication line, and the computer that receives it can then execute the program.

The same goes for the battery chargers 102 and 202.

According to the invention, a battery charger is connected between a 3-phase AC generator that generates a 3-phase alternating current including U-, V-, and W-phases and a plurality of batteries, and converts each AC power output from the 3-phase AC generator to a DC power, supplying this to the plurality of batteries. The battery charger includes a rectification processor including rectifier elements that control charge to the plurality of batteries, independently for each battery, a charge-state detector that detects a charge state of each battery from a voltage of that battery, and selects a battery for charging in a half-cycle that is determined beforehand in accordance with a result of that detection, a synchronous signal detector that detects, from the 3-phase AC generator, a signal synchronized with each phase in the 3-phase AC generator, and outputs a synchronous signal, and a charge controller that uses the synchronous signal from the synchronous signal detector to control the charge in the rectification processor in synchronization with the 3-phase AC generator, and controls the charge amount to the battery selected by the charge-state detector.

This makes it possible to provide a battery charger that can charge a plurality of batteries with a single 3-phase AC generator, and that can appropriately charge each battery even if the states of loads connected to them fluctuate.

Further, according to the invention, in the invention described above, the charge controller controls the charge amount to the plurality of batteries from the rectification processor by a time-division control method of switching the battery selected in a half-cycle that is determined beforehand by the charge-state detector.

This enables the plurality of batteries to be charged appropriately at all times, without being influenced by the states of their loads.

Further, according to the invention, in the invention described above, the charge controller controls the charge amount to the plurality of batteries from the rectification processor by executing a phase-control method with respect to the battery selected in a half-cycle that is determined beforehand by the charge-state detector.

Since this enables the voltage to be directly controlled by phase-control, current is not wastefully discarded as heat.

Further, according to the invention, in the invention described above, based on priorities set beforehand for a charge sequence of the batteries, the charge controller starts charging from a battery having a high priority.

As a system that charges according to priority, by setting a high priority to the battery of an application for which high reliability is desired, this can be used in applications relating to power control requiring reliability, such as in ships and vehicles.

Further, according to the invention, in the invention described above, the charge-state detector determines a charge state of each battery by comparing its detected voltage value with a predetermined threshold potential, selects, based on a result that combines the charge states of the batteries, a battery for charging according to a predetermined determination reference, and inputs an error signal obtained by comparing the voltage of the selected battery with a reference potential, and a selection signal indicating the selected battery, to the charge controller, the synchronous signal detector outputs a triangular wave that is synchronized with a rectangular wave of each phase synchronized with each phase of the 3-phase AC generator 1, and monotonously increases over a half-cycle, as the synchronous signal, the charge controller compares an error signal input from the charge-state detector with the triangular wave input from the synchronous signal detector, thereby deems a moment when the potential of the error signal and the triangular waves matches as a trigger for starting conduction of the rectifier element, and, in compliance with the selection signal input from the charge-state detector, inputs a firing signal to the rectification processor.

This enables the amount of charge to the batteries to be controlled by using phase-angle control to bring the rectification means to a conductive state in synchronization with the rotation of the 3-phase AC generator.

Further, according to the invention, in the invention described above, the rectification processor includes at least three thyristors connected as rectifier elements to each battery in correspondence with the U-, V-, and W-phases; also, at least three thyristors and three diodes are connected in common between the plurality of batteries.

This eliminates the need for a bridge consisting only of thyristors, thereby reducing the number of expensive thyristors that are required, and can obtain similar effects by replacing some of the thyristors with diodes.

Further, according to the invention, in the invention described above, the 3-phase AC generator includes a sub-coil in one of the phases, and the synchronous signal detector detects a signal output from the sub-coil as a signal synchronized with each phase.

This can provide a battery charger suitable for a 3-phase AC generator that includes a sub-coil in one of its phases.

Further, according to the invention, in the invention described above, the synchronous signal detector detects each phase in the 3-phase AC generator from the voltage of one of the phases of the 3-phase AC generator.

This can provide a battery charger suitable for a 3-phase AC generator that does not include a sub-coil.

What is claimed is:
1. A battery charger comprising:
a rectification processor configured to rectify an output power of a multi-phase alternate current generator and supply the output power rectified to a plurality of batteries;
a charge state detector configured to determine a charge state of each of the batteries when a line-to-line voltage between two phases of a plurality of phases of the multi-phase alternate current generator is zero and thereby determine necessity of charging with respect to each of the batteries; and
a charge controller configured to, when at least one of the batteries is determined to be necessary to be charged, control the rectification processor to supply the output power rectified to the at least one of the batteries in synchronization with the output timings of the multi-phase alternate current generator, thereby charging the at least one of the batteries,
wherein the charge controller is configured to, when two or more of the batteries are determined to be necessary to be charged, control the rectification processor to allocate and supply the output power to the two or more of the batteries in synchronization with the output timings of the multi-phase alternative current generator, thereby charging the two or more of the batteries.

2. The battery charger according to claim 1, wherein the charge state detector is configured to, when two or more of the batteries are determined to be necessary to be charged, select a battery to be charged from among the two or more of the batteries, and
the charge controller is configured to control the rectification processor to supply the output power to the battery selected, thereby charging the battery selected.

3. The battery charger according to claim 2, wherein the charge state detector is configured to detect a voltage of each of the batteries, and compare the voltage detected to a reference voltage, thereby determining the charge state of each of the batteries.

4. The battery charger according to claim 1, wherein the charge controller is configured to control the rectification processor to switch at timings associated with a cycle of outputs of the multi-phase alternate current generator, by a time-division control method, the two or more of the batteries to be supplied with the output power.

5. The battery charger according to claim 1, wherein the charge controller is configured to control the rectification processor to switch, by a phase control method, the two or more of the batteries to be supplied with the output power.

6. The battery charger according to claim 1, wherein each of the batteries has a priority, and
the charge controller is configured to, when two or more of the batteries are determined to be necessary to be charged, control the rectification processor to preferentially charge a battery of the two or more batteries which has a higher priority.

7. The battery charger according to claim 2, wherein the charge state detector is configured to previously store a correspondence relationship between the charge state of each of the batteries and a battery to be charged, and the charge state detector is configured to refer to the correspondence relationship, thereby selecting the battery to be charged, based on the charge state of each of the batteries.

8. The battery charger according to claim 1, further comprising:
a synchronous signal detector configured to generate a plurality of synchronous signals synchronized with respective phases of the multi-phase alternate current generator,
wherein the synchronous signals comprises:
a plurality of rectangular waves synchronized with the respective phases of the multi-phase alternate current generator; and
a plurality of synchronous waves synchronized with respective ones of the rectangular waves, the synchronous waves monotonously increasing in a half cycle thereof.

9. The battery charger according to claim 8, wherein the charge state detector is configured to, when two or more of the batteries are necessary to be charged, select a battery to be charged from among the two or more batteries,
the charge state detector is configured to input to the charge controller, an error signal based on a difference between a voltage of the battery selected and the reference voltage, and
the charge controller is configured to compare the error signal and one of the synchronous waves, and control the rectification processor to initiate charging the battery selected at the time when the error signal becomes identical in potential to the one of the synchronous waves.

10. The battery charger according to claim 8, wherein the multi-phase alternate current generator comprises a sub-coil configured to output a timing signal synchronized with one of the phases, and
the synchronous signal detector is configured to detect the timing signal, and generate the rectangular waves and the synchronous waves from the timing signal detected.

11. The battery charger according to claim 1, wherein the rectification processor has an input coupled to the multi-phase alternate current generator and an output coupled to the batteries in parallel.

12. The battery charger according to claim 1, wherein the multi-phase alternate current generator comprises a three-phase alternate current generator,
the batteries comprises a first battery and a second battery,
the rectification processor comprises:
first to third rectification elements respectively corresponding to three phases of the three-phase alternate current generator, each of the first to third rectification elements being coupled to the first battery and the three-phase alternate current generator;
fourth to sixth rectification elements respectively corresponding to the three phases, each of the fourth to sixth rectification elements being coupled to the second battery and the three-phase alternate current generator; and
seventh to ninth rectification elements respectively corresponding to the three phases, each of the seventh to ninth rectification elements being coupled to the three-phase alternate current generator, the seventh rectification element being coupled to the first and fourth rectification elements, the eighth rectification element being coupled to the second and fifth rectification elements, and the ninth rectification element being coupled to the third and sixth rectification elements.

13. The battery charger according to claim 12, wherein each of the first to sixth rectification elements comprises a thyristor, and
each of the seventh to ninth rectification elements comprises any one of a thyristor and a diode.

* * * * *